(12) United States Patent
Morizur et al.

(10) Patent No.: US 9,708,447 B2
(45) Date of Patent: *Jul. 18, 2017

(54) BLENDS CONTAINING PHOTOACTIVE ADDITIVE

(71) Applicant: SABIC Global Technologies B.V., Bergen op Zoom (NL)

(72) Inventors: Jean-Francois Morizur, Evansville, IN (US); Paul Dean Sybert, Evansville, IN (US); Peter Johnson, Evansville, IN (US); Thomas L. Evans, Mount Vernon, IN (US); James Franklin Hoover, Evansville, IN (US); Amanda Marie Flores, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/701,704

(22) Filed: May 1, 2015

(65) Prior Publication Data

US 2015/0232614 A1     Aug. 20, 2015

Related U.S. Application Data

(63) Continuation of application No. 14/137,292, filed on Dec. 20, 2013, now Pat. No. 9,023,912.

(60) Provisional application No. 61/792,966, filed on Mar. 15, 2013, provisional application No. 61/792,912, filed on Mar. 15, 2013, provisional application No. 61/740,062, filed on Dec. 20, 2012.

(51) Int. Cl.
| | |
|---|---|
| *C08F 2/46* | (2006.01) |
| *C08F 2/50* | (2006.01) |
| *C08G 61/04* | (2006.01) |
| *C08G 64/16* | (2006.01) |
| *C08L 69/00* | (2006.01) |
| *C08G 64/14* | (2006.01) |
| *C08G 79/04* | (2006.01) |

(52) U.S. Cl.
CPC ......... *C08G 64/1666* (2013.01); *C08G 64/14* (2013.01); *C08G 79/04* (2013.01); *C08L 69/00* (2013.01); *C08L 2205/03* (2013.01)

(58) Field of Classification Search
CPC ...... C08L 69/00; C08L 83/10; C08L 23/0884; C08L 67/02; C08L 25/06; C08L 33/12; C08L 51/04; C08L 55/02; C08G 64/14
USPC .......... 522/35, 33, 6, 71, 189, 184, 1; 520/1
See application file for complete search history.

(56) References Cited

U.S. PATENT DOCUMENTS

| | | | |
|---|---|---|---|
| 4,153,780 A | 5/1979 | Narita et al. | |
| 4,221,645 A | 9/1980 | Adelmann et al. | |
| 4,333,809 A | 6/1982 | Schreckenberg et al. | |
| 4,338,171 A | 7/1982 | Barie et al. | |
| 4,367,186 A | 1/1983 | Adelmann et al. | |
| 4,749,726 A | 6/1988 | Gupta et al. | |
| 4,831,109 A | 5/1989 | Mitra et al. | |
| 5,034,496 A | 7/1991 | Bales et al. | |
| 5,916,942 A | 6/1999 | Scholl et al. | |
| 6,224,949 B1 | 5/2001 | Wright et al. | |
| 6,517,910 B2 | 2/2003 | Wright et al. | |
| 6,624,379 B1 | 9/2003 | Thornton et al. | |
| 6,625,379 B1 | 9/2003 | Azuma et al. | |
| 7,875,698 B2 | 1/2011 | Vanmaele et al. | |
| 2004/0030090 A1 | 2/2004 | Meyer et al. | |
| 2005/0049369 A1 | 3/2005 | O'Neil et al. | |
| 2006/0014850 A1 | 1/2006 | Vanmaele et al. | |
| 2006/0074156 A1 | 4/2006 | Ebeling et al. | |
| 2007/0027268 A1 | 2/2007 | Di et al. | |
| 2007/0105994 A1* | 5/2007 | Li | C08L 69/00 524/115 |
| 2008/0081893 A1 | 4/2008 | Hoover et al. | |
| 2008/0114103 A1 | 5/2008 | Hoeks et al. | |
| 2010/0075125 A1 | 3/2010 | Maas et al. | |
| 2011/0065848 A1 | 3/2011 | Jung et al. | |
| 2012/0248102 A1 | 10/2012 | Van De Wetering et al. | |
| 2012/0253002 A1 | 10/2012 | Ozaki et al. | |
| 2013/0313493 A1 | 11/2013 | Wen et al. | |

(Continued)

FOREIGN PATENT DOCUMENTS

| | | |
|---|---|---|
| DE | 24 01 630 | 8/1974 |
| DE | 27 46 139 A1 | 4/1979 |
| DE | 27 46 141 A1 | 4/1979 |
| DE | 28 29 258 A1 | 1/1980 |
| DE | 29 30 787 A1 | 2/1981 |
| EP | 0001577 A1 | 5/1979 |
| EP | 0006579 | 1/1980 |
| EP | 0 068 014 B | 1/1983 |
| EP | 0 347 682 A | 12/1989 |
| EP | 1359176 A2 | 11/2003 |

(Continued)

OTHER PUBLICATIONS

Xie et al, Sulfur-containing hyperbranched polymeric photoinitaitor end-capped with benzophenone and tertiary amine moieties prepared via simultaneous double thiol-ene click reactions used for UV curing coatings, Jun. 29, 2011, Progress in Organic Coatings, 72, 572-578.*

(Continued)

Primary Examiner — Jessica E Whiteley
(74) Attorney, Agent, or Firm — Richard M. Klein; Fay Sharpe LLP

(57) ABSTRACT

Polymeric blends having improved flame retardance properties and good ductility at low temperatures are disclosed. The blend is formed from (A) a photoactive additive containing a photoactive group derived from a monofunctional benzophenone; and (B) a polymer resin which is different from the photoactive additive. The additive can be a compound, oligomer, or polymer. When exposed to ultraviolet light, crosslinking will occur between the photoactive additive and the polymer resin, enhancing the chemical resistance and flame retardance while maintaining ductility.

31 Claims, 11 Drawing Sheets

(56) References Cited

U.S. PATENT DOCUMENTS

| | | |
|---|---|---|
| 2013/0317149 A1 | 11/2013 | Zhao et al. |
| 2014/0178665 A1 | 6/2014 | Morizur et al. |
| 2014/0179821 A1 | 6/2014 | Morizur et al. |
| 2014/0234629 A1 | 8/2014 | Sun et al. |
| 2014/0265053 A1 | 9/2014 | Morizur et al. |
| 2014/0275314 A1 | 9/2014 | Morizur et al. |
| 2014/0275321 A1 | 9/2014 | Morizur et al. |
| 2014/0275322 A1 | 9/2014 | Morizur et al. |
| 2014/0275324 A1 | 9/2014 | Morizur et al. |

FOREIGN PATENT DOCUMENTS

| | | | |
|---|---|---|---|
| EP | 1093471 B1 | | 12/2007 |
| JP | 08-238309 | | 9/1996 |
| JP | 3409824 B2 | | 9/1996 |
| JP | 2002-226571 | | 8/2002 |
| WO | WO 96/33156 | | 10/1996 |
| WO | 98/22522 | * | 5/1998 |
| WO | WO 98/22522 A | | 5/1998 |
| WO | WO 2004/013229 A1 | | 2/2004 |
| WO | 2014/032616 | * | 8/2012 |
| WO | WO 2014/032616 A1 | | 3/2014 |

OTHER PUBLICATIONS

Wang et al., Photocrosslinking of poly(ethylene terephthalate) copolymers containing photoreactive comonomers, Jul. 18, 2005, Polymer, 46, 6897-6909.

International Search Report and Written Opinion dated Mar. 13, 2014, for corresponding PCT application No. PCT/US2013/077024.
International Search Report and Written Opinion dated Mar. 13, 2014, for corresponding PCT application No. PCT/US2013/077209.
International Search Report and Written Opinion dated Mar. 13, 2014, for corresponding PCT application No. PCT/US2013/077272.
International Search Report and Written Opinion dated Mar. 13, 2014, for corresponding PCT application No. PCT/US2013/076798.
International Search Report and Written Opinion dated Mar. 13, 2014, for corresponding PCT application No. PCT/US2013/076799.
International Search Report and Written Opinion dated Jul. 8, 2014, for corresponding PCT application No. PCT/US2014/028101.
International Search Report and Written Opinion dated Jul. 8, 2014, for corresponding PCT application No. PCT/US2014/028139.
International Search Report and Written Opinion dated Jul. 8, 2014, for corresponding PCT application No. PCT/US2014/028141.
International Search Report and Written Opinion dated Jul. 8, 2014, for corresponding PCT application No. PCT/US2014/026346.
International Search Report and Written Opinion dated Jul. 8, 2014, for corresponding PCT application No. PCT/US2014/026401.
International Search Report and Written Opinion dated Jul. 8, 2014, for corresponding PCT application No. PCT/US2014/028651.
International Search Report and Written Opinion dated Jul. 8, 2014, for corresponding PCT application No. PCT/US2014/028850.
International Search Report and Written Opinion dated Jul. 10, 2014, for corresponding PCT application No. PCT/US2014/29184.
Wang et al., Photocrosslinking of poly(ethylene tereohthalate) copolymers containing photoreactive comonomers, Jul. 18, 2005, Polymer, 46, 6897-6909.

* cited by examiner

BLENDS CONTAINING PHOTOACTIVE ADDITIVE

This application claims priority to U.S. patent application Ser. No. 14/137,292, filed Dec. 20, 2013, which claimed priority to U.S. Provisional Patent Application Ser. No. 61/740,062, filed Dec. 20, 2012; and to U.S. Provisional Patent Application Ser. No. 61/792,912, filed Mar. 15, 2013; and to U.S. Provisional Patent Application Ser. No. 61/792,966, filed Mar. 15, 2013. The disclosure of each application is hereby fully incorporated by reference herein.

BACKGROUND

The present disclosure relates to additives that can be used to crosslink polymers, such as polycarbonate polymers, for improved properties. Also included are compositions containing such additives, as well as articles (e.g. sheets, films, molded components, etc.) formed from such compositions. More specifically, the additive comprises a photoactive group derived from a monofunctional benzophenone. Polymeric blends of the additive with polycarbonate-polysiloxane resins are disclosed. Upon exposure to ultraviolet radiation, crosslinking will occur between the photoactive additive and the polymer resin, improving overall chemical resistance, flame retardance, and other characteristics.

Polycarbonates (PC) are synthetic engineering thermoplastic resins, and are a useful class of polymers having many beneficial properties. They are useful for forming a wide variety of products, such as by molding, extrusion, and thermoforming processes. Polycarbonate resins are both strong and transparent, and are used for a number of different commercial applications, including electronic engineering (E&E) parts, mechanical parts, etc. Because of their broad use, particularly in electronic applications and auto part applications, the desired properties of polycarbonates include high impact strength and toughness, heat resistance, weather and ozone resistance, and good ductility.

Polycarbonate polymers/resins and blends containing polycarbonate polymers exhibit flame retardance properties. However, such polymers drip when exposed to a flame, and this behavior worsens as the wall thickness decreases. This behavior greatly diminishes their use in transparent and opaque thin wall applications where a V0 or 5VA flame retardance rating is required. These polymers also have relatively poor chemical resistance. It would be desirable to provide additives that can improve these properties.

BRIEF DESCRIPTION

The present disclosure relates to a polymeric blend which has improved crosslinking properties. The blend includes photoactive additives which can be used to crosslink resins (e.g. polycarbonates) and improve their flame resistance and chemical resistance. The additives are formed by the reaction of at least a first photoactive moiety with a first linker moiety. The additive can be a compound, oligomer, or polymer. The ketone group of the additive is photoactive. The blend also includes a polymer resin which is different from the photoactive additive. When exposed to ultraviolet light, crosslinking will occur between the photoactive additive and the polymer resin, enhancing the chemical resistance and flame retardance while maintaining impact resistance at low temperatures. In particular embodiments, the photoactive additives are polycarbonate polymers containing a monohydroxybenzophenone endcap group that can crosslink when exposed to ultraviolet (UV) radiation.

Disclosed in various embodiments are polymeric blends, comprising: a photoactive additive containing a photoactive group derived from a monofunctional benzophenone; and a polymer resin which is different from the photoactive additive.

The polymer resin is sometimes a polyester, a polysiloxane-co-bisphenol-A polycarbonate, a polyesteramide, a polyimide, a polyetherimide, a polyamideimide, a polyether, a polyethersulfone, a polyepoxide, a polylactide, a polylactic acid (PLA), or any combination thereof.

In other embodiments, the polymer resin is a vinyl polymer, a rubber-modified graft copolymer, an acrylic polymer, polyacrylonitrile, a polystyrene, a polyolefin, a polyester, a polyesteramide, a polysiloxane, a polyurethane, a polyamide, a polyamideimide, a polysulfone, a polyepoxide, a polyether, a polyimide, a polyetherimide, a polyphenylene ether, a polyphenylene sulfide, a polyether ketone, a polyether ether ketone, an ABS resin, an ASA resin, a polyethersulfone, a polyphenylsulfone, a poly(alkenylaromatic) polymer, a polybutadiene, a polyacetal, a polycarbonate, a polyphenylene ether, an ethylene-vinyl acetate copolymer, a polyvinyl acetate, a liquid crystal polymer, an ethylene-tetrafluoroethylene copolymer, an aromatic polyester, a polyvinyl fluoride, a polyvinylidene fluoride, a polyvinylidene chloride, tetrafluoroethylene, a polylactide, a polylactic acid (PLA), a polycarbonate-polyorganosiloxane block copolymer, or a copolymer comprising: (i) an aromatic ester, (ii) an estercarbonate, and (iii) carbonate repeat units.

Sometimes, the polymer resin is a homopolycarbonate, a copolycarbonate, a polycarbonate-polysiloxane copolymer, a polyester-polycarbonate, or a p-cumyl phenol capped poly(isophthalate-terephthalate-resorcinol ester)-co-(bisphenol-A carbonate) copolymer. The polymer resin can be a p-cumyl phenol capped poly(isophthalate-terephthalate-resorcinol ester)-co-(bisphenol-A carbonate) polymer or a polycarbonate-polysiloxane copolymer having a polysiloxane content from 0.4 wt % to 25 wt %. The polycarbonate-polysiloxane copolymer may be a siloxane block co-polycarbonate comprising from about 6 wt % siloxane (±10%) to about 20 wt % siloxane (±10%), and having a siloxane chain length of 10 to 200.

In other embodiments, the polymer resin is a polyphosphonate polymer, a polyphosphonate copolymer, or a poly (polyphosphonate)-co-(BPA carbonate) copolymer.

Alternatively, the polymer resin can be selected from the group consisting of a polycarbonate-polysiloxane copolymer; a polycarbonate resin having an aliphatic chain containing at least two carbon atoms as a repeating unit in the polymer backbone; an ethylene-acrylic ester-glycidyl acrylate terpolymer; a polyethylene terephthalate polymer; a bisphenol-A homopolymer; a polystyrene polymer; a poly (methyl methacrylate) polymer; a thermoplastic polyester; a polybutylene terephthalate polymer; a methyl methacrylate-butadiene-styrene copolymer; an acrylonitrile-butadiene-styrene copolymer; or a dimethyl bisphenol cyclohexane-co-bisphenol-A copolymer.

The weight ratio of the photoactive additive to the polymer resin can be from 1:99 to 99:1, including from about 50:50 to about 85:15.

In particular embodiments, the photoactive additive is formed from the reaction of: the monofunctional benzophenone; a first linker moiety comprising a plurality of linking groups, wherein each linking group reacts with the functional group of the first photoactive moiety; and a chain extender. The functional group of the monofunctional benzophenone may be a hydroxyl group, an amino group, or a carboxylate group or equivalent thereof. In particular embodiments, the the monofunctional benzophenone is a monohydroxybenzophenone. The reaction that forms the photoactive additive sometimes further comprises a second end-capping agent that does not contain a ketone group.

In some embodiments, the photoactive additive has a weight average molecular weight of 15,000 or greater.

The molar ratio of the first photoactive moiety to the first linker moiety can be from 1:2 to 20:1.

In specific embodiments, the photoactive additive is a cross-linkable polycarbonate resin having the structure of Formula (I) or (II), as described further herein. The cross-linkable polycarbonate resin may have a weight-average molecular weight of between 17,000 and 80,000 Daltons, or between 17,000 and 35,000 Daltons, as measured by GPC using a UV-VIS detector and polycarbonate standards. The cross-linkable polycarbonate resin sometimes has a polydispersity index (PDI) of between 3.0 and 7.3 as measured by GPC using a UV-VIS detector and polycarbonate standards. The cross-linkable polycarbonate resin can have a melt volume flow rate of about 2 to about 12 cc/10 min at 300° C./1.2 kg, including a MVR of 2 to 4 cc/10 min, or a MVR of 8 to 12 cc/10 min, or a MVR of 8 to 10 cc/10 min.

In various embodiments, a plaque comprising the composition has a transparency of 70% or greater at a thickness of 3.2 mm, measured according to ASTM-D1003-00. Alternatively, a plaque comprising the composition may have a haze value of less than 2% at a thickness of 2.54 mm, measured according to ASTM D1003-07.

The blend may further comprise a flame retardant. The flame retardant can be potassium perfluorobutane sulfonate (Rimar salt), potassium diphenyl sulfone-3-sulfonate (KSS), or a combination thereof. In particular embodiments, the flame retardant is Rimar salt which is present in an amount of about 0.05 wt % to about 0.085 wt %, based on the total weight of the composition, and wherein the plaque comprising the composition has a transparency of 70 to 90% at a thickness of 3.2 mm, measured according to ASTM-D1003-00. In other embodiments, the flame retardant is present in an amount of about 0.06 wt % to about 0.08 wt %. Particular embodiments comprise the flame retardant, and further comprise a heat stabilizer and a mold release agent.

The blend can also further comprise an impact modifier, UV stabilizer, colorant, flame retardant, heat stabilizer, plasticizer, lubricant, mold release agent, filler, reinforcing agent, antioxidant agent, antistatic agent, blowing agent, anti-drip agent, or radiation stabilizer.

In particular embodiments, the polymer resin is a polycarbonate-polysiloxane copolymer. The polycarbonate-polysiloxane copolymer may have a siloxane content of from about 4 wt % to about 8 wt %, based on the total weight of the blend.

A plaque formed from the blend can achieve a UL94 5VA rating at a thickness of 3.0 mm (±10%) or less.

Also disclosed are various articles formed from the blends described herein. In particular embodiments, the article is a film, a sheet, a layer of a multilayer film, or a layer of a multilayer sheet. The article can be formed by injection molding, overmolding, co-injection molding, extrusion, multilayer extrusion, rotational molding, blow molding, or thermoforming. The article can be exposed to UV radiation to cause crosslinking of the cross-linkable polycarbonate resin.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
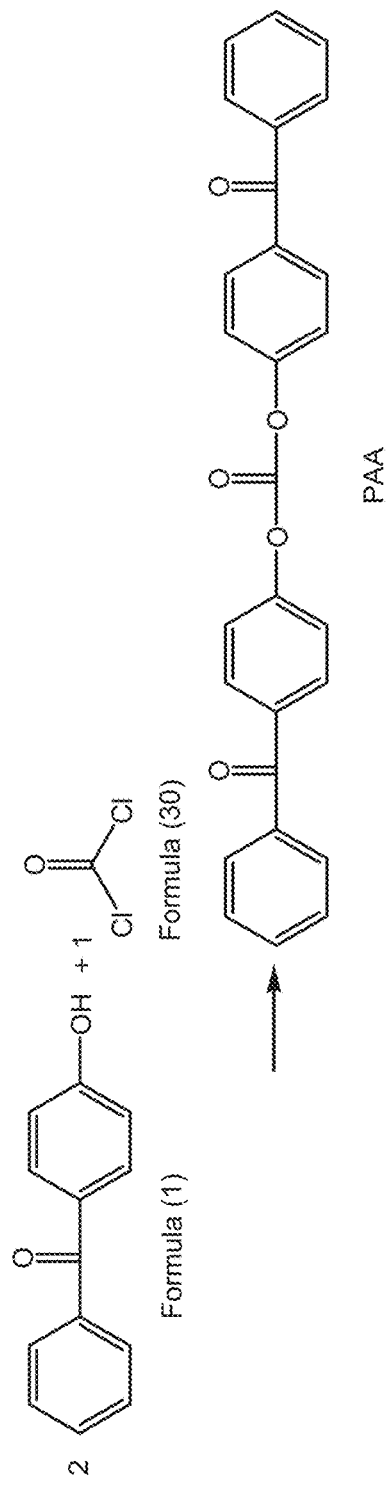
FIG. 1 illustrates the formation of a photoactive additive (compound) from a monofunctional photoactive moiety and a first linker moiety.
Figure 1:
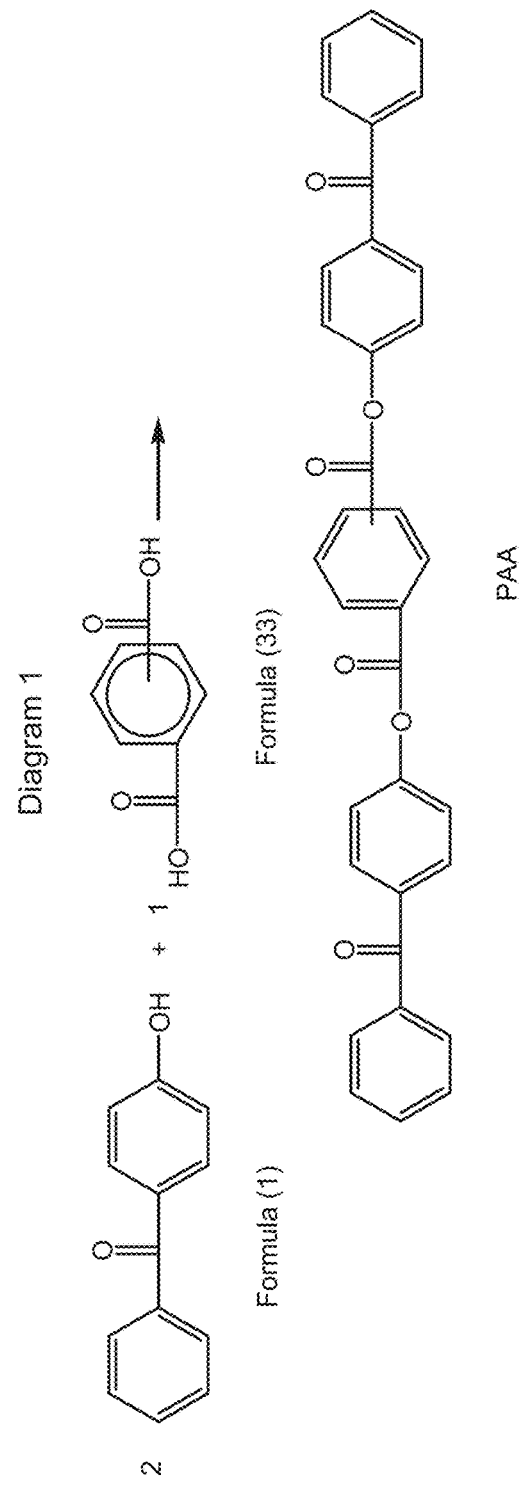

The present disclosure may be understood more readily by reference to the following detailed description of desired embodiments and the examples included therein. In the following specification and the claims which follow, reference will be made to a number of terms which shall be defined to have the following meanings.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s),"

"include(s)," "having," "has," "can," "contain(s)," and variants thereof, as used herein, are intended to be open-ended transitional phrases, terms, or words that do not preclude the possibility of additional acts or structures.

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to an linear or branched array of atoms that is not aromatic. The backbone of an aliphatic group is composed exclusively of carbon. The aliphatic group may be substituted or unsubstituted. Exemplary aliphatic groups include, but are not limited to, methyl, ethyl, isopropyl, hexyl, and cyclohexyl.

The term "aromatic" refers to a radical having a ring system containing a delocalized conjugated pi system with a number of pi-electrons that obeys Hückel's Rule. The ring system may include heteroatoms such as nitrogen, sulfur, selenium, silicon and oxygen, or may be composed exclusively of carbon and hydrogen. Aromatic groups are not substituted. Exemplary aromatic groups include, but are not limited to, phenyl, pyridyl, furanyl, thienyl, naphthyl and biphenyl.

The term "ester" refers to a radical of the formula —CO—O—, wherein the carbon atom and the oxygen atom are both covalently bonded to carbon atoms.

The term "carbonate" refers to a radical of the formula —O—CO—O—, wherein the oxygen atoms are both covalently bonded to carbon atoms. Note that a carbonate group is not an ester group, and an ester group is not a carbonate group.

The term "hydroxyl" refers to a radical of the formula —OH, wherein the oxygen atom is covalently bonded to a carbon atom The terms "carboxy" or "carboxyl" refers to a radical of the formula —COOH, wherein the carbon atom is covalently bonded to another carbon atom. It should be noted that for the purposes of this disclosure, a carboxyl group may be considered as having a hydroxyl group. However, it should be noted that a carboxyl group can participate in certain reactions differently from a hydroxyl group.

The term "anhydride" refers to a radical of the formula —CO—O—CO—, wherein the carbonyl carbon atoms are covalently bonded to other carbon atoms. An anhydride can be considered as being equivalent to two carboxyl groups.

The term "acid halide" refers to a radical of the formula —CO—X, wherein the carbon atom is covalently bonded to another carbon atom.

The term "alkyl" refers to a radical composed entirely of carbon atoms and hydrogen atoms which is fully saturated. The alkyl radical may be linear, branched, or cyclic.

The term "aryl" refers to an aromatic radical that is composed exclusively of carbon and hydrogen. Exemplary aryl groups include phenyl, naphthyl, and biphenyl. Note that "aryl" is a subset of aromatic.

The term "heteroaryl" refers to an aromatic radical having a ring system that is composed of carbon, hydrogen, and at least one heteroatom. Exemplary heteroaryl groups include pyridyl, furanyl, and thienyl. Note that "heteroaryl" is a subset of aromatic, and is exclusive of "aryl".

The term "halogen" refers to fluorine, chlorine, bromine, and iodine.

The term "alkoxy" refers to an alkyl radical which is attached to an oxygen atom, i.e. —O—$C_nH_{2n+1}$.

The term "aryloxy" refers to an aryl radical which is attached to an oxygen atom, e.g. —O—$C_6H_5$.

The term "hydrocarbon" refers to a radical which is composed exclusively of carbon and hydrogen. Both alkyl and aryl groups are considered hydrocarbon groups.

The term "alkenyl" refers to a radical composed entirely of carbon atoms and hydrogen atoms which contains at least one carbon-carbon double bond that is not part of an aryl or heteroaryl structure. The alkenyl radical may be linear, branched, or cyclic. An exemplary alkenyl radical is vinyl (—CH=$CH_2$).

The term "alkenyloxy" refers to a alkenyl radical which is attached to an oxygen atom, e.g. —O—CH=$CH_2$.

The term "arylalkyl" refers to an aryl radical which is attached to an alkyl radical, with the aryl radical being appended to the parent molecular moiety through the alkyl radical, e.g. benzyl (—$CH_2$—$C_6H_5$).

The term "alkylaryl" refers to an alkyl radical which is attached to an aryl radical, with the alkyl radical being appended to the parent molecular moiety through the aryl radical, e.g. tolyl (—$C_6H_4$—$CH_3$).

The term "amino" refers to a radical of the formula R—NH$_2$, wherein R is a carbon atom. For purposes of this disclosure, the amino group is a primary amino group, i.e. contains two hydrogen atoms.

The term "ureido" refers to a radical of the formula —NH—CO—NH—, wherein the nitrogen atoms are both covalently bonded to carbon atoms.

The term "carbamate" refers to a radical of the formula —NH—CO—O—, wherein the nitrogen atom and the oxygen atom are both covalently bonded to carbon atoms.

The term "amide" refers to a radical of the formula —CO—NH—, wherein the nitrogen atom and the carbon atom are both covalently bonded to carbon atoms.

The term "copolymer" refers to a polymer derived from two or more structural unit or monomeric species, as opposed to a homopolymer, which is derived from only one structural unit or monomer.

The term "$C_3$-$C_6$ cycloalkyl" refers to cyclopropyl, cyclobutyl, cyclopentyl or cyclohexyl.

The terms "Glass Transition Temperature" or "Tg" refer to the maximum temperature that a polymer, such as a polycarbonate, will have one or more useful properties. These properties include impact resistance, stiffness, strength, and shape retention. The Tg of a polycarbonate therefore may be an indicator of its useful upper temperature limit, particularly in plastics applications. The Tg may be measured using a differential scanning calorimetry method and expressed in degrees Celsius.

The glass transition temperature of a polymer, such as a polycarbonate, may depend primarily on the composition of the polymer. Polycarbonates that are formed from monomers having more rigid and less flexible chemical structures than Bisphenol-A generally have higher glass transition temperatures than Bisphenol-A polycarbonate, while polycarbonates that are formed from monomers having less rigid and more flexible chemical structures than Bisphenol-A generally have lower glass transition temperatures than Bisphenol-A polycarbonate. For example, a polycarbonate formed from 33 mole % of a rigid monomer, 3,3-bis(4-hydroxyphenyl)-2-phenylisoindolin-1-one ("PPPBP"), and 67 mole % Bisphenol-A has a glass transition temperature of 198° C., while a polycarbonate formed from Bisphenol-A, but also having 6 wt % of siloxane units, a flexible monomer, has a glass transition temperature of 145° C.

Mixing of two or more polycarbonates having different glass transition temperatures may result in a glass transition temperature value for the mixture that is intermediate between the glass transition temperatures of the polycarbonates that are mixed.

The glass transition temperature of a polycarbonate may also be an indicator of the molding or extrusion temperatures required to form polycarbonate parts. The higher the glass transition temperature of the polycarbonate the higher the molding or extrusion temperatures that are needed to form polycarbonate parts.

The glass transition temperatures (Tg) described herein are measures of heat resistance of, for example, polycarbonate and polycarbonate blends. The Tg can be determined by differential scanning calorimetry. The calorimetry method may use a TA Instruments Q1000 instrument, for example, with setting of 20° C./min ramp rate and 40° C. start temperature and 200° C. end temperature.

The term "halo" means that the substituent to which the prefix is attached is substituted with one or more independently selected halogen radicals. For example, "$C_1$-$C_6$ haloalkyl" means a $C_1$-$C_6$ alkyl substituent wherein one or more hydrogen atoms are replaced with independently selected halogen radicals. Non-limiting examples of $C_1$-$C_6$ haloalkyl include chloromethyl, 1-bromoethyl, fluoromethyl, difluoromethyl, trifluoromethyl, and 1,1,1-trifluoroethyl. It should be recognized that if a substituent is substituted by more than one halogen radical, those halogen radicals may be identical or different (unless otherwise stated).

The term "haze" refers to the percentage of transmitted light, which in passing through a specimen deviates from the incident beam by forward scattering. Percent (%) haze may be measured according to ASTM D 1003-07.

The term "Melt Volume Rate" (MVR) refers to the flow rate of a polymer in a melt phase as determined using the method of ASTM 1238-10. The MVR of a molten polymer is measured by determining the amount of polymer that flows through a capillary of a specific temperature over a specified time using standard weights at a fixed temperature. MVR is expressed in cubic centimeter per 10 minutes. The higher the MVR value of a polymer at a specific temperature, the greater the flow of that polymer at that specific temperature.

The term "Peak melt viscosity" refers to the highest melt viscosity value (in poise) achieved between 350° C. and 450° C. during rheological testing of a polycarbonate resin.

The term "Percent transmission" or "% transmission" refers to the ratio of transmitted light to incident light, and may be measured according to ASTM D 1003-07.

"Polycarbonate" as used herein refers to an oligomer or a polymer comprising residues of one or more monomers, joined by carbonate linkages.

"Thermal stability" as used herein refers to resistance of a polymer to molecular weight degradation under thermal conditions. Thus, a polymer with poor thermal stability may show significant molecular weight degradation under thermal conditions, such as during extrusion, molding, thermoforming, hot-pressing, and like conditions. Molecular weight degradation may also be manifest through color formation and/or in the degradation of other properties such as weatherability, gloss, mechanical properties, and/or thermal properties. Molecular weight degradation can also cause significant variation in processing conditions such as melt viscosity changes.

The present disclosure refers to "polymers," "oligomers", and "compounds". A polymer is a large molecule composed of multiple repeating units chained together, the repeating units being derived from a monomer. One characteristic of a polymer is that different molecules of a polymer will have different lengths, and a polymer is described as having a molecular weight that is based on the average value of the chains (e.g. weight average or number average molecular weight). The art also distinguishes between an "oligomer" and a "polymer", with an oligomer having only a few repeating units, while a polymer has many repeating units. For purposes of this disclosure, the term "oligomer" refers to such molecules having a weight average molecular weight of less than 15,000, and the term "polymer" refers to molecules having a weight average molecular weight of 15,000 of more, as measured by GPC using polycarbonate molecular weight standards. In contrast, for a compound, all molecules will have the same molecular weight. Compared to a polymer, a compound is a small molecule.

Compositions

The present disclosure relates to photoactive additives (PAA), and in particular to a polymeric blend containing such additives. When the photoactive additive is added to one or more base resins and is then exposed to the appropriate wavelength of light, the resulting composition will have improved anti-drip and flame retardant properties compared to the base resins alone or to the composition prior to the light exposure. For example, the chemical resistance, propensity to drip during burning, or the propensity to form a hole when exposed to a flame can be improved. Improved flame resistance performance characteristics may include flame out time (FOT) and time to drip (TTD). The compositions, blended or neat, can be used to provide thin-walled materials that are UL94 5VA compliant. The compositions can be used to provide thin-walled materials that are 5VA compliant and highly transparent. The compositions may also exhibit good chemical resistance, scratch resistance, tear resistance, impact strength, ductility, hydrolytic stability, and/or weatherability. Compositions comprising a cross-linked polycarbonate formed from the PAA are also contemplated.

The PAA can be blended with the base resins by melt blending or solution blending. The PAA-containing blend can be then be formed into an article by a variety of known processes such as solution casting, profile extrusion, film and/or sheet extrusion, sheet-foam extrusion, injection molding, blow molding, thermoforming, and the like.

The article is then exposed to ultraviolet (UV) light at an appropriate wavelength and in an appropriate dosage that brings about the desired amount of crosslinking for the given application. Depending on the end use application and the desired properties, the UV exposure can be performed on one or more sides of the article.

The exposure can be accomplished using standard methods known in the art. For example, in some embodiments, the article is exposed by using natural sunlight. The exposure time will be dependent on the application and color of material. It can range from a few minutes to several days. Alternatively, the crosslinking can be accomplished by using a UV-emitting light source such as a mercury vapor, High-Intensity Discharge (HID), or various UV lamps. For example, commercial UV lamps are sold with different wavelength radiation lines for UV curing from manufacturers such as Fusion UV. Non-limiting examples of UV-emitting electrodeless mercury light bulbs include H bulbs, D bulbs, H+ bulbs, and V bulbs. An H bulb has strong output in the range of 200 nm to 320 nm. The D bulb has strong output in the 320 nm to 400 nm range. The V bulb has strong output in the 400 nm to 420 nm range. Both electrodeless and arc lamps are contemplated for use, as are other metal halide combinations for the bulb type.

A long pass filter (with a cut on wavelength) or band pass filter can be used to remove specific wavelengths of light from the irradiation spectra that damage the article. Such filters are commercially available. In addition, borosilicate glass can be used to block the shorter wavelengths of light that may cause resin degradation.

The exposed article will have a cross-linked outer surface and an inner surface that is either lightly cross-linked or not cross-linked. The outer surface will be cross-linked to such a degree that the outer surface is substantially insoluble in the common solvents for the starting resins. The percentage of the insolubles will be dependent on the part geometry and surface-to-volume ratio, but will generally be from 2% to 95%. For a ⅛" ASTM Izod bar exposed on one side, the percentage of insoluble will be from 1% to 75%. For most ⅛" articles exposed on one side, the insolubles will be from 2% to 10%.

The amount of PAA added to the blend can be used to fine-tune the final properties of the article. For example, articles requiring high chemical resistance and FR drip inhibition would need increased PAA content. In general, depending on the application, the overall molar percentage of the PAA should be from 0.5 mole % to 15 mole %, based on the weight of the polymeric resin. In more specific applications, the overall percentage is from 1 mole % to 10 mole %.

The PAAs are suitable for blending with a variety of resins. Such blends can still be sufficiently cross-linked to provide compositions that exhibit one or more of UL94 5VA compliance, extreme chemical resistance, scratch resistance, tear resistance, impact strength, ductility, hydrolytic stability, and weatherability. The PAAs are suitable for blending with polycarbonate homopolymers, polycarbonate copolymers, and polycarbonate blends. They are also suitable for blending with polyesters, polyarylates, polyestercarbonates, and polyetherimides. One advantage of using the PAAs with polymeric resins is that polymers with relatively higher Mw's generally retain their mechanical properties better, while polymers with relatively lower Mw's generally have better flow properties. The PAAs can be used to produce complex or thin molded articles that are difficult to mold using higher molecular weight polymers. Upon irradiation of the molded article, crosslinks can be formed that extend the molecular weight and improve physical properties such as impact strength, tensile strength, flame retardance, or chemical resistance.

The compositions disclosed herein are useful in the manufacture of a wide variety of articles, particularly thin-walled articles, including highly transparent thin-walled articles, having improved flame retardance and good physical properties. The compositions can be used to provide materials and articles such as, but not limited to, injection molded articles, films, extruded sheets, fibers, pellets, flex-films, tear-resistant films, and PVD laminates. The compositions can be used to provide materials and articles having scratch resistance. The compositions can be used to provide materials and articles that have self-sealing properties (e.g., a scratched article may undergo cross-linking upon UV-exposure, thereby sealing the scratch).

The present disclosure relates to a blend of a photoactive additive with a polymer resin which is different from the photoactive additive. The photoactive additive contains photoactive groups, as further described herein.

Generally, the photoactive additives (PAA) of the present disclosure include photoactive moieties that are covalently linked together through a first linker moiety and possibly a secondary linker moiety. The photoactive moieties contain a photoactive ketone group that, when exposed to the appropriate wavelength(s) of light, will form a stable covalent bond between the PAA and the polymeric resin. The PAA should be stable at conventional blending, forming, and processing temperatures (i.e. stable at 350° C. or above). The PAA also should not induce the degradation of the polymeric resin with which it is blended.

The term "photoactive moiety" refers to a moiety that, when exposed to light of the appropriate wavelength, cross-links with another molecule. Thus, for example, the bisphenol-A monomer in a bisphenol-A homopolymer would not be considered a photoactive moiety, even though photo-Fries rearrangement can occur upon exposure to light, because the atoms do not participate in crosslinking but merely in rearrangement of the polymer backbone.

The photoactive additive is formed from a reaction mixture containing at least a first photoactive moiety and a first linker moiety. The photoactive moiety comprises (i) a photoactive group and (ii) one functional group. The linker moiety comprises a plurality of linking groups that can react with the functional group of the photoactive moiety. The reaction product is the photoactive additive (PAA). The molar ratio of the photoactive moiety to the linker moiety can be from 1:2 to 20:1. A second end-capping agent may also be included. As desired, a chain extender can also be included. The second end-capping agent and the chain extender do not have photoactive properties.

The term "ketone group" refers to a carbonyl group (—CO—) that is bonded to two other carbon atoms (i.e. —R—CO—R'—). The two other carbon atoms can be in an aliphatic group or in an aromatic group. An ester group and a carboxylic acid group are not considered to be a ketone group because the carbonyl group is bonded to one carbon atom and an oxygen atom.

The functional group of the photoactive moiety can be a hydroxyl group, an amino group, or a carboxyl group or equivalent thereof. In this regard, carboxyl, ester, acid halide, and anhydrides react in the same way, and are thus considered to be equivalent to each other. For clarity, these four groups are illustrated below:

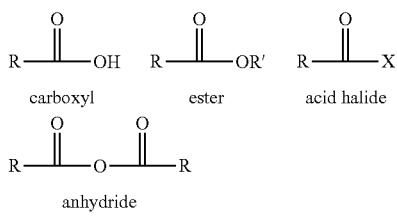

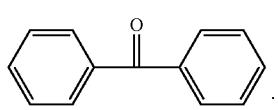

wherein R is the remainder of the photoactive moiety, R' is alkyl or aryl, and X is a halogen. It should be noted that the anhydride essentially contains two carboxyl groups.

The linking groups of the linker moiety react with the functional group of the photoactive moiety, and are generally also a hydroxyl group, an amino group, or a carboxyl group or equivalent thereof. In this regard, a hydroxyl group will react with a carboxyl group or its equivalents. An amino group will react with a carboxyl group or its equivalents. A carboxyl group or equivalent will react with a hydroxyl group or an amino group, but will not react with another carboxyl (because the anhydride is formed).

In some embodiments, the photoactive moiety can be a benzophenone moiety. Benzophenone is also known as diphenylketone or benzoyl benzene. A benzophenone moiety is shown below as Formula (0):

Formula (0)

In some embodiments, the photoactive moiety contains only one functional group. Examples of such photoactive moieties include those having the structure of one of Formulas (1), (3), or (5)-(10):

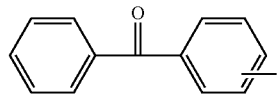
Formula (1)

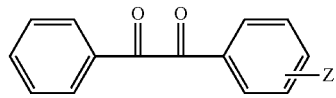
Formula (3)

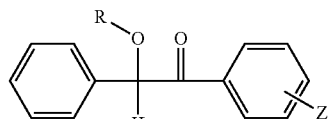
Formula (5)

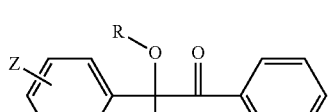
Formula (6)

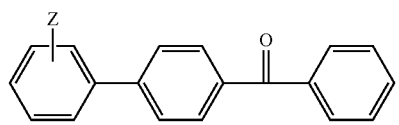
Formula (7)

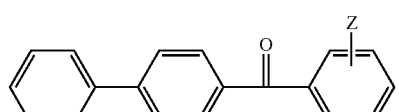
Formula (8)

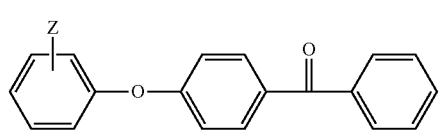
Formula (9)

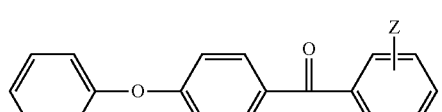
Formula (10)

wherein Z is hydroxyl, amino, or —COY, wherein Y is hydroxyl, alkoxy, aryloxy, or halogen; and R is H, alkyl, or aryl.

The compound of Formula (1) is a (Z)benzophenone. The compound of Formula (3) is a 1-(Z)phenyl-2-phenylethane-1,2-dione. The compound of Formula (5) is a 1-((Z)phenyl)-2-hydrocarboxy-2-phenylethanone. The compound of Formula (6) is a 2-((Z)phenyl)-2-hydrocarboxy-1-phenylethanone. The compound of Formula (7) is a 4-((Z)phenyl)-benzophenone. The compound of Formula (8) is a 4-(Z)-4'-phenylbenzophenone. The compound of Formula (9) is a 4-[((Z))phenoxy]-benzophenone. The compound of Formula (10) is a 4-(Z)-4'-phenoxy-benzophenone. In this paragraph, (Z) represents the functional group.

In some other embodiments, the R and R' groups attached to the ketone group form a ring structure. In such embodiments, the aromatic rings can include both aryl rings or heteroaryl rings. Examples of such photoactive moieties include those having the structure of one of Formulas (13)-(14):

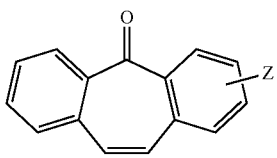
Formula (13)

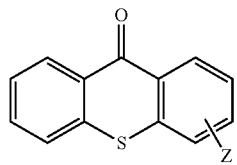
Formula (14)

wherein Z is hydroxyl, amino, or —COY, wherein Y is hydroxyl, alkoxy, aryloxy, or halogen.

The compound of Formula (13) is a (Z)dibenzo[1,3-e:1', 2'-f][7]annulen-11-one. The compound of Formula (14) is a (Z)thioxanthen-9-one. In this paragraph, (Z) represents the functional group.

The photoactive moiety is reacted with one or more linker moieties. At least one of the linker moieties comprises a plurality of linking groups that can react with the single functional group of the photoactive moiety. The linking groups can be joined to an aliphatic group or an aromatic group which serves as a "backbone" for the linker moiety. In particular embodiments, the linker moiety can have two, three, four, or even more linking groups.

Some examples of linker moieties which have two linking groups and can react with the photoactive moieties include those having the structure of one of Formulas (30)-(33):

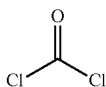
Formula (30)

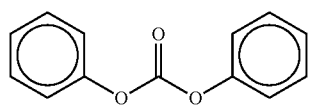
Formula (31)

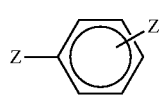
Formula (32)

Formula (33)

wherein Z is hydroxyl, amino, or —COY, where Y is hydroxyl, halogen, alkoxy, or aryloxy; and where n is 1 to 20. It should be noted that Formula (32) encompasses isophthalic acid and terephthalic acid. The notation of Formula (33) indicates that the aliphatic backbone may have any conformation and that the Z groups may be attached to any carbon atom in the aliphatic backbone.

Some examples of linker moieties which have three linking groups and can react with the photoactive moieties include those having the structure of one of Formulas (34)-(36):

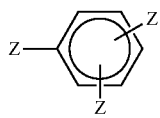
Formula (34)

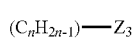
Formula (35)

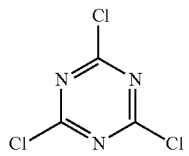
Formula (36)

wherein Z is hydroxyl, amino, or —COY, where Y is hydroxyl, halogen, alkoxy, or aryloxy. The notation of Formula (35) indicates that the aliphatic backbone may have any conformation and that the Z groups may be attached to any carbon atom in the aliphatic backbone.

Some examples of linker moieties which have four linking groups and can react with the photoactive moieties include those having the structure of one of Formulas (37)-(40):

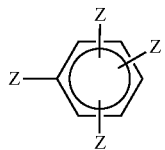
Formula (37)

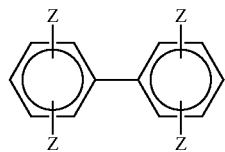
Formula (38)

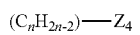
Formula (39)

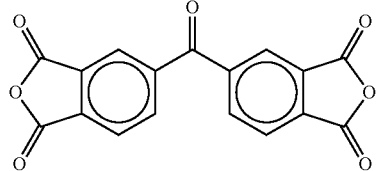
Formula (40)

wherein Z is hydroxyl, amino, or —COY, wherein Y is hydroxyl, alkoxy, aryloxy, or halogen; and where n is 1 to 20. The notation of Formula (39) indicates that the aliphatic backbone may have any conformation and that the Z groups may be attached to any carbon atom in the aliphatic backbone.

In some embodiments, linking groups can be provided by short oligomers, including oligomers containing glycidyl methacrylate monomers with styrene or methacrylate monomers, or epoxidized novolac resins. These oligomers can permit the desired the number of functional groups to be provided. Such oligomers are generalized by the structure of Formula (41):

Formula (41)

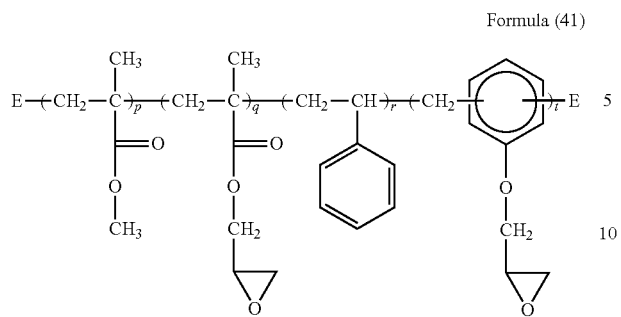

where E is hydrogen or an endcapping agent, p is the number of methacrylate monomers, q is the number of methacrylate monomers, r is the number of styrene monomers, and t is the number of epoxidized novolac (phenol-formaldehyde) monomers. Generally, $p+q+r+t \leq 20$. When the oligomer contains glycidyl methacrylate monomers with styrene or methacrylate monomers, generally $t=0$ and $q \geq 1$. Similarly, for novolac resins, $p=q=r=0$. The epoxy groups can be reacted with the phenolic group of the photoactive moiety.

As discussed above, the photoactive moiety has one functional group and the linker moiety has two or more linking groups. In embodiments that use only the photoactive moiety and the linker moiety in the reaction mixture, the resulting photoactive additive (PAA) will be a compound, each molecule having the same molecular weight. Again, the molar ratio of the photoactive moiety to the linker moiety can be from 1:2 to 20:1, though in these embodiments the molar ratio is usually 1:1 or greater. The two diagrams of FIG. 1 are illustrative of such photoactive additives. In the first diagram, two moles of 4-hydroxybenzophenone are reacted with one mole of phosgene to obtain the photoactive additive. In the second diagram, two moles of 4-hydroxybenzophenone are reacted with one mole of a diphthalic acid to obtain the photoactive additive. The product of the first diagram contains carbonate linkages, while the product of the second diagram contains ester linkages.

In particularly desired embodiments, the photoactive additive can be formed from a reaction mixture containing the photoactive moiety, the first linker moiety, and one or more chain extenders. The chain extender is a molecule that contains only two functional groups and is not photoactive when exposed to light. The chain extender can be used to provide a desired level of miscibility when the additive is mixed with the polymeric resin. In particular embodiments, the photoactive additive is a cross-linkable polycarbonate that includes a chain extender.

A first exemplary chain extender is a bisphenol of Formula (B):

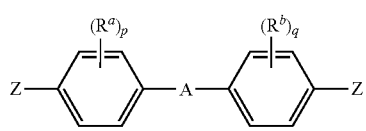

wherein Z is hydroxyl, amino, or —COY, wherein Y is hydroxyl, alkoxy, aryloxy, or halogen; $R^a$ and $R^b$ each represent a halogen atom or a monovalent hydrocarbon group and may be the same or different; p and q are each independently integers of 0 to 4; and A represents one of the groups of formula (B-1):

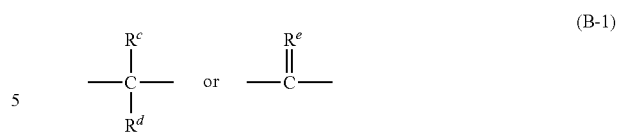

wherein $R^c$ and $R^d$ each independently represent a hydrogen atom or a monovalent linear or cyclic hydrocarbon group and $R^e$ is a divalent hydrocarbon group. For example, A can be a substituted or unsubstituted $C_3$-$C_{18}$ cycloalkylidene.

Specific examples of the types of bisphenol compounds that may be represented by Formula (B) include 1,1-bis(4-hydroxyphenyl) methane, 1,1-bis(4-hydroxyphenyl) ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane.

A second exemplary chain extender is a bisphenol of Formula (C):

wherein Z is hydroxyl, amino, or —COY, wherein Y is hydroxyl, alkoxy, aryloxy, or halogen; each $R^k$ is independently halogen, a $C_{1-10}$ hydrocarbon group, or a halogen substituted $C_{1-10}$ hydrocarbon group; and n is 0 to 4. The halogen is usually bromine. Examples of compounds that may be represented by Formula (C) include resorcinol, substituted resorcinol compounds such as 5-methyl resorcinol, 5-phenyl resorcinol, or 5-cumyl resorcinol; catechol; hydroquinone; and substituted hydroquinones such as 2-methyl hydroquinone, 2-t-butyl hydroquinone, 2-phenyl hydroquinone, 2-cumyl hydroquinone, or 2,3,5,6-tetramethyl hydroquinone.

A third exemplary chain extender is a bisphenolpolydiorganosiloxane of Formula (D-1) or (D-2):

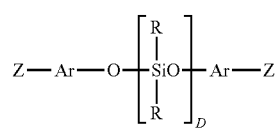

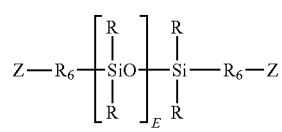

wherein Z is hydroxyl, amino, or —COY, wherein Y is hydroxyl, alkoxy, aryloxy, or halogen; each Ar is independently aryl; each R is independently alkyl, alkoxy, alkenyl, alkenyloxy, aryl, aryloxy, arylalkyl, or alkylaryl; each $R_6$ is independently a divalent $C_1$-$C_{30}$ organic group such as a $C_1$-$C_{30}$ alkyl, $C_1$-$C_{30}$ aryl, or $C_1$-$C_{30}$ alkylaryl; and D and E are an average value of 2 to about 1000, specifically about 2 to about 500, or about 10 to about 200, or more specifically about 10 to about 75.

Specific examples of Formulas (D-1) or (D-2) are illustrated below as Formulas (D-a) through (D-d):

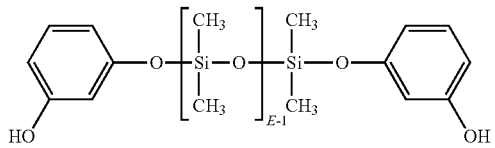
(D-a)

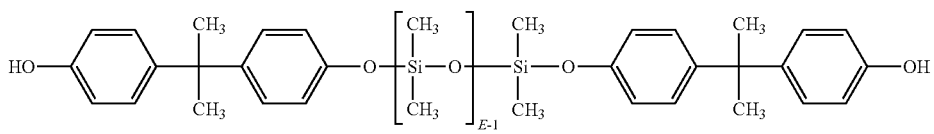
(D-b)

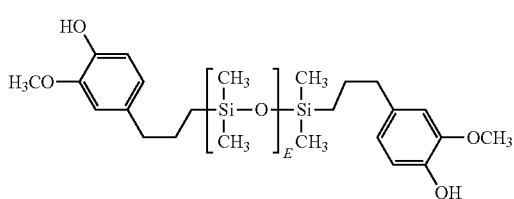
(D-c)

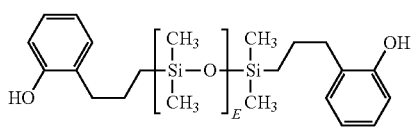
(D-d)

where E is an average value from 10 to 200.

A fourth exemplary chain extender is an aliphatic compound of Formula (E):

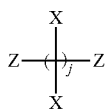
(E)

wherein Z is hydroxyl, amino, or —COY, wherein Y is hydroxyl, alkoxy, aryloxy, or halogen; each X is independently hydrogen, halogen, or alkyl; and j is an integer from 1 to 20. Examples of an aliphatic compound include ethylene glycol, propanediol, 2,2-dimethyl-propanediol, 1,6-hexanediol, and 1,12-dodecanediol.

A fifth exemplary chain extender is a dihydroxy compound of Formula (F), which may be useful for high heat applications:

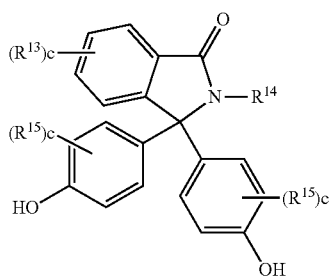
(F)

wherein $R^{13}$ and $R^{15}$ are each independently a halogen or a $C_1$-$C_6$ alkyl group, $R^{14}$ is a $C_1$-$C_6$ alkyl, phenyl, or phenyl substituted with up to five halogens or $C_1$-$C_6$ alkyl groups, and c is 0 to 4. In a specific embodiment, $R^{14}$ is a $C_1$-$C_6$ alkyl or phenyl group. In still another embodiment, $R^{14}$ is a methyl or phenyl group. In another specific embodiment, each c is 0. Compounds of Formula (F) include 3,3-bis(4-hydroxyphenyl)-2-phenylisoindolin-1-one (PPPBP); 4,4'-(1-phenylethane-1,1-diyl)diphenol or 1,1-bis(4-hydroxyphenyl)-1-phenyl-ethane (bisphenol-AP); and 1,1-bis(4-hydroxyphenyl)-3,3,5-trimethylcyclohexane) (bisphenol TMC).

Other chain extenders that might impart high Tgs to the polycarbonate as a copolycarbonate are dihydroxy compounds having adamantane units, as described in U.S. Pat. No. 7,112,644 and U.S. Pat. No. 3,516,968, which are fully incorporated herein by reference. A compound having adamantane units may have repetitive units of the following formula (G) for high heat applications:

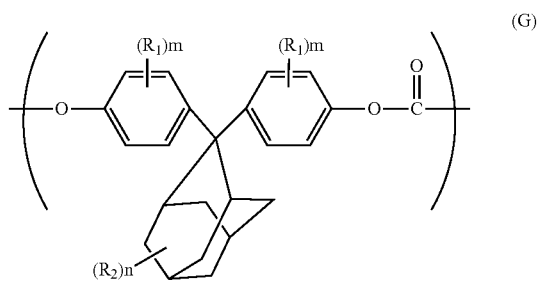
(G)

wherein $R_1$ represents a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms, or a fluoroalkyl group having 1 to 6 carbon atoms; $R_2$ represents a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms, or a fluoroalkyl group having 1 to 12 carbon atoms; m represents an integer of 0 to 4; and n represents an integer of 0 to 14.

Other dihydroxy compounds that might impart high Tgs to the polycarbonate as a copolycarbonate are dihydroxy compounds having fluorene-units, as described in U.S. Pat. No. 7,244,804. One such fluorene-unit containing dihydroxy compound is represented by the following formula (H) for high heat applications:

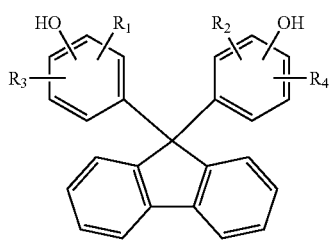

(H)

wherein $R_1$ to $R_4$ are each independently a hydrogen atom, a hydrocarbon group with 1 to 9 carbon atoms which may contain an aromatic group, or a halogen atom.

Another chain extender that could be used is an isosorbide. A monomer unit derived from isosorbide may be an isorbide-bisphenol unit of Formula (J):

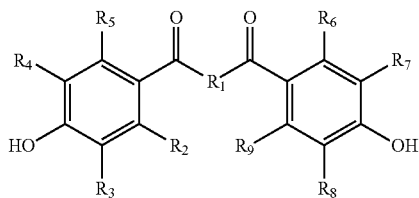

(J)

wherein $R_1$ is an isosorbide unit and $R_2$—$R_9$ are each independently a hydrogen, a halogen, a $C_1$-$C_6$ alkyl, a methoxy, an ethoxy, or an alkyl ester.

The $R_1$ isosorbide unit may be represented by Formula (J-a):

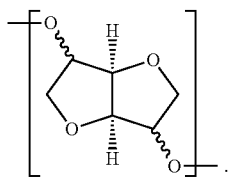

(J-a)

The isosorbide unit may be derived from an isosorbide, a mixture of isosorbide, a mixture of isomers of isosorbide, and/or from individual isomers of isosorbide. The stereochemistry for the isosorbide-based carbonate units of Formula (J) is not particularly limited. These diols may be prepared by the dehydration of the corresponding hexitols. Hexitols are produced commercially from the corresponding sugars (aldohexose). Aliphatic diols of formula (16) include 1,4:3,6-dianhydro-D glucitol, of formula (17); 1,4:3,6-dianhydro-D mannitol, of formula (18); and 1,4:3,6-dianhydro-L iditol, of formula (19), and any combination thereof. Isosorbides are available commercially from various chemical suppliers including Cargill, Roquette, and Shanxi. The isosorbide-bisphenol may have a pKa of between 8 and 11.

In embodiments, a second end-capping agent can also be used to terminate any chains (in addition to the photoactive moiety with only one functional group). The second end-capping agent (i.e. chain stopper) is a monohydroxy compound, a mono-acid compound, or a mono-ester compound. Exemplary endcapping agents include p-cumylphenol (PCP), resorcinol monobenzoate, p-tert-butylphenol, octyl-phenol, and p-methoxyphenol. The term "end-capping agent" is used herein to denote a compound that is not photoactive when exposed to light. For example, the end-capping agent does not contain a ketone group.

Figure 2:
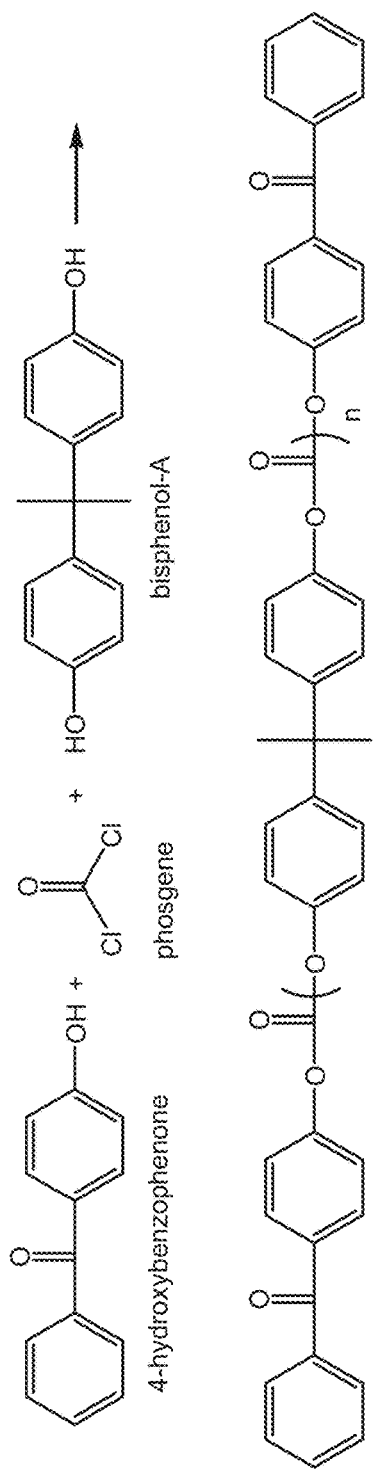
FIG. 2 illustrates the formation of a photoactive additive (oligomer/polymer) from a monofunctional photoactive moiety, a first linker moiety, a diol chain extender, and an endcapping agent.

The resulting photoactive additive (PAA) may be an oligomer or a polymer with a weight average molecular weight and a polydispersity index. The product resulting from the reaction in FIG. 2 is illustrative of such photoactive additives. Here, bisphenol-A is reacted with phosgene, 4-hydroxybenzophenone, and p-cumylphenol (endcap) to obtain the photoactive additive. Some chains will have two 4-hydroxybenzophenone endcaps, some will have only one 4-hydroxybenzophenone endcap, and some will have none, distributed in a statistical fashion.

Figure 3:
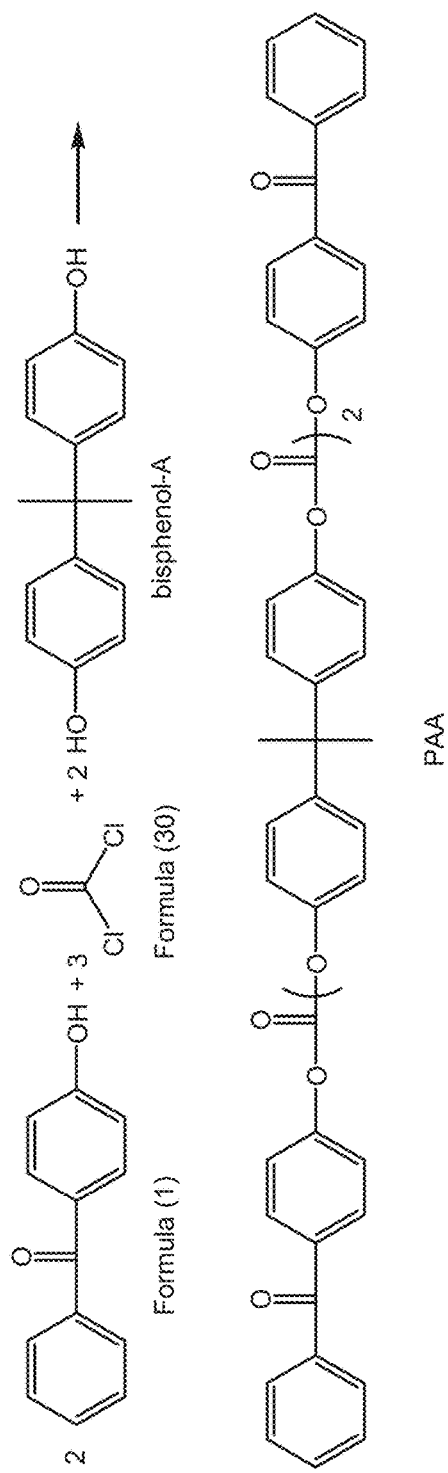
FIG. 3 illustrates the formation of a photoactive additive (oligomer/polymer) from a first photoactive moiety, a first linker moiety, and a diol chain extender.

Another example of a photoactive additive formed from a first photoactive moiety, a first linker moiety, and a chain extender is seen in FIG. 3. 4-hydroxybenzophenone (first photoactive moiety) is reacted with phosgene (first linker moiety) and bisphenol-A (chain extender) to obtain the photoactive additive. The resulting photoactive additive (PAA) may be an oligomer or a polymer with a weight average molecular weight and a polydispersity index.

As previously explained, a first photoactive moiety is reacted with a first linker moiety to obtain the photoactive additive. In some embodiments, a secondary linker moiety is included in the reaction mixture. The secondary linker moiety has at least three functional groups, each of which can react with the linking groups of the first linker moiety, and acts as a branching agent. Generally, the functional groups of the secondary linker moiety are the same as those on the photoactive moiety. When the photoactive moiety has one functional group, the resulting photoactive additive (PAA) will be a compound, each molecule having the same molecular weight.

Some examples of secondary linker moieties which have three functional groups and can react with the first linker moiety include those having the structure of one of Formulas (43)-(46):

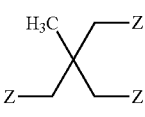

Formula (43)

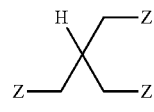

Formula (44)

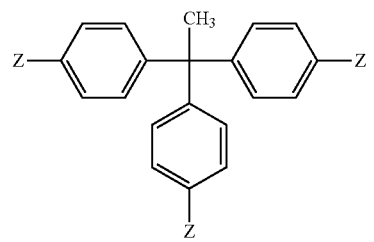

Formula (45)

-continued

Formula (46)

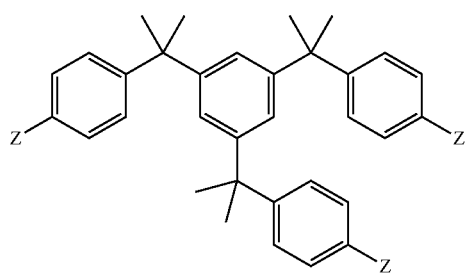

wherein Z is hydroxyl, amino, or —COY, wherein Y is hydroxyl, alkoxy, aryloxy, or halogen.

Some examples of secondary linker moieties which have four functional groups and can react with the first linker moiety include those having the structure of one of Formulas (47)-(48):

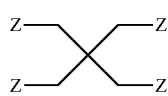

Formula (47)

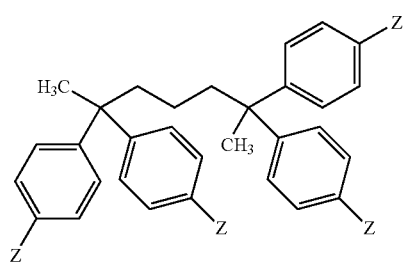

Formula (48)

wherein Z is hydroxyl, amino, or —COY, wherein Y is hydroxyl, alkoxy, aryloxy, or halogen.

In some embodiments, the secondary linker moiety can be an oligomer, made from an epoxidized novolac monomer. These oligomers can permit the desired number of functional groups to be provided. Such oligomers are generalized by the structure of Formula (49):

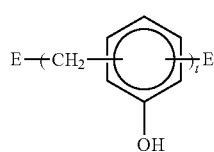

Formula (49)

wherein E is hydrogen or an endcapping agent; and t is an integer from 1 to 20.

Figure 4:
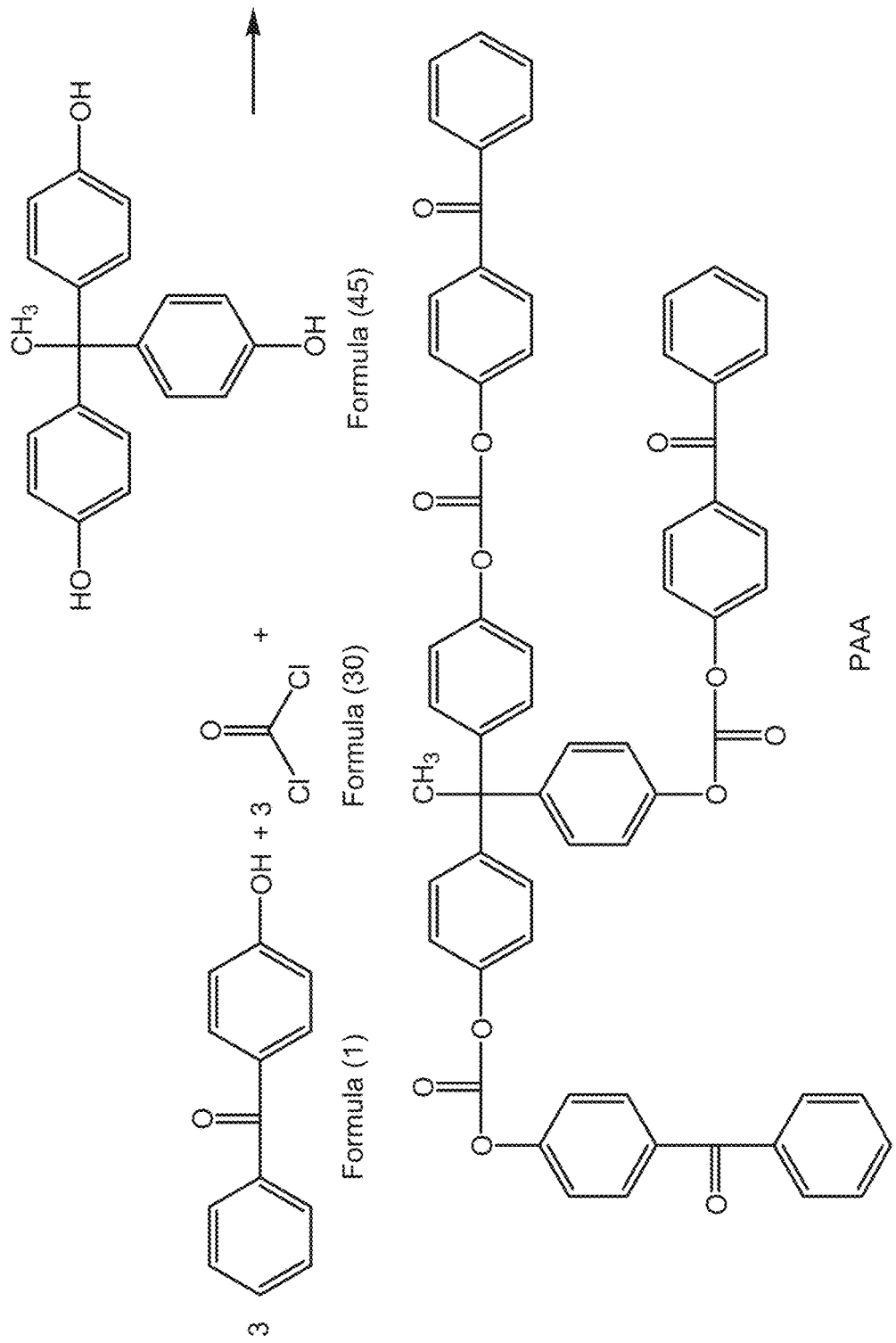
FIG. 4 illustrates the formation of a photoactive additive from a first photoactive moiety, a first linker moiety, and a secondary linker moiety.

An example of a photoactive additive formed from a first photoactive moiety, a first linker moiety, and a secondary linker moiety is seen in FIG. 4. Here, two moles of 4-hydroxybenzophenone are reacted with three moles of phosgene (first linker moiety) and one mole of tris(hydroxyphenyl)ethane (THPE, secondary linker moiety) to obtain the photoactive additive. Note that the secondary linker moiety reacts with the first linker moiety, not with the photoactive moiety.

Figure 5:
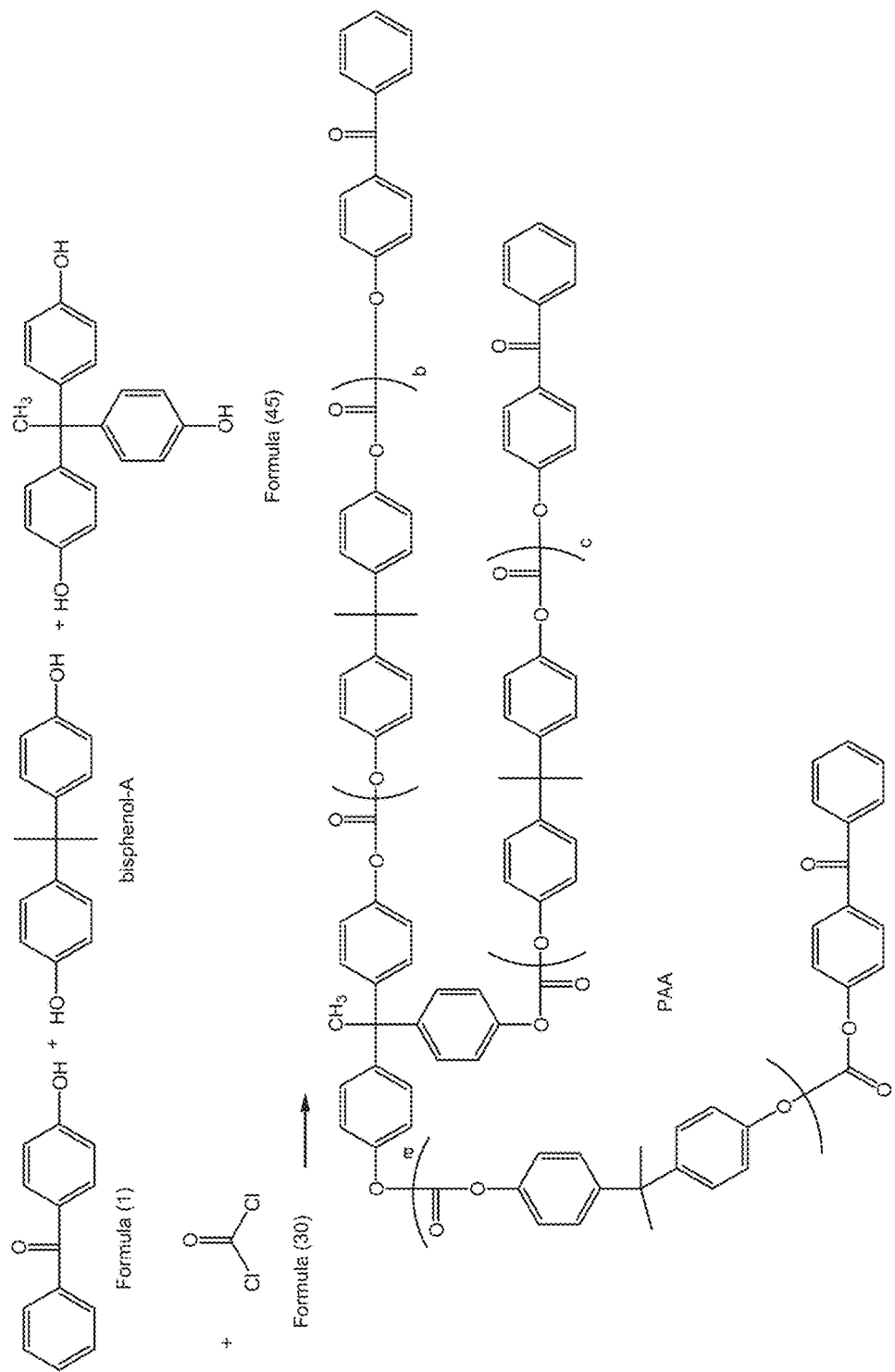
FIG. 5 illustrates the formation of a photoactive additive from a first photoactive moiety, a chain extender, a first linker moiety, and a secondary linker moiety.

Some photoactive additives of the present disclosure can be formed from the reaction of a first photoactive moiety, a chain extender, a first linker moiety, and a secondary linker moiety. Such a reaction is seen in FIG. 5. Here, 4-hydroxybenzophenone, bisphenol-A, phosgene, and THPE are reacted to obtain the photoactive additive. The resulting photoactive additive (PAA) may be an oligomer or a polymer with a weight average molecular weight and a polydispersity index.

The photoactive additives of the present disclosure can be a compound, an oligomer, or a polymer. The oligomer has a weight average molecular weight (Mw) of less than 15,000, including 10,000 or less. The polymeric photoactive additives of the present disclosure have a Mw of 15,000 or higher. In particular embodiments, the Mw is between 17,000 and 80,000 Daltons, or between 17,000 and 35,000 Daltons. The Mw may be varied as desired. Polymers/oligomers with relatively higher Mw's generally retain their mechanical properties better, while polymers/oligomers with relatively lower Mw's generally have better flow properties. In some particular embodiments, the Mw of the photoactive additives is about 5,000 or less. During melt processing, such oligomers are more likely to rise to the surface of the article. Long chain aliphatic diols ($C_6$ or higher) can also be used for this purpose. This may increase the concentration of the additive at the surface, and thus increase the crosslinking density at the surface upon exposure to UV light as well.

The photoactive additives (PAA) can be prepared by suitable methods. It may be advantageous to pre-react any phenolic groups with phosgene to form chloroformates. The chloroformates can then be condensed with the other reactants with the aid of a condensation catalyst, such as triethylamine. This can result in a substantially pure product. Alternatively, a mixture of additives can be obtained by mixing all of the reactants together upfront and then reacting.

Figure 6:
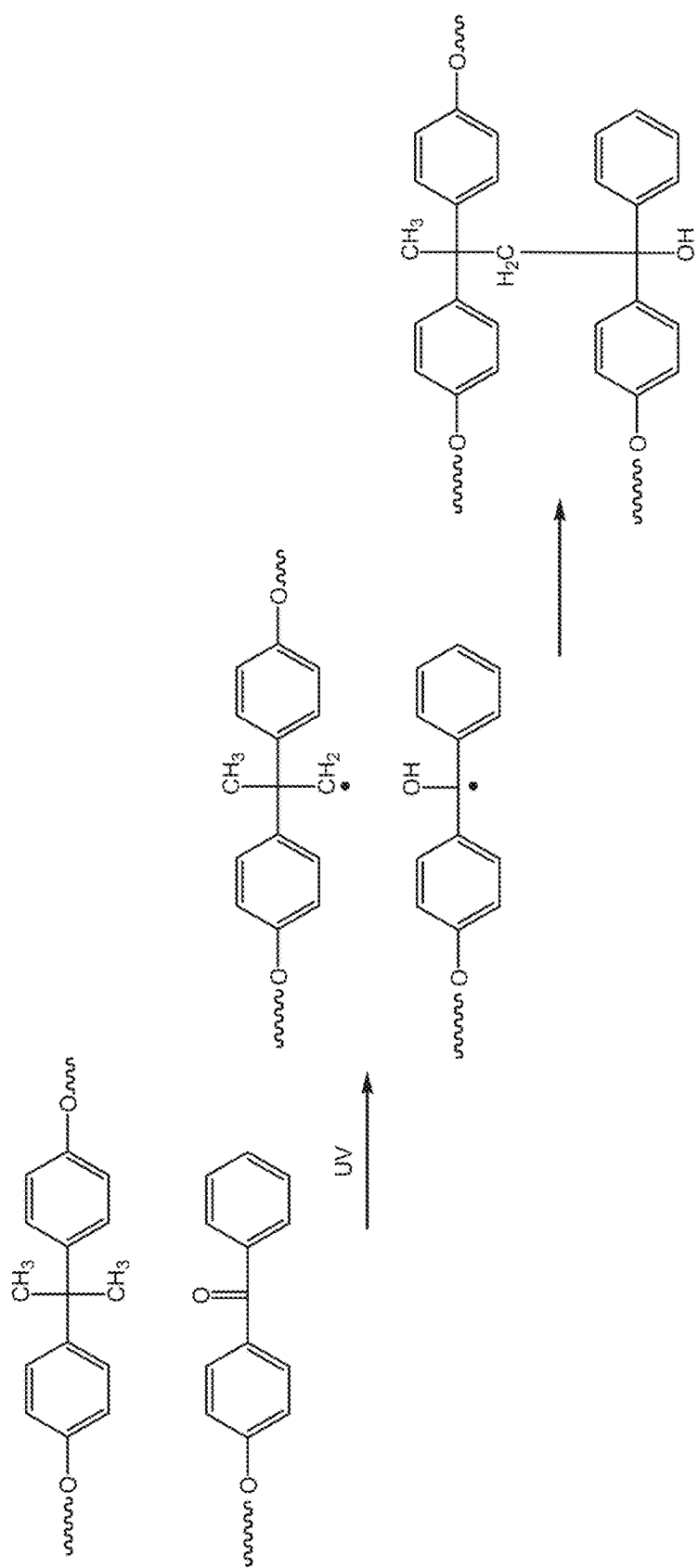
FIG. 6 illustrates the crosslinking mechanism of the photoactive additive.

The crosslinking mechanism of the additives is believed to be due to hydrogen abstraction by the ketone group from an alkyl group that acts as a hydrogen donor and subsequent coupling of the resulting radicals. This mechanism is illustrated in FIG. 6 with reference to a benzophenone (the photoactive moiety) and a bisphenol-A (BPA) monomer. Upon exposure to UV, the oxygen atom of the benzophenone abstracts a hydrogen atom from a methyl group on the BPA monomer and becomes a hydroxyl group. The methylene group then forms a covalent bond with the carbon of the ketone group. Put another way, the ketone group of the benzophenone could be considered to be a photoactive group. It should be noted that the presence of hydrogen is critical for the reaction to occur.

In particular embodiments, the photoactive additives (PAAs) disclosed herein are cross-linkable polycarbonates comprising endcaps derived from a monofunctional benzophenone (i.e. of Formula (1)). In more specific embodiments, the monofunctional benzophenone is a monohydroxybenzophenone. These polycarbonates, prior to cross-linking, can be provided as thermally stable high melt-flow polymers, and can thus be used to fabricate a variety of thin-walled articles (e.g., 3 mm or less). These articles may subsequently be treated (e.g., with UV-radiation) to affect cross-linking, thereby providing thin-walled materials that meet desired performance requirements (e.g., 5VA performance, chemical resistance, transparency). The cross-linked materials, in addition to flame resistance and chemical resistance, may retain or exhibit superior mechanical properites (e.g., impact resistance, ductility) as compared to the composition prior to cross-linking.

The use of monohydroxybenzophenone derived endcaps provides several advantages over polycarbonates incorporating repeating units derived from dihydroxybenzophenone monomers. Specifically, the monohydroxybenzophenone endcap is more economical, as less monomer is typically used. In addition, incorporation of the monohydroxybenzophenone into the polycarbonate can be particularly controlled, as the monohydroxybenzophenone will only react as a chain stopper. Accordingly, use of monohydroxybenzophenone eliminates the need for careful monitoring of polymerization kinetics or how the monomer is incorporated, as compared with a corresponding dihydroxybenzophenone monomer.

The monohydroxybenzophenone endcaps of the cross-linkable polycarbonates provide a reactive functional group for cross-linking the polycarbonates. For example, treatment of a cross-linkable polycarbonate of the invention with a suitable dose of ultra-violet radiation, as further described herein, may initiate cross-linking reaction between the monohydroxybenzophenone carbonyl carbon and a carbon atom of another functional group (e.g., a methylene carbon atom, such as in bisphenol-A) in the same polymer or another polymer in the composition.

Suitable monohydroxybenzophenone chain-stoppers include, but are not limited to, 2-hydroxybenzophenone, 3-hydroxybenzophenone, 4-hydroxybenzophenone, 4-hydroxybenzoyl benzophenone, 2-hydroxy-4-methoxybenzophenone, 2-hydroxy-4-methoxy-2'-carboxybenzophenone, 2-hydroxy-4-octoxybenzophenone, 2-hydroxy-4-stearoxybenzophenone, 4-dodecyloxy-2-hydroxybenzophenone, 2-hydroxy-4-methoxy-5-sulfobenzophenone trihydrate, and 2-hydroxy-4-methoxybenzophenone-5-sulfonic acid. In one preferred embodiment, the monohydroxybenzophenone chain stopper is a 2-hydroxybenzophenone, 3-hydroxybenzophenone, or 4-hydroxybenzophenone, each of which may be further substituted with one or more additional substituents, provided the monohydroxybenzophenone still functions as a chain-stopper. In another preferred embodiment, the monohydroxybenzophenone is 4-hydroxybenzophenone.

The cross-linkable polycarbonates (also referred to as "non-cross-linked polycarbonates") may comprise about 0.5 mol % to about 5 mol % endcap groups derived from a monohydroxybenzophenone, about 1 mol % to about 3 mol % endcap groups derived from a monohydroxybenzophenone, about 1.7 mol % to about 2.5 mol % endcap groups derived from a monohydroxybenzophenone, about 2 mol % to about 2.5 mol % endcap groups derived from a monohydroxybenzophenone, or about 2.5 mol % to about 3.0 mol % endcap groups derived from a monohydroxybenzophenone. The cross-linkable polycarbonates may have a monohydroxybenzophenone derived endcap content of: 0.5 mol %, 0.6 mol %, 0.7 mol %, 0.8 mol %, 0.9 mol %, 1.0 mol %, 1.1 mol %, 1.2 mol %, 1.3 mol %, 1.4 mol %, 1.5 mol %, 1.6 mol %, 1.7 mol %, 1.8 mol %, 1.9 mol %, 2.0 mol %, 2.1 mol %, 2.2 mol %, 2.3 mol %, 2.4 mol %, 2.5 mol %, 2.6 mol %, 2.7 mol %, 2.8 mol %, 2.9 mol %, 3.0 mol %, 3.1 mol %, 3.2 mol %, 3.3 mol %, 3.4 mol %, 3.5 mol %, 3.6 mol %, 3.7 mol %, 3.8 mol %, 3.9 mol %, 4.0 mol %, 4.1 mol %, 4.2 mol %, 4.3 mol %, 4.4 mol %, 4.5 mol %, 4.6 mol %, 4.7 mol %, 4.8 mol %, 4.9 mol %, or 5.0 mol %.

The cross-linkable polycarbonate of the present disclosure may be a polyester-polycarbonate copolymer. The molar ratio of ester units to carbonate units in the polyester-polycarbonate may vary broadly, for example 1:99 to 99:1, specifically 10:90 to 90:10, more specifically 25:75 to 75:25, optionally expanded depending on the desired properties of the final composition. The polyester units may be derived from a dicarboxylic acid, and may be, for example, a $C_2$-$C_{10}$ alkylene group, a $C_6$-$C_{20}$ alicyclic group, a $C_6$-$C_{20}$ alkyl aromatic group, a $C_6$-$C_{20}$ aromatic group, or a $C_6$-$C_{36}$ divalent organic group derived from a dihydroxy compound or chemical equivalent thereof.

The polyester units can be derived from aliphatic dicarboxylic acids having from 6 to about 36 carbon atoms, optionally from 6 to 20 carbon atoms. The $C_6$-$C_{20}$ linear aliphatic alpha-omega ($\alpha$-$\omega$) dicarboxylic acids may be adipic acid, sebacic acid, 3,3-dimethyl adipic acid, 3,3,6-trimethyl sebacic acid, 3,3,5,5-tetramethyl sebacic acid, azelaic acid, dodecanedioic acid, dimer acids, cyclohexane dicarboxylic acids, dimethyl cyclohexane dicarboxylic acids, norbornane dicarboxylic acids, adamantane dicarboxylic acids, cyclohexene dicarboxylic acids, or $C_{14}$, $C_{18}$ and $C_{20}$ diacids.

Saturated aliphatic alpha-omega dicarboxylic acids may be adipic acid, sebacic or dodecanedioic acid. Sebacic acid has a molecular mass of 202.25 Daltons, a density of 1.209 g/cm$^3$ (25° C.), and a melting point of 294.4° C. at 100 mmHg. Sebacic acid is extracted from castor bean oil found in naturally occurring castor beans.

Other examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids may be terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98.

Mixtures of the diacids can also be employed. It should be noted that although referred to as diacids, any ester precursor could be employed such as acid halides, specifically acid chlorides, and diaromatic esters of the diacid such as diphenyl, for example the diphenyl ester of sebacic acid. With reference to the diacid carbon atom number earlier mentioned, this does not include any carbon atoms which may be included in the ester precursor portion, for example diphenyl. It may be desirable that at least four, five or six carbon bonds separate the acid groups. This may reduce the formation of undesirable and unwanted cyclic species.

The polyester unit of a polyester-polycarbonate may be derived from the reaction of a combination of isophthalic and terephthalic diacids (or derivatives thereof) with resorcinol. In another embodiment, the polyester unit of a polyester-polycarbonate may be derived from the reaction of a combination of isophthalic acid and terephthalic acid with bisphenol-A. In an embodiment, the polycarbonate units may be derived from bisphenol-A. In another specific embodiment, the polycarbonate units may be derived from resorcinol and bisphenol-A in a molar ratio of resorcinol carbonate units to bisphenol-A carbonate units of 1:99 to 99:1.

The polyester-polycarbonate may have a biocontent according to ASTM-D-6866 of at least 2 weight %, at least 3 weight %, at least 4 weight %, at least 5 weight %, at least 6 weight %, at least 7 weight %, at least 8 weight %, at least 9 weight %, at least 10 weight %, at least 11 weight %, at least 12 weight %, at least 13 weight %, at least 14 weight %, at least 15 weight %, at least 16 weight %, at least 17 weight %, at least 18 weight %, at least 19 weight %, at least 20 weight %, at least 25 weight %, at least 30 weight %, at least 35 weight %, at least 40 weight %, at least 45 weight %, at least 50 weight %, at least 55 weight %, at least 60 weight %, or at least 65 weight % of the composition derived therefrom. The polymer, or any composition derived therefrom, may have at least 5.0 weight percent of sebacic acid content.

As described above, other end-capping agents can be incorporated into the cross-linkable polycarbonates. Exemplary chain-stoppers include certain monophenolic compounds (i.e., phenyl compounds having a single free hydroxy group), monocarboxylic acid chlorides, monocarboxylic acids, and/or monochloroformates. Phenolic chain-stoppers are exemplified by phenol and $C_1$-$C_{22}$ alkyl-substituted phenols such as p-cumyl-phenol, octylphenol, resorcinol monobenzoate, and p-tertiary-butylphenol, cresol, and monoethers of diphenols, such as p-methoxyphenol. Exemplary chain-stoppers also include cyanophenols, such as for example, 4-cyanophenol, 3-cyanophenol, 2-cyanophenol, and polycyanophenols. Alkyl-substituted phenols with branched chain alkyl substituents having 8 to 9 carbon atoms can be specifically be used.

Endgroups can be derived from the carbonyl source (i.e., the diaryl carbonate or carbonate precursor, or first linker moiety), from selection of monomer ratios, incomplete polymerization, chain scission, and the like, as well as any added endcapping groups, and can include derivatizable functional groups such as hydroxy groups, carboxylic acid groups, or the like. In an embodiment, the endgroup of a polycarbonate can comprise a structural unit derived from a diaryl carbonate, where the structural unit can be an endgroup. In a further embodiment, the endgroup is derived from an activated carbonate. Such endgroups can derive from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In an embodiment, the ester endgroup derived from a salicylic ester can be a residue of bis(methyl salicyl) carbonate (BMSC) or other substituted or unsubstituted bis(alkyl salicyl) carbonate such as bis(ethyl salicyl) carbonate, bis(propyl salicyl) carbonate, bis(phenyl salicyl) carbonate, bis(benzyl salicyl) carbonate, or the like. In a specific embodiment, where BMSC is used as the activated carbonyl source, the endgroup is derived from and is a residue of BMSC.

The cross-linkable polycarbonates of the present disclosure include homopolycarbonates, copolymers comprising different moieties in the carbonate (referred as "copolycarbonates"), copolymers comprising carbonate units and other types of polymer units such as polyester units, polysiloxane units, and combinations comprising at least one homopolycarbonate and copolycarbonate. For reference, the term "dipolymer" refers to copolymers derived specifically from two different monomers, and the term "terpolymer" refers to copolymers derived specifically from three different monomers The cross-linkable polycarbonate may thus comprise identical or different repeating units derived from one or more monomers (e.g. a second, third, fourth, fifth, sixth, etc., other monomer compound). The monomers of the cross-linkable polycarbonate may be randomly incorporated into the polycarbonate. For example, a cross-linkable polycarbonate copolymer of the present disclosure may be arranged in an alternating sequence following a statistical distribution, which is independent of the mole ratio of the structural units present in the polymer chain. A random cross-linkable polycarbonate copolymer may have a structure, which can be indicated by the presence of several block sequences (I-I) and (O-O) and alternate sequences (I-O) or (O-I), that follow a statistical distribution. In a random x:(1−x) copolymer, wherein x is the mole percent of a first monomer(s) and 1-x is the mole percent of the monomers, one can calculate the distribution of each monomer using peak area values determined by $^{13}C$ NMR, for example.

A cross-linkable polycarbonate copolymer of the present disclosure may have alternating I and O units (-I-O-I-O-I-O-I-O-), or I and O units arranged in a repeating sequence (e.g. a periodic copolymer having the formula: (I-O-I-O-O-I-I-I-I-O-O-O)n). The cross-linkable polycarbonate copolymer may be a statistical copolymer in which the sequence of monomer residues follows a statistical rule. For example, if the probability of finding a given type monomer residue at a particular point in the chain is equal to the mole fraction of that monomer residue in the chain, then the polymer may be referred to as a truly random copolymer. The cross-linkable polycarbonate copolymer may be a block copolymer that comprises two or more homopolymer subunits linked by covalent bonds (-I-I-I-I-I-O-O-O-O-O-). The union of the homopolymer subunits may require an intermediate non-repeating subunit, known as a junction block. Block copolymers with two or three distinct blocks are called diblock copolymers and triblock copolymers, respectively.

The cross-linkable polycarbonates of the present disclosure may include any suitable mole % of selected monomer units, with the proviso that the polycarbonates comprise a mol % (e.g., about 0.5 mol % to about 5 mol %) of endcap groups derived from a monohydroxybenzophenone. The polymers may comprise about 1% to about 99.5%, about 5% to about 95%, about 10% to about 90%, about 15% to about 85%, about 20% to about 80%, about 25% to about 75%, about 30% to about 70%, about 35% to about 65%, about 40% to about 60%, or about 45% to about 55% mole % of a selected monomer unit.

The cross-linkable polycarbonates of the present disclosure may have a glass transition temperature (Tg) of greater than 120° C., 125° C., 130° C., 135° C., 140° C., 145° C., 150° C., 155° C., 160° C., 165° C., 170° C., 175° C., 180° C., 185° C., 190° C., 200° C., 210° C., 220° C., 230° C., 240° C., 250° C., 260° C., 270° C., 280° C., 290° C., or 300° C., as measured using a differential scanning calorimetry method. In certain embodiments, the polycarbonates have glass transition temperatures ranging from about 120° C. to about 230° C., about 140° C. to about 160° C., about 145° C. to about 155° C., about 148° C. to about 152° C., or about 149° C. to about 151° C. In certain embodiments, the polycarbonates have glass transition temperatures of 149.0° C., 149.1° C., 149.2° C., 149.3° C., 149.4° C., 149.5° C., 149.6° C., 149.7° C., 149.8° C., 149.9° C., 150.0° C., 150.1° C., 150.2° C., 150.3° C., 150.4° C., 150.5° C., 150.6° C., 150.7° C., 150.8° C., 150.9° C., 151.0° C., 151.1° C., 151.2° C., 151.3° C., 151.4° C., 151.5° C., 151.6° C., 151.7° C., 151.8° C., 151.9° C., 152.0° C., 152.1° C., 152.2° C., 152.3° C., 152.4° C., 152.5° C., 152.6° C., 152.7° C., 152.8° C., 152.9° C., or 153.0° C.

The cross-linkable polycarbonates of the present disclosure may have a weight average molecular weight (Mw) of 15,000 to about 80,000 Daltons [±1,000 Daltons], or of 15,000 to about 35,000 Daltons [±1,000 Daltons], or of about 20,000 to about 30,000 Daltons [±1,000 Daltons]. In certain embodiments, the cross-linkable polycarbonates have weight average molecular weights of about 16,000 Daltons [±1,000 Daltons], about 17,000 Daltons [±1,000 Daltons], about 18,000 Daltons [±1,000 Daltons], about 19,000 Daltons [±1,000 Daltons], about 20,000 Daltons [±1,000 Daltons], about 21,000 Daltons [±1,000 Daltons], about 22,000 Daltons [±1,000 Daltons], about 23,000 Daltons [±1,000 Daltons], about 24,000 Daltons [±1,000 Daltons], about 25,000 Daltons [±1,000 Daltons], about 26,000 Daltons [±1,000 Daltons], about 27,000 Daltons [±1,000 Daltons], about 28,000 Daltons [±1,000 Daltons], about 29,000 Daltons [±1,000 Daltons], about 30,000 Daltons [±1,000 Daltons], about 31,000 Daltons [±1,000 Daltons], about 32,000 Daltons [±1,000 Daltons], about 33,000 Daltons [±1,000 Daltons], about 34,000 Daltons [±1,000 Daltons], or about 35,000 Daltons [±1,000 Daltons]. In additional embodiments, the cross-linkable polycarbonates have a Mw of 17,000 to about 80,000 Daltons. Molecular weight determinations may be performed using gel permeation chromatography (GPC), using a cross-linked styrene-divinylbenzene column and calibrated to polycarbonate references using a UV-VIS detector set at 264 nm. Samples may be prepared at a concentration of about 1 mg/ml, and eluted at a flow rate of about 1.0 ml/min.

The cross-linkable polycarbonates of the present disclosure may have a polydispersity index (PDI) of about 1.0 to about 10.0, about 2.0 to about 7.0, or about 3.0 to about 6.0, or about 3.0 to about 7.3, or about 2.4 to about 5.2. In certain embodiments, the polycarbonates have PDIs of about 2.50, about 3.00, about 3.50, about 4.00, about 4.50, about 5.00, about 5.50, about 6.00, about 6.50, about 7.00, or about 7.50.

It is noted that the molecular weight (both weight-average and number-average) of the photoactive additive/cross-linkable polycarbonate can be measured using two different kinds of detectors. More specifically, the molecular weight can be measured using an ultraviolet (UV) detector or using a refractive index (RI) detector, using GPC and calibrated to polycarbonate standards for both detectors. In this regard, the UV detector overweights the presence of low-molecular-weight chains due to the higher extinction coefficient of the monohydroxybenzophenone in the UV detector. This does not occur in the RI detector, and so the PDI as measured by the RI detector is always lower than the PDI as measured by the UV detector.

In embodiments, the ratio of the polydispersity index (PDI) measured using a UV detector to the PDI measured using an RI detector is 1.8 or less, when using a GPC method and polycarbonate molecular weight standards. The ratio may also be 1.5 or less, or 1.2 or less. The PDI ratio has a minimum value of 1.0. As described further herein, the process by which the cross-linkable polycarbonate is made can affect the PDI ratio between the UV detector and the RI detector.

The cross-linkable polycarbonates of the present disclosure may have a melt volume flow rate (often abbreviated MVR), which measures the rate of extrusion of a composition through an orifice at a prescribed temperature and load. In certain embodiments, the polycarbonates may have an MVR of 2 to 4 $cm^3$/10 min, 2 to 12 $cm^3$/10 min, 2 to 70 $cm^3$/10 min, 2 to 50 $cm^3$/10 min, 2 to 40 $cm^3$/10 min, 2 to 30 $cm^3$/10 min, 2 to 25 $cm^3$/10 min, 2 to 20 $cm^3$/10 min, 5 to 70 $cm^3$/10 min, 5 to 50 $cm^3$/10 min, 5 to 40 $cm^3$/10 min, 5 to 30 $cm^3$/10 min, 5 to 25 $cm^3$/10 min, 5 to 20 $cm^3$/10 min, 8 to 10 $cm^3$/10 min, 8 to 12 $cm^3$/10 min, 10 to 170 $cm^3$/10 min, 10 to 50 $cm^3$/10 min, 10 to 40 $cm^3$/10 min, 10 to 30 $cm^3$/10 min, 10 to 25 $cm^3$/10 min, or 10 to 20 $cm^3$/10 min, using the ASTM D1238 method, 1.2 kg load, 300° C. temperature, 360 second dwell. In certain embodiments, the polycarbonates may have an MVR measured using the ASTM D1238 method, 1.2 kg load, 300° C. temperature, 360 second dwell, of: 2.0 $cm^3$/10 min, 2.1 $cm^3$/10 min, 2.2 $cm^3$/10 min, 2.3 $cm^3$/10 min, 2.4 $cm^3$/10 min, 2.5 $cm^3$/10 min, 2.6 $cm^3$/10 min, 2.7 $cm^3$/10 min, 2.8 $cm^3$/10 min, 2.9 $cm^3$/10 min, 3.0 $cm^3$/10 min, 3.1 $cm^3$/10 min, 3.2 $cm^3$/10 min, 3.3 $cm^3$/10 min, 3.4 $cm^3$/10 min, 3.5 $cm^3$/10 min, 3.6 $cm^3$/10 min, 3.7 $cm^3$/10 min, 3.8 $cm^3$/10 min, 3.9 $cm^3$/10 min, 4.0 $cm^3$/10 min, 4.1 $cm^3$/10 min, 4.2 $cm^3$/10 min, 4.3 $cm^3$/10 min, 4.4 $cm^3$/10 min, 4.5 $cm^3$/10 min, 4.6 $cm^3$/10 min, 4.7 $cm^3$/10 min, 4.8 $cm^3$/10 min, 4.9 $cm^3$/10 min, 5.0 $cm^3$/10 min, 5.1 $cm^3$/10 min, 5.2 $cm^3$/10 min, 5.3 $cm^3$/10 min, 5.4 $cm^3$/10 min, 5.5 $cm^3$/10 min, 5.6 $cm^3$/10 min, 5.7 $cm^3$/10 min, 5.8 $cm^3$/10 min, 5.9 $cm^3$/10 min, 6.0 $cm^3$/10 min, 6.1 $cm^3$/10 min, 6.2 $cm^3$/10 min, 6.3 $cm^3$/10 min, 6.4 $cm^3$/10 min, 6.5 $cm^3$/10 min, 6.6 $cm^3$/10 min, 6.7 $cm^3$/10 min, 6.8 $cm^3$/10 min, 6.9 $cm^3$/10 min, 7.0 $cm^3$/10 min, 7.1 $cm^3$/10 min, 7.2 $cm^3$/10 min 7.3 $cm^3$/10 min, 7.4 $cm^3$/10 min, 7.5 $cm^3$/10 min, 7.6 $cm^3$/10 min, 7.7 $cm^3$/10 min, 7.8 $cm^3$/10 min, 7.9 $cm^3$/10 min, 8.0 $cm^3$/10 min, 8.1 $cm^3$/10 min, 8.2 $cm^3$/10 min, 8.3 $cm^3$/10 min, 8.4 $cm^3$/10 min, 8.5 $cm^3$/10 min, 8.6 $cm^3$/10 min, 8.7 $cm^3$/10 min, 8.8 $cm^3$/10 min, 8.9 $cm^3$/10 min, 9.0 $cm^3$/10 min, 9.1 $cm^3$/10 min, 9.2 $cm^3$/10 min, 9.3 $cm^3$/10 min, 9.4 $cm^3$/10 min, 9.5 $cm^3$/10 min, 9.6 $cm^3$/10 min, 9.7 $cm^3$/10 min, 9.8 $cm^3$/10 min, 9.9 $cm^3$/10 min, 10.0 $cm^3$/10 min, 10.1 $cm^3$/10 min, 10.2 $cm^3$/10 min, 10.3 $cm^3$/10 min, 10.4 $cm^3$/10 min, 10.5 $cm^3$/10 min, 10.6 $cm^3$/10 min, 10.7 $cm^3$/10 min, 10.8 $cm^3$/10 min, 10.9 $cm^3$/10 min, 11.0 $cm^3$/10 min, 11.1 $cm^3$/10 min, 11.2 $cm^3$/10 min, 11.3 $cm^3$/10 min, 11.4 $cm^3$/10 min, 11.5 $cm^3$/10 min, 11.6 $cm^3$/10 min, 11.7 $cm^3$/10 min, 11.8 $cm^3$/10 min, 11.9 $cm^3$/10 min, 12.0 $cm^3$/10 min, 12.1 $cm^3$/10 min, 12.2 $cm^3$/10 min, 12.3 $cm^3$/10 min, 12.4 $cm^3$/10 min, 12.5 $cm^3$/10 min, 12.6 $cm^3$/10 min, 12.7 $cm^3$/10 min, 12.8 $cm^3$/10 min, 12.9 $cm^3$/10 min, 13.0 $cm^3$/10 min, 13.1 $cm^3$/10 min, 13.2 $cm^3$/10 min, 13.3 $cm^3$/10 min, 13.4 $cm^3$/10 min, 13.5 $cm^3$/10 min, 13.6 $cm^3$/10 min, 13.7 $cm^3$/10 min, 13.8 $cm^3$/10 min, 13.9 $cm^3$/10 min, 14.0 $cm^3$/10 min, 14.1 $cm^3$/10 min, 14.2 $cm^3$/10 min, 14.3 $cm^3$/10 min, 14.4 $cm^3$/10 min, 14.5 $cm^3$/10 min, 14.6 $cm^3$/10 min, 14.7 $cm^3$/10 min, 14.8 $cm^3$/10 min, 14.9 $cm^3$/10 min, 15.0 $cm^3$/10 min, 15.1 $cm^3$/10 min, 15.2 $cm^3$/10 min, 15.3 $cm^3$/10 min, 15.4 $cm^3$/10 min, 15.5 $cm^3$/10 min, 15.6 $cm^3$/10 min, 15.7 $cm^3$/10 min, 15.8 $cm^3$/10 min, 15.9 $cm^3$/10 min, 16.0 $cm^3$/10 min, 16.1 $cm^3$/10 min, 16.2 $cm^3$/10 min, 16.3 $cm^3$/10 min, 16.4 $cm^3$/10 min, 16.5 $cm^3$/10 min, 16.6 $cm^3$/10 min, 16.7 $cm^3$/10 min, 16.8 $cm^3$/10 min, 16.9 $cm^3$/10 min, 17.0 $cm^3$/10 min, 17.1 $cm^3$/10 min, 17.2 $cm^3$/10 min, 17.3 $cm^3$/10 min, 17.4 $cm^3$/10 min, 17.5 $cm^3$/10 min, 17.6 $cm^3$/10 min, 17.7 $cm^3$/10 min, 17.8 $cm^3$/10 min, 17.9 $cm^3$/10 min, 18.0 $cm^3$/10 min, 18.1 $cm^3$/10 min, 18.2 $cm^3$/10 min, 18.3 $cm^3$/10 min, 18.4 $cm^3$/10 min, 18.5 $cm^3$/10 min, 18.6 $cm^3$/10 min 18.7 $cm^3$/10 min, 18.8 $cm^3$/10 min, 18.9 $cm^3$/10 min, 19.0 $cm^3$/10 min, 19.1 $cm^3$/10 min, 19.2 $cm^3$/10 min, 19.3 $cm^3$/10 min, 19.4 $cm^3$/10 min, 19.5 $cm^3$/10 min, 19.6 $cm^3$/10 min, 19.7 $cm^3$/10 min, 19.8 $cm^3$/10 min, 19.9 $cm^3$/10 min, 20.0 $cm^3$/10 min, 20.1 $cm^3$/10 min, 20.2 $cm^3$/10 min, 20.3 $cm^3$/10 min, 20.4 $cm^3$/10 min, 20.5 $cm^3$/10 min, 20.6 $cm^3$/10 min, 20.7 $cm^3$/10 min, 20.8 $cm^3$/10 min, 20.9 $cm^3$/10 min, 21.0 $cm^3$/10 min, 21.1 $cm^3$/10 min, 21.2 $cm^3$/10 min, 21.3 $cm^3$/10 min, 21.4 $cm^3$/10 min, 21.5 $cm^3$/10 min, 21.6 cm³/10 min, 21.7 cm³/10 min, 21.8 cm³/10 min, 21.9 cm³/10 min, 22.0 cm³/10 min, 22.1 cm³/10 min, 22.2 cm³/10 min, 22.3 cm³/10 min, 22.4 cm³/10 min, 22.5 cm³/10 min, 22.6 cm³/10 min, 22.7 cm³/10 min, 22.8 cm³/10 min, 22.9 cm³/10 min, 23.0 cm³/10 min, 23.1 cm³/10 min, 23.2 cm³/10 min, 23.3 cm³/10 min, 23.4 cm³/10 min, 23.5 cm³/10 min, 23.6 cm³/10 min, 23.7 cm³/10 min, 23.8 cm³/10 min, 23.9 cm³/10 min, 24.0 cm³/10 min, 24.1 cm³/10 min, 24.2 cm³/10 min, 24.3 cm³/10 min, 24.4 cm³/10 min, 24.5 cm³/10 min, 24.6 cm³/10 min, 24.7 cm³/10 min, 24.8 cm³/10 min, 24.9 cm³/10 min, 25.0 cm³/10 min, 25.1 cm³/10 min, 25.2 cm³/10 min, 25.3 cm³/10 min, 25.4 cm³/10 min, 25.5 cm³/10 min, 25.6 cm³/10 min, 25.7 cm³/10 min, 25.8 cm³/10 min, 25.9 cm³/10 min, 26.0 cm³/10 min, 26.1 cm³/10 min, 26.2 cm³/10 min, 26.3 cm³/10 min, 26.4 cm³/10 min, 26.5 cm³/10 min, 26.6 cm³/10 min, 26.7 cm³/10 min, 26.8 cm³/10 min, 26.9 cm³/10 min, 27.0 cm³/10 min, 27.1 cm³/10 min, 27.2 cm³/10 min, 27.3 cm³/10 min, 27.4 cm³/10 min, 27.5 cm³/10 min, 27.6 cm³/10 min, 27.7 cm³/10 min, 27.8 cm³/10 min, 27.9 cm³/10 min, 28.0 cm³/10 min, 28.1 cm³/10 min, 28.2 cm³/10 min, 28.3 cm³/10 min, 28.4 cm³/10 min, 28.5 cm³/10 min, 28.6 cm³/10 min, 28.7 cm³/10 min, 28.8 cm³/10 min, 28.9 cm³/10 min, 29.0 cm³/10 min, 29.1 cm³/10 min, 29.2 cm³/10 min, 29.3 cm³/10 min, 29.4 cm³/10 min, 29.5 cm³/10 min, 29.6 cm³/10 min, 29.7 cm³/10 min, 29.8 cm³/10 min, 29.9 cm³/10 min, 30.0 cm³/10 min, 30.1 cm³/10 min, 30.2 cm³/10 min, 30.3 cm³/10 min, 30.4 cm³/10 min, 30.5 cm³/10 min, 30.6 cm³/10 min, 30.7 cm³/10 min, 30.8 cm³/10 min, 30.9 cm³/10 min, 31.0 cm³/10 min, 31.1 cm³/10 min, 31.2 cm³/10 min, 31.3 cm³/10 min, 31.4 cm³/10 min, 31.5 cm³/10 min, 31.6 cm³/10 min, 31.7 cm³/10 min, 31.8 cm³/10 min, 31.9 cm³/10 min, 32.0 cm³/10 min, 32.1 cm³/10 min, 32.2 cm³/10 min, 32.3 cm³/10 min, 32.4 cm³/10 min, 32.5 cm³/10 min, 32.6 cm³/10 min, 32.7 cm³/10 min, 32.8 cm³/10 min, 32.9 cm³/10 min, 33.0 cm³/10 min, 33.1 cm³/10 min, 33.2 cm³/10 min, 33.3 cm³/10 min, 33.4 cm³/10 min, 33.5 cm³/10 min, 33.6 cm³/10 min, 33.7 cm³/10 min, 33.8 cm³/10 min, 33.9 cm³/10 min, 34.0 cm³/10 min, 34.1 cm³/10 min, 34.2 cm³/10 min, 34.3 cm³/10 min, 34.4 cm³/10 min, 34.5 cm³/10 min, 34.6 cm³/10 min, 34.7 cm³/10 min, 34.8 cm³/10 min, 34.9 cm³/10 min, or 35.0 cm³/10 min.

The cross-linkable polycarbonates of the present disclosure may have a biocontent of 2 weight % to 90 weight %; 5 weight % to 25 weight %; 10 weight % to 30 weight %; 15 weight % to 35 weight %; 20 weight % to 40 weight %; 25 weight % to 45 weight %; 30 weight % to 50 weight %; 35 weight % to 55 weight %; 40 weight % to 60 weight %; 45 weight % to 65 weight %; 55 weight % to 70% weight %; 60 weight % to 75 weight %; 50 weight % to 80 weight %; or 50 weight % to 90 weight %. The biocontent may be measured according to ASTM D6866.

The cross-linkable polycarbonates of the present disclosure may have a modulus of elasticity of greater than or equal to 2200 megapascals (MPa), greater than or equal to 2310 MPa, greater than or equal to 2320 MPa, greater than or equal to 2330 MPa, greater than or equal to 2340 MPa, greater than or equal to 2350 MPa, greater than or equal to 2360 MPa, greater than or equal to 2370 MPa, greater than or equal to 2380 MPa, greater than or equal to 2390 MPa, greater than or equal to 2400 MPa, greater than or equal to 2420 MPa, greater than or equal to 2440 MPa, greater than or equal to 2460 MPa, greater than or equal to 2480 MPa, greater than or equal to 2500 MPa, or greater than or equal to 2520 MPa as measured by ASTM D 790 at 1.3 mm/min, 50 mm span.

In an embodiment the cross-linkable polycarbonates of the present disclosure may have a flexural modulus of 2,200 to 2,500, preferably 2,250 to 2,450, more preferably 2,300 to 2,400 MPa. The flexural modulus is also measured by ASTM D790.

In another embodiment the cross-linkable polycarbonates of the present disclosure may have a flexural modulus of 2,300 to 2,600, preferably 2,400 to 2,600, more preferably 2,450 to 2,550 MPa.

The cross-linkable polycarbonates of the present disclosure may have a tensile strength at break of greater than or equal to 60 megapascals (MPa), greater than or equal to 61 MPa, greater than or equal to 62 MPa, greater than or equal to 63 MPa, greater than or equal to 64 MPa, greater than or equal to 65 MPa, greater than or equal to 66 MPa, greater than or equal to 67 MPa, greater than or equal to 68 MPa, greater than or equal to 69 MPa, greater than or equal to 70 MPa, greater than or equal to 71 MPa, greater than or equal to 72 MPa, greater than or equal to 73 MPa, greater than or equal to 74 MPa, greater than or equal to 75 MPa as measured by ASTM D 638 Type I at 50 mm/min.

The cross-linkable polycarbonates of the present disclosure may possess a ductility of greater than or equal to 60%, greater than or equal to 65%, greater than or equal to 70%, greater than or equal to 75%, greater than or equal to 80%, greater than or equal to 85%, greater than or equal to 90%, greater than or equal to 95%, or 100% in a notched izod test at −20° C., −15° C., −10° C., 0° C., 5° C., 10° C., 15° C., 20° C., 23° C., 25° C., 30° C., or 35° C. at a thickness of 3.2 mm according to ASTM D 256-10.

The cross-linkable polycarbonates of the present disclosure may have a notched Izod impact strength (NII) of greater than or equal to 500 J/m, greater than or equal to 550 J/m, greater than or equal to 600 J/m, greater than or equal to 650 J/m, greater than or equal to 700 J/m, greater than or equal to 750 J/m, greater than or equal to 800 J/m, greater than or equal to 850 J/m, greater than or equal to 900 J/m, greater than or equal to 950 J/m, or greater than or equal to 1000 J/m, measured at 23° C. according to ASTM D 256.

The cross-linkable polycarbonates of the present disclosure may have a heat distortion temperature of greater than or equal to 110° C., 111° C., 112° C., 113° C., 114° C., 115° C., 116° C., 117° C., 118° C., 119° C., 120° C., 121° C., 122° C., 123° C., 124° C., 125° C., 126° C., 127° C., 128° C., 129° C., 130° C., 131° C., 132° C., 133° C., 134° C., 135° C., 136° C., 137° C., 138° C., 139° C., 140° C., 141° C., 142° C., 143° C., 144° C., 145° C., 146° C., 147° C., 148° C., 149° C., 150° C., 151° C., 152° C., 153° C., 154° C., 155° C., 156° C., 157° C., 158° C., 159° C., 160, 161° C., 162° C., 163° C., 164° C., 165° C., 166° C., 167° C., 168° C., 169° C., or 170° C., as measured according to ASTM D 648 at 1.82 MPa, with 3.2 mm thick unannealed mm bar.

The cross-linkable polycarbonates of the present disclosure may have a percent haze value of less than or equal to 10.0%, less than or equal to 8.0%, less than or equal to 6.0%, less than or equal to 5.0%, less than or equal to 4.0%, less than or equal to 3.0%, less than or equal to 2.0%, less than or equal to 1.5%, less than or equal to 1.0%, or less than or equal to 0.5% as measured at a certain thickness according to ASTM D 1003-07. The polycarbonate haze may be measured at a 2.0, 2.2, 2.4, 2.54, 2.6, 2.8, 3.0, 3.2, 3.4, 3.6, 3.8, or a 4.0 millimeter thickness. The polycarbonate may be measured at a 0.125 inch thickness.

The polycarbonate may have a light transmittance greater than or equal to 50%, greater than or equal to 60%, greater than or equal to 65%, greater than or equal to 70%, greater than or equal to 75%, greater than or equal to 80%, greater than or equal to 85%, greater than or equal to 90%, greater than or equal to 95%, greater than or equal to 96%, greater than or equal to 97%, greater than or equal to 98%, greater than or equal to 99%, greater than or equal to 99.1%, greater than or equal to 99.2%, greater than or equal to 99.3%, greater than or equal to 99.4%, greater than or equal to 99.5%, greater than or equal to 99.6%, greater than or equal to 99.7%, greater than or equal to 99.8%, or greater than or equal to 99.9%, as measured at certain thicknesses according to ASTM D 1003-07. The polycarbonate transparency may be measured at a 2.0, 2.2, 2.4, 2.6, 2.8, 3.0, 3.2, 3.4, 3.6, 3.8, or a 4.0 millimeter thickness.

In certain embodiments, the cross-linkable polycarbonates of the present disclosure do not include soft block or soft aliphatic segments in the polycarbonate chain. For example, the following aliphatic soft segments that may be excluded from the cross-linkable polycarbonates of the present disclosure include aliphatic polyesters, aliphatic polyethers, aliphatic polythioeithers, aliphatic polyacetals, aliphatic polycarbonates, C-C linked polymers and polysiloxanes. The soft segments of aliphatic polyesters, aliphatic polyethers, aliphatic polythioeithers, aliphatic polyacetals, aliphatic polycarbonates may be characterized as having Number Average MWs (Mns) of greater than 600.

In certain embodiments, the cross-linkable polycarbonates of the present disclosure do not include units derived from aromatic di-, tri-, or tetrahydroxyketones.

In certain embodiments, the cross-linkable polycarbonates of the present disclosure do not include units derived from dihydroxybenzophenone monomers, trihydroxybenzophenone monomers, tetrahydroxybenzophenone monomers, or other multiple-hydroxybenzophenone monomers. For example, the following monomer units may be excluded from use in the cross-linkable and cross-linked polycarbonates of the present disclosure: 4,4'-dihydroxybenzophenone, 2,4-dihydroxybenzophenone, and 4-(α,α-bis(4-hydroxyphenyl)ethyl-benzophenone.

In particular embodiments, the photoactive additive is a non-cross-linked (i.e. cross-linkable) polycarbonate having the structure of Formula (I):

wherein $R^1$ and $R^2$ are independently halogen, $C_{1-6}$ alkyl, $C_{3-8}$ cycloalkyl, aryl, or arylalkyl; x is an integer from 0 to 4; y is an integer from 0 to 5; n' is an integer from 29 to 65; and the repeating unit is derived from:
(i) a monomer having the structure:

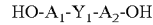

wherein each of $A_1$ and $A_2$ comprise a monocyclic divalent arylene group, and $Y_1$ is a bridging group having one or more atoms; or
(ii) a monomer having the structure:

each $R^k$ is independently halogen, a $C_{1-10}$ hydrocarbon group, or a halogen substituted $C_{1-10}$ hydrocarbon group; and n is 0 to 4. In more particular embodiments, the repeating unit W is derived from bisphenol-A.

In more specific embodiments, the non-cross-linked (i.e. cross-linkable) polycarbonate has the structure of Formula (II):

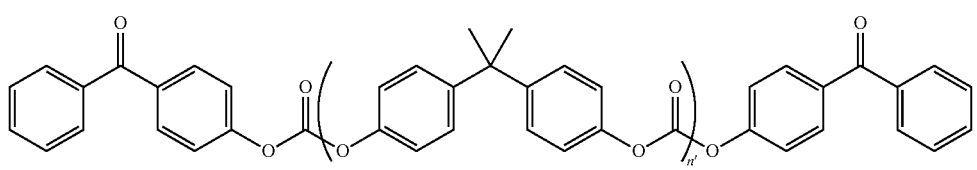

Formula (II)

wherein n' ranges from 29 to 65.

In particular embodiments, the photoactive cross-linkable polycarbonate contains about 0.5 mol % of endcaps derived from a monohydroxybenzophenone, and has a weight-average molecular weight (Mw) from 17,000 to 30,000 Daltons. In other specific embodiments, the photoactive cross-linkable polycarbonate contains about 2.5 mol % of endcaps derived from a monohydroxybenzophenone, and has a weight-average molecular weight (Mw) from 24,000 to 31,000 Daltons. In still other definite embodiments, the photoactive cross-linkable polycarbonate has an MVR of 8 to 10 cc/10 min at 300° C./1.2 kg, and can achieve UL94 V0 performance at a thickness of 2.0 mm.

An interfacial polycondensation polymerization process for bisphenol-A (BPA) based polycarbonates can be used to prepare the photoactive additives (PAAs) of the present disclosure. Although the reaction conditions for interfacial polymerization can vary, an exemplary process generally involves dissolving or dispersing one or more dihydric phenol reactants (e.g. bisphenol-A) in aqueous caustic soda

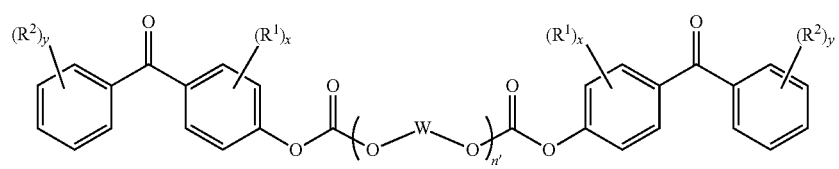

Formula (I)

or potash, adding the resulting mixture to a water-immiscible solvent medium, and contacting the reactants with a carbonate precursor (e.g. phosgene) in the presence of a catalyst (e.g. triethylamine, TEA) under controlled pH conditions, e.g., 8 to 11.

Four different processes are disclosed herein for producing some embodiments of the photoactive additive which contain carbonate linkages. Each process includes the following ingredients: a monohydroxy compound, a polyhydroxy compound, a carbonate precursor, a tertiary amine catalyst, water, and a water-immiscible organic solvent. The monohydroxy compound is the photoactive moiety. It should be noted that more than one of each ingredient can be used to produce the photoactive additive. For example, both bisphenol-A and trishydroxyphenylethane (THPE) would be considered polyhydroxy compounds (though one is a diol chain extender and the other is a branching agent). Some information on each ingredient is first provided below.

The monohydroxy compound is the photoactive moiety previously described. For example, the monohydroxy compound can have the structure of any one of Formulas (1), (3), or (5)-(10). The monohydroxy compound acts as an endcapping agent, and the previously described endcapping agents (e.g. p-cumyl phenol) could also be used. If desired, more than one monohydroxy compound can be used. In particular embodiments for producing a cross-linkable polycarbonate, the monohydroxy compound is a monohydroxybenzophenone of Formula (1).

The term "polyhydroxy compound" here refers to a compound having two or more hydroxyl groups. In contrast, the term "dihydroxy compound" refers to a compound having only two hydroxyl groups. The polyhydroxy compound can be a dihydroxy compound having the structure of any one of Formulas (B)-(H), which are chain extenders, and include monomers such as bisphenol-A. In addition, the secondary linker moieties of any one of Formulas (43)-(49) can be considered a polyhydroxy compound, and are useful as branching agents. If desired, more than one polyhydroxy compound can be used. See, for example, the reaction in FIG. 5. In the cross-linkable polycarbonates of the present disclosure, bisphenol-A is typically used.

The carbonate precursor may be, for example, a carbonyl halide such as carbonyl dibromide or carbonyl dichloride (also known as phosgene), or a haloformate such as a bishaloformate of a dihydric phenol (e.g., the bischloroformate of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In certain embodiments, the carbonate precursor is phosgene, a triphosgene, diacyl halide, dihaloformate, dicyanate, diester, diepoxy, diarylcarbonate, dianhydride, dicarboxylic acid, diacid chloride, or any combination thereof. An interfacial polymerization reaction to form carbonate linkages may use phosgene as a carbonate precursor, and is referred to as a phosgenation reaction. Many such carbonate precursors correspond to a structure of Formulas (30)-(35).

A tertiary amine catalyst is used for polymerization. Exemplary tertiary amine catalysts that can be used are aliphatic tertiary amines such as triethylamine (TEA), tributylamine, cycloaliphatic amines such as N,N-diethyl-cyclohexylamine and aromatic tertiary amines such as N,N-dimethylaniline.

Sometimes, a phase transfer catalyst is also used. Among the phase transfer catalysts that can be used are catalysts of the formula $(R^{30})_4Q^+X$, wherein each $R^{30}$ is the same or different, and is a $C_1$-$C_{10}$ alkyl group; Q is a nitrogen or phosphorus atom; and X is a halogen atom, $C_1$-$C_8$ alkoxy group, or $C_6$-$C_{18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_1$-$C_8$ alkoxy group or a $C_6$-$C_{18}$ aryloxy group, such as methyltributylammonium chloride.

The most commonly used water-immiscible solvents include methylene chloride, 1,2-dichloroethane, chlorobenzene, toluene, and the like.

In the first process, sometimes referred to as the "upfront" process, all of the hydroxy compounds, catalysts, water, and water-immiscible solvent are combined upfront in a vessel to form a reaction mixture. The reaction mixture is then exposed to the carbonate precursor, for example by phosgenation, to obtain the photoactive additive.

In the second process, also known as the "solution addition" process, the polyhydroxy compound(s), tertiary amine catalyst, water, and water-immiscible solvent are combined in a vessel to form a reaction mixture. The carbonate precursor is then added to this reaction mixture in the vessel over a first time period. During this time period, the monohydroxy compound is added in a controlled manner to the reaction mixture as well, also referred to as programmed addition. The addition of the monohydroxy compound occurs throughout the first time period, rather than as a bolus at one time point (as in the upfront process). The photoactive additive is thus obtained.

The third process is also referred to as a bis-chloroformate (BCF) process. Bischloroformate oligomers are prepared by reacting the carbonate precursor, specifically phosgene, with the polyhydroxy compound(s) in the absence of the tertiary amine catalyst. After the bischloroformate oligomers are generated, the monohydroxy compound is added to the chloroformate mixture. The reaction is allowed to proceed, and the tertiary amine catalyst is added to complete the reaction.

The fourth process uses a tubular reactor. In the tubular reactor, the monohydroxy compound is pre-reacted with the carbonate precursor (specifically phosgene) to form chloroformates. The water-immiscible solvent is used as a solvent in the tubular reactor. In a separate reactor, the polyhydroxy compound, tertiary amine catalyst, water, and water-immiscible solvent are combined to form a reaction mixture. The chloroformates in the tubular reactor are then fed into the reactor over a first time period along with additional carbonate precursor to complete the reaction.

The resulting photoactive additive (e.g. the cross-linkable polycarbonate) contains only a small amount of low-molecular-weight components. This can be measured in two different ways: the level of diarylcarbonates and the lows percentage can be measured. Diarylcarbonates are formed by the reaction of two monohydroxybenzophenones with phosgene, creating a small molecule that contains no chain extender (e.g. bisphenol-A). In embodiments, the resulting photoactive additive contains less than 1900 ppm of diarylcarbonates. In more specific embodiments, the photoactive additive contains less than 700 ppm, or about 100 ppm or less of diarylcarbonates. The lows percentage is the percentage by weight of oligomeric chains having a molecular weight of less than 1000. In embodiments, the lows percentage is 2.0 wt % or less, or 1.5 wt % or less, including from about 1.0 wt % to 1.5 wt %, or from about 1.0 wt % to 1.7 wt %, or from about 1.0 wt % to 2.0 wt %. Also of note is that the resulting photoactive additive does not contain any residual pyridine, because pyridine is not used in the manufacture of the photoactive additive.

The ratio of the polydispersity index (PDI) measured using a UV detector to the PDI measured using an RI detector may be 1.8 or less, when using a GPC method and polycarbonate molecular weight standards, or may be 1.5 or less, or 1.2 or less.

Second Polymer Resin

The photoactive additives described above are blended with a polymer resin that is different from the photoactive additive, i.e. a second polymer resin, to form the blends of the present disclosure. In embodiments, the weight ratio of the photoactive additive to the polymer resin is from 1:99 to 99:1, including from about 50:50 to about 85:15.

The blends may be subjected to cross-linking conditions (e.g., UV-radiation) to affect cross-linking of the photoactive additives in the blend. Accordingly, blend compositions of the invention include blends prior to and after cross-linking.

The blends may comprise one or more distinct cross-linkable polycarbonates, as described herein, and/or one or more cross-linked polycarbonates, as described herein, as the photoactive additive. The blends also comprise one or more additional polymers. The blends may comprise additional components, such as one or more additives. In certain embodiments, a blend comprises a cross-linkable and/or cross-linked polycarbonate (Polymer A) and a second polymer (Polymer B), and optionally one or more additives. In another embodiment, a blend comprises a combination of a cross-linkable and/or cross-linked polycarbonate (Polymer A); and a second polycarbonate (Polymer B), wherein the second polycarbonate is different from the first polycarbonate.

In a preferred embodiment, the blend compositions disclosed herein comprise a flame-retardant/anti-drip agent, a flame retardant additive, and/or an impact modifier. The flame-retardant/anti-drip agent may be potassium perfluorobutane sulfonate (Rimar salt), potassium diphenyl sulfone-3-sulfonate (KSS), or a combination thereof.

The second polymer (Polymer B) may be any polymer different from the first polymer that is suitable for use in a blend composition. In certain embodiments, the second polymer may be a polycarbonate, a polyester, a polysiloxane-co-bisphenol-A polycarbonate, a polyesteramide, a polyimide, a polyetherimide, a polyamideimide, a polyether, a polyethersulfone, a polyepoxide, a polylactide, a polylactic acid (PLA), or any combination thereof.

In certain embodiments, the second polymer may be a vinyl polymer, a rubber-modified graft copolymer, an acrylic polymer, polyacrylonitrile, a polystyrene, a polyolefin, a polyester, a polyesteramide, a polysiloxane, a polyurethane, a polyamide, a polyamideimide, a polysulfone, a polyepoxide, a polyether, a polyimide, a polyetherimide, a polyphenylene ether, a polyphenylene sulfide, a polyether ketone, a polyether ether ketone, an ABS resin, an ASA resin, a polyethersulfone, a polyphenylsulfone, a poly(alkenylaromatic) polymer, a polybutadiene, a polyacetal, a polycarbonate, a polyphenylene ether, an ethylene-vinyl acetate copolymer, a polyvinyl acetate, a liquid crystal polymer, an ethylene-tetrafluoroethylene copolymer, an aromatic polyester, a polyvinyl fluoride, a polyvinylidene fluoride, a polyvinylidene chloride, tetrafluoroethylene, a polylactide, a polylactic acid (PLA), a polycarbonate-polyorganosiloxane block copolymer, or a copolymer comprising: (i) an aromatic ester, (ii) an estercarbonate, and (iii) carbonate repeat units. The blend composition may comprise additional polymers (e.g. a third, fourth, fifth, sixth, etc., polymer).

In certain embodiments, the second polymer may be a homopolycarbonate, a copolycarbonate, a polycarbonate-polysiloxane copolymer, a polyester-polycarbonate, or any combination thereof. In certain embodiments, the second polycarbonate is a p-cumyl phenol capped poly(isophthalate-terephthalate-resorcinol ester)-co-(bisphenol-A carbonate) copolymer. In certain embodiments, the second polycarbonate is a polycarbonate-polysiloxane copolymer.

The p-cumyl phenol capped poly(isophthalate-terephthalate-resorcinol ester)-co-(bisphenol-A carbonate) polymer or a polycarbonate-polysiloxane copolymer may have a polysiloxane content from 0.4 wt % to 25 wt %. In one preferred embodiment, the second polymer is a p-cumyl-phenol capped poly(19 mol % isophthalate-terephthalate-resorcinol ester)-co-(75 mol % bisphenol-A carbonate)-co-(6 mol % resorcinol carbonate) copolymer (MW=29,000 Daltons). In another preferred embodiment, the second polymer is a p-cumylphenol capped poly(10 wt % isophthalate-terephthalate-resorcinol ester)-co-(87 wt % bisphenol-A carbonate)-co-(3 mol % resorcinol carbonate) copolymer (MW=29,000 Daltons).

In another preferred embodiment, the second polymer is a polycarbonate polysiloxane copolymer. The polycarbonate-polysiloxane copolymer may be a siloxane block co-polycarbonate comprising from about 6 wt % siloxane (±10%) to about 20 wt % siloxane (±10%), and having a siloxane chain length of 10 to 200. In another preferred embodiment, the second polymer is a PC-siloxane copolymer with 20% siloxane segments by weight. In another preferred embodiment, the second polymer is a p-cumyl-phenol capped poly(65 mol % BPA carbonate)-co-(35 mol % 3,3-bis(4-hydroxyphenyl)-2-phenylisoindolin-1-one (PP-PBP) carbonate) copolymer (MW=25,000 Daltons).

In another preferred embodiment, the second polymer is a polyphosphonate polymer, a polyphosphonate copolymer, or a poly(polyphosphonate)-co-(BPA carbonate) copolymer.

In yet other embodiments, the polymer resin in the blend is selected from the group consisting of a polycarbonate-polysiloxane copolymer; a polycarbonate resin having an aliphatic chain containing at least two carbon atoms as a repeating unit in the polymer backbone; an ethylene-acrylic ester-glycidyl acrylate terpolymer; a polyethylene terephthalate polymer; a bisphenol-A homopolymer; a polystyrene polymer; a poly(methyl methacrylate) polymer; a thermoplastic polyester; a polybutylene terephthalate polymer; a methyl methacrylate-butadiene-styrene copolymer; an acrylonitrile-butadiene-styrene copolymer; or a dimethyl bisphenol cyclohexane-co-bisphenol-A copolymer.

In particular embodiments, the polymer resin in the blend is a polycarbonate-polysiloxane (PC—Si) copolymer. The polycarbonate units of the copolymer are derived from dihydroxy compounds having the structures of any of the formulas described above, but particularly those of the chain extenders of Formulas (B) and (C) when Z is hydroxyl. Some illustrative examples of suitable dihydroxy compounds include the following: 1,1-bis(4-hydroxyphenyl) methane, 1,1-bis(4-hydroxyphenyl) ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane; resorcinol, substituted resorcinol compounds such as 5-methyl resorcinol, 5-phenyl resorcinol, or 5-cumyl resorcinol; catechol; hydroquinone; and substituted hydroquinones such as 2-methyl hydroquinone, 2-t-butyl hydroquinone, 2-phenyl hydroquinone, 2-cumyl hydroquinone, or 2,3,5,6-tetramethyl hydroquinone. Bisphenol-A is often part of the PC—Si copolymer.

The polysiloxane blocks of the copolymer can be derived from siloxane-containing dihydroxy monomers. One exemplary siloxane monomer has the structure of Formula (D-1):

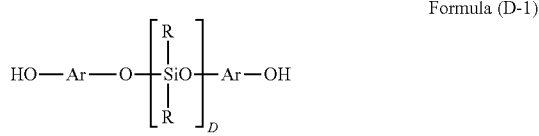

Formula (D-1)

wherein each Ar is independently aryl; each R is independently alkyl, alkoxy, alkenyl, alkenyloxy, aryl, aryloxy, arylalkyl, or alkylaryl; and D is an average value of 2 to about 1000, specifically about 2 to about 500, more specifically about 10 to about 75. Compounds of this formula may be obtained by the reaction of a dihydroxyaromatic compound with, for example, an alpha, omega-bis-acetoxy-polydiorganosiloxane under phase transfer conditions.

Another exemplary siloxane monomer has the structure of Formula (D-3):

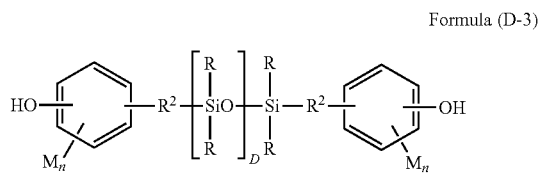

Formula (D-3)

wherein each R is independently alkyl, alkoxy, alkenyl, alkenyloxy, aryl, aryloxy, arylalkyl, or alkylaryl; and D is an average value of 2 to about 1000, specifically about 2 to about 500, more specifically about 10 to about 75; each M is independently cyano, nitro, alkyl, alkoxy, alkenyl, alkenyloxy, aryl, aryloxy, arylalkyl, or alkylaryl; each n is independently an integer from 0 to 4; and each $R_2$ is independently an aliphatic group. Compounds of this formula may be obtained by the reaction of a siloxane hydride with an aliphatically unsaturated monohydric phenol. Suitable aliphatically unsaturated monohydric phenols include, for example, eugenol, 2-alkylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. Mixtures comprising at least one of the foregoing may also be used.

Figure 7:
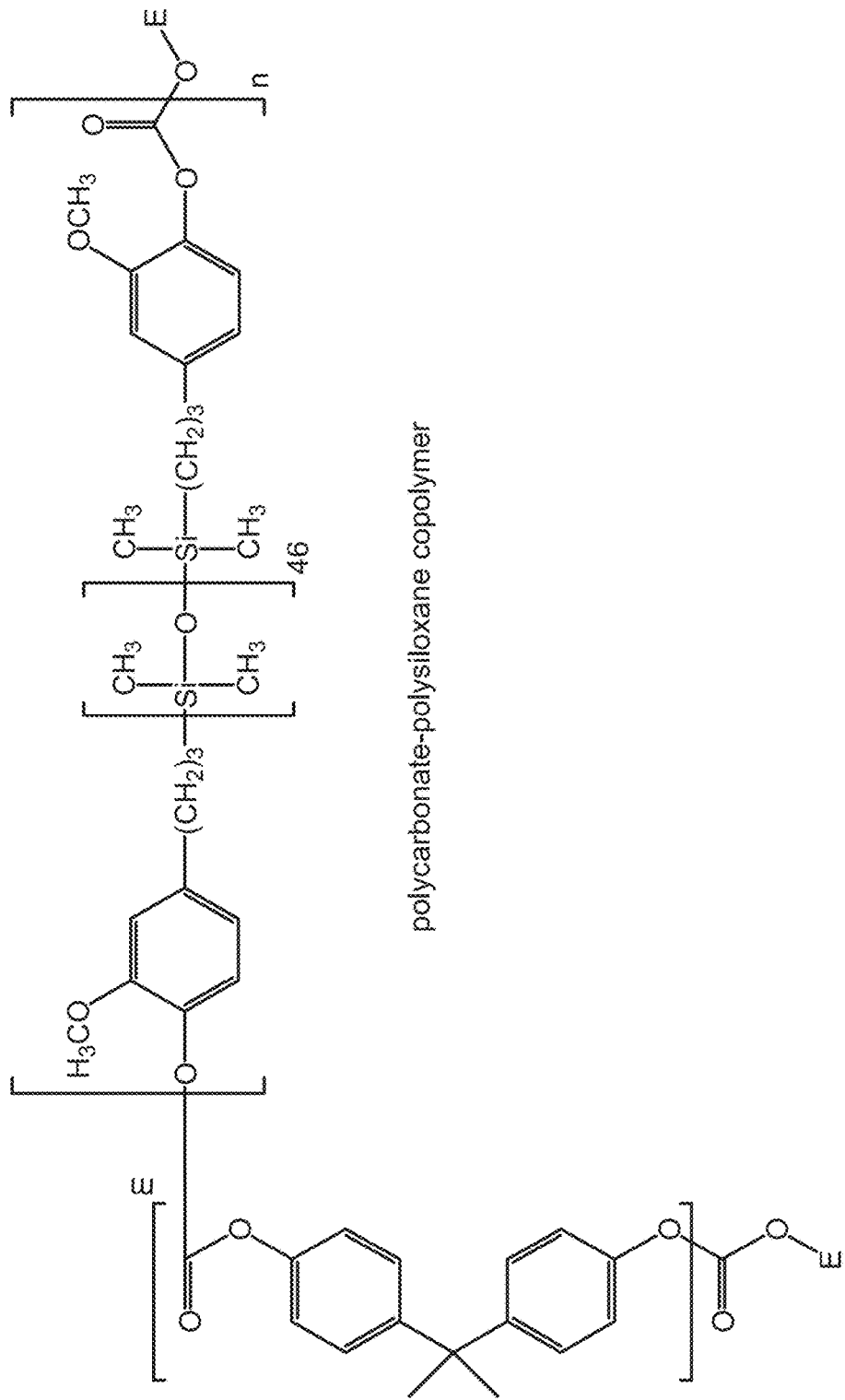
FIG. 7 illustrates an exemplary polycarbonate-polysiloxane copolymer used in the blends of the present disclosure.

FIG. 7 illustrates an exemplary polycarbonate-polysiloxane (PC—Si) copolymer. This copolymer includes polycarbonate units derived from bisphenol-A, polysiloxane units, and two endcaps E. It should be noted that the notation used here is intended to report the relative molar amounts between the polycarbonate units and the polysiloxane units, and should not be construed as denoting the structure of the copolymer (i.e. these two units are randomly distributed and are not blocks). The molar ratio of polycarbonate to polysiloxane in the copolymer is m:n. PC—Si copolymers are commercially available as LEXAN EXL from SABIC Innovative Plastics.

The polymer resin (polymer B) in the blend can be a polycarbonate resin having an aliphatic chain containing at least two carbon atoms as a repeating unit in the polymer backbone. This resin can also be considered a "soft segment polycarbonate" (SSP) resin. Generally speaking, the SSP resin is a copolymer of an aromatic difunctional compound and an aliphatic difunctional compound. The aromatic difunctional compound may have the structure of, for example, any of Formulas (B)-(J), previously described as chain extenders above. In specific embodiments, the aromatic difunctional compound is a bisphenol of Formula (B), where Z is hydroxyl. The aliphatic diifunctional compound provides a long aliphatic chain in the backbone and may have the structure of Formula (33):

Formula (33)

wherein Z is hydroxyl, amino, or —COY; wherein Y is hydroxyl, alkoxy, aryloxy, or halogen; and wherein n is 2 to 20. Formula (33) thus includes aliphatic dialcohols and aliphatic diacids or equivalents thereof. Exemplary aliphatic diols that are useful in SSP resins include adipic acid (n=4), sebacic acid (n=8), and dodecanedioic acid (n=10).

The SSP resin can be formed, for example by the phosgenation of bisphenol-A, sebacic acid, and p-cumyl phenol. The SSP resin contains carbonate linkages and ester linkages.

In this regard, it is believed that the crosslinking reaction rate of the photoactive additive and its yield are directly related to the hydrogen-to-ketone ratio of the polymeric blend. Thus, the higher the hydrogen-to-ketone ratio of the blend, the higher the rate of chain-extension reaction/crosslinking should be. Due to the presence of the hydrogen-rich SSP resin with its aliphatic blocks, the hydrogen-to-ketone ratio is relatively high. As a result, the crosslinking density and the resulting flame retardance and chemical resistance should be very good for this blend. In addition, the SSP resin has very good flow properties. It is believed that the blend should also have good flow, and should also retain its ductile properties even after crosslinking.

The polymer resin (polymer B) in the blend can be an ethylene-acrylic ester-glycidyl acrylate terpolymer. The acrylic ester can be derived from any appropriate acrylate monomer, for example methyl acrylate, ethyl acrylate, 2-ethylhexyl acrylate, butyl acrylate, or butyl methacrylate. The acrylic ester provides softness, high flexibility, low crystallinity, high thermal stability, and high impact strength. The glycidyl acrylate monomer is essentially an acrylate monomer that has been functionalized with an epoxy group, which has high reactivity and promotes dispersion. An exemplary glycidyl acrylate is glycidyl methacrylate. Such terpolymers are commercially available, for example as LOTADER AX8900 from Arkema.

The polymer resin (polymer B) in the blend can be a polyethylene terephthalate (PET) polymer or a polybutylene terephthalate (PBT) polymer. PET resins are commercially available, for example under the TRITAN brand from Eastman Chemical Company. PBT resins are commercially available, for example from SABIC Innovative Plastics under the brand name VALOX.

The polymer resin (polymer B) in the blend can be a bisphenol-A homopolymer. Such resins are available, for example as LEXAN from SABIC Innovative Plastics.

The polymer resin (polymer B) in the blend can be a polystyrene polymer. Such polymers contain only polystyrene monomers. Thus, for example ABS and MBS should not be considered polystyrene polymers.

The polymer resin (polymer B) in the blend can be a thermoplastic polyester. An exemplary polyester is PCTG, which is a copolymer derived from the reaction of terephthalic acid, ethylene glycol, and cyclohexanedimethanol (CHDM). The PCTG copolymer can contain 40-90 mole % CHDM, with the terephthalic acid and the ethylene glycol making up the remaining 10-60 mole %.

The polymer resin (polymer B) in the blend can be a dimethyl bisphenol cyclohexane-co-bisphenol-A copolymer, i.e. a DMBPC-BPA copolymer. This copolymer is illustrated below:

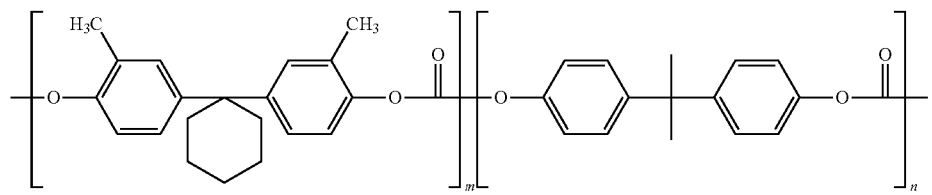

wherein the molar ratio of DMBPC to BPA is m:n. Again, this notation is intended to report the relative molar amounts between the DMBPC units and the BPA units, and should not be construed as denoting the structure of the copolymer (i.e. these two units are randomly distributed and are not blocks). The DMBPC is usually from 20 mole % to 90 mole % of the copolymer, including 25 mole % to 60 mole %. The BPA is usually from 10 mole % to 80 mole % of the copolymer, including 40 mole % to 75 mole %. These resins have high scratch resistance.

Other conventional additives can also be added to the blend (e.g. flame retardants, heat stabilizers, impact modifiers, UV stabilizing additives, mold release agents, colorants, organic and inorganic fillers, gamma-stabilizing agents, etc.).

Various types of flame retardants can be utilized as additives. In one embodiment, the flame retardant additives include, for example, flame retardant salts such as alkali metal salts of perfluorinated $C_1$-$C_{16}$ alkyl sulfonates such as potassium perfluorobutane sulfonate (Rimar salt), potassium perfluorooctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the compositions disclosed herein. In certain embodiments, the flame retardant does not contain bromine or chlorine.

The flame retardant optionally is a non-halogen based metal salt, e.g., of a monomeric or polymeric aromatic sulfonate or mixture thereof. The metal salt is, for example, an alkali metal or alkali earth metal salt or mixed metal salt. The metals of these groups include sodium, lithium, potassium, rubidium, cesium, beryllium, magnesium, calcium, strontium, francium and barium. Examples of flame retardants include cesium benzenesulfonate and cesium p-toluenesulfonate. See e.g., U.S. Pat. No. 3,933,734, EP 2103654, and US2010/0069543A1, the disclosures of which are incorporated herein by reference in their entirety.

Another useful class of flame retardant is the class of cyclic siloxanes having the general formula $[(R)_2SiO]_y$, wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like; phosphates such as trimethyl phosphate, or the like; or combinations comprising at least one of the foregoing heat stabilizers. Heat stabilizers are generally used in amounts of 0.0001 to 1 part by weight, based on 100 parts by weight of the polymer component of the polymeric blend/composition.

Mold release agent (MRA) will allow the material to be removed quickly and effectively. Mold releases can reduce cycle times, defects, and browning of finished product. There is considerable overlap among these types of materials, which may include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 part by weight, specifically 0.01 to 0.75 part by weight, more specifically 0.1 to 0.5 part by weight, based on 100 parts by weight of the polymer component of the polymeric blend/composition.

A polymeric blend comprising the photoactive additive and the polymer resin can be prepared. The photoactive additive may be from 1 wt % to 99 wt % of the blend. The polymer resin may also be from 1 wt % to 99 wt % of the blend. The blend can be extruded into pellets, then molded or extruded into articles. The article can then be irradiated with UV light to create crosslinks between the chains, resulting in improved flame retardance and chemical resistance. Use of a PC—Si copolymer provides good impact strength and ductility at low temperatures, and it is believed that the blend will retain these properties even after cross-linking.

The polymeric blend can improve the chemical resistance of the final molded article. It is contemplated that molded articles can be of any desired shape (e.g. film, sheet, etc.) and be used in many different applications, for example in the medical, automotive, and consumer electronics fields. Increased chemical resistance may be found against 409 Glass and Surface Cleaner; Alcohol Prep Pad; CaviCide liquid/CaviWipes; CaviWipes; Cidex Plus liquid; Clorox Bleach; Clorox Wipes; Envirocide liquid; ForPro liquid; Gentle dish soap and water; Hydrogen Peroxide Cleaner Disinfectant Wipes; Isopropyl Alcohol wipes; MadaCide-1 liquid; Mar-V-Cide liquid to dilute; Sani-Cloth Bleach Wipes; Sani-Cloth HB Wipes; Sani-Cloth Plus Wipes; Sodium Hypochlorite liquid; Super Sani-Cloth Wipes; Viraguard liquid and Wipes; Virex 256; Windex Blue; Fuel C; Toluene; Heptane; Ethanol; Isopropanol; Windex; Engine oil; WD40; Transmission fluid; Break fluid; Glass wash; Diesel; Gasoline; Banana Boat Sunscreen (SPF 30); Sebum; Ivory Dish Soap; SC Johnson Fantastik Cleaner; French's Yellow Mustard; Coca-Cola; 70% Isopropyl Alcohol; Extra Virgin Olive Oil; Vaseline Intensive Care Hand Lotion; Heinz Ketchup; Kraft Mayonnaise; Chlorox Formula 409 Cleaner; SC Johnson Windex Cleaner with Ammonia; Acetone; Artificial Sweat; Fruits & Passion Cucina Coriander & Olive Hand Cream; Loreal Studioline Megagel Hair Gel; Maybelline Lip Polish; Maybelline Expert Wear Blush—Beach Plum Rouge; Purell Hand Sanitizer; Hot coffee, black; iKlear; Chlorox Wipes; Squalene; Palmitic Acid; Oleic Acid; Palmitoleic Acid; Stearic Acid; and Olive Oil.

Articles

Compositions/blends disclosed herein, preferably prior to cross-linking, may be formed, shaped, molded, injection molded, or extruded into an article. The compositions/blends can be molded into useful shaped articles by a variety of means such as injection molding, overmolding, co-injection molding, extrusion, multilayer extrusion, rotational molding, blow molding and thermoforming to form articles. The formed articles may be subsequently subjected to cross-linking conditions (e.g., UV-radiation) to affect cross-linking of the polycarbonates comprising monohydroxybenzophenone derived endcap.

Articles that may be formed from the compositions/blends include various components for cell phones and cell phone covers, components for computer housings, computer housings and business machine housings and parts such as housings and parts for monitors, computer routers, copiers, desk top printers, large office/industrial printers handheld electronic device housings such as computer or business machine housings, housings for hand-held devices, components for light fixtures or home or office appliances, humidifier housings, thermostat control housings air conditioner drain pans, outdoor cabinets, telecom enclosures and infrastructure, Simple Network Intrusion Detection System (SNIDS) devices, network interface devices, smoke detectors, components and devices in plenum spaces, components for medical applications or devices such as medical scanners, X-ray equipment, and ultrasound devices, components for interior or exterior components of an automobile, lenses (auto and non-auto) such as components for film applications, greenhouse components, sun room components, fire helmets, safety shields, safety goggles, glasses with scratch resistance and impact resistance, fendors, gas pumps, films for televisions, such as ecofriendly films having no halogen content, solar application materials, glass lamination materials, fibers for glass-filled systems, hand held electronic device enclosures or parts (e.g. walkie-talkie, scanner, media/MP3/MP4 player, radio, GPS system, ebook, tablet), wearable electronic devices (e.g. smart watch, training/tracking device, activity/sleep monitoring system, wristband, or glasses), hand held tool enclosures or parts, smart phone enclosures or parts, turbine blades (e.g., wind turbines), and the like.

In certain embodiments, articles that may comprise the composition/blend include automotive bumpers, other automotive, construction and agricultural equipment exterior components, automobile mirror housings, an automobile grille, an automobile pillar, automobile wheel covers, automobile, construction and agricultural equipment instrument panels and trim, construction and agricultural grilles, automobile glove boxes, automobile door hardware and other interior trim, automobile construction and agricultural equipment exterior lights, automobile parts within the engine compartment, plumbing equipment, valves and pumps, air conditioning heating and cooling parts, furnace and heat pump parts, computer parts, electronics parts, projector parts, electronic display parts, copier parts, scanner parts, electronic printer toner cartridges, hair driers, irons, coffee makers, toasters, washing machines, microwaves, ovens, power tools, electric components, lighting parts, dental instruments and equipment, medical instruments, cookware, medical instrument trays, animal cages, fibers, laser welded medical devices, hand held electronic device enclosures or parts (e.g. walkie-talkie, scanner, media/MP3/MP4 player, radio, GPS system, ebook, tablet), wearable electronic devices (e.g. smart watch, training/tracking device, activity/sleep monitoring system, wristband, or glasses), hand held tool enclosures or parts, smart phone enclosures or parts, and fiber optics.

In certain embodiments, articles that may comprise the composition/blend include automotive bumpers, other automotive exterior components, automobile mirror housings, an automobile grille, an automobile pillar, automobile wheel covers, automobile instrument panels and trim, automobile glove boxes, automobile door hardware and other interior trim, external automobile trim parts, such as pillars, automobile exterior lights, automobile parts within the engine compartment, an agricultural tractor or device part, a construction equipment vehicle or device part, a construction or agricultural equipment grille, a marine or personal water craft part, an all terrain vehicle or all terrain vehicle part, plumbing equipment, valves and pumps, air conditioning heating and cooling parts, furnace and heat pump parts, computer parts, electronics parts, projector parts, electronic display parts, copier parts, scanner parts, electronic printer toner cartridges, hair driers, irons, coffee makers, toasters, washing machines, microwaves, ovens, power tools, electric components, electric enclosures, lighting parts, dental instruments, medical instruments, medical or dental lighting parts, an aircraft part, a train or rail part, a seating component, sidewalls, ceiling parts, cookware, medical instrument trays, animal cages, fibers, laser welded medical devices, fiber optics, lenses (auto and non-auto), cell phone parts, greenhouse components, sun room components, fire helmets, safety shields, safety glasses, gas pump parts, hand held electronic device enclosures or parts (e.g. walkie-talkie, scanner, media/MP3/MP4 player, radio, GPS system, ebook, tablet), wearable electronic devices (e.g. smart watch, training/tracking device, activity/sleep monitoring system, wristband, or glasses), hand held tool enclosures or parts, smart phone enclosures or parts, and turbine blades.

In certain embodiments, the article is one that requires or must include a material having a UL94 5VA rating performance. Articles that require a UL94 5VA rating include, but are not limited to, computer housings, computer housings and business machine housings and parts such as housings and parts for monitors, computer routers, copiers, desk top printers, large office/industrial printers, handheld electronic device housings such as computer or business machine housings, housings for hand-held devices, components for light fixtures including LED fixtures or home or office appliances, humidifier housings, thermostat control housings, air conditioner drain pans, outdoor cabinets, telecom enclosures and infrastructure, Simple Network Intrusion Detection System (SNIDS) devices, network interface devices, smoke detectors, components and devices in plenum spaces, components for medical applications or devices such as medical scanners, X-ray equipment, and ultrasound devices, electrical boxes and enclosures, and electrical connectors.

In certain embodiments, the article is one that requires hydrothermal stability, such as a wind turbine blade, a steam sterilizable medical device, a food service tray, utensiles and equipment.

In certain embodiments, the article is one that requires a combination of transparency, flame resistance, and/or impact resistance. For example, in certain embodiments the article may be a safety shield, safety goggles, a gas/fuel pump housing, a display window or part, or the like.

Method of Making the Articles

The article may be produced by a manufacturing process. The process may comprise the steps of (a) providing a blend as described above, containing a photoactive additive. The blend from step (a) may then be (b) melted, for example, at 200-400° C., 225-350° C., 250-310° C., or 270-300° C. in an extruder. The melted blend of step (b) may then be (c) extruded, and (d) the blend may be isolated or chopped. The article of manufacture may further be produced by the step of (e) drying the blend and (f) melt forming the blend. The article may then be subjected to cross-linking conditions, as described herein, so as to affect cross-linking of the photoactive additive. In certain embodiments, the article is not subjected to cross-linking conditions immediately after manufacture, but rather is cross-linked at a later time, such as when the article is introduced to sun light.

The following examples are provided to illustrate the polymeric blends, articles, processes and properties of the present disclosure. The examples are merely illustrative and are not intended to limit the disclosure to the materials, conditions, or process parameters set forth therein.

EXAMPLES

All solvents and reagents used were analytical grade.

Molecular weight determinations were performed using gel permeation chromatography (GPC), using a cross-linked styrene-divinylbenzene column and calibrated to polycarbonate references using a UV-VIS detector set at 264 nm. Samples were prepared at a concentration of about 1 mg/ml, and eluted at a flow rate of about 1.0 ml/min.

Differential scanning calorimetry (DSC) employing a temperature sweep rate of 20° C./min was used to determine glass transition temperatures of polycarbonates.

(A) Preparation of Cross-linkable Polycarbonates

Example 1

4-Hydroxybenzophenone Endcapped Polycarbonate "Benzophenone-BPA Copolymer—0.5 mol %—23 k"

The following were added into a 2 liter glass reactor equipped with an overhead condenser, a phosgene inlet and a pH probe allowing monitoring pH during the course of the reaction: (a) 4,4-bis-(hydroxyphenyl)-2,2-propane (BPA) (30 g, 131.6 mmol); (b) 4-hydroxybenzophenone (0.13 g, 0.7 mmol); (c) para-cumylphenol (0.7 g, 3.3 mmol); (d) triethylamine (0.18 g, 1.3 mmol); (e) methylene chloride (500 mL); (f) de-ionized water (300 mL). The reaction was allowed to stir for 10 minutes and the pH was maintained at pH=8 by the addition of 30 wt-% NaOH solution. The mixture was charged with phosgene (18.6 g, 2 g/min, 0.188 mol). During the addition of phosgene, base (30 wt-% NaOH) was simultaneously charged to the reactor to maintain the pH of the reaction between 9-10. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot water. The polymer was dried in an oven at 110° C. before analysis. Gel permeation chromatography (GPC) allowed for a determination of the molecular weight of the resulting polymer. The Mw of the polycarbonate was measured to be 22,877 Daltons (referenced to polycarbonate standards) and polydispersity index=3.11.

Example 2

4-Hydroxybenzophenone Endcapped Polycarbonate "Benzophenone-BPA Copolymer—2.5 mol %—30 k"

The following were added into a 2 liter glass reactor equipped with an overhead condenser, a phosgene inlet and a pH probe allowing monitoring pH during the course of the reaction: (a) 4,4-bis-(hydroxyphenyl)-2,2-propane (BPA) (30 g, 131.6 mmol); (b) 4-hydroxybenzophenone (0.65 g, 3.3 mmol); (c) para-cumylphenol (0.14 g, 0.7 mmol); (d) triethylamine (0.18 g, 1.3 mmol); (e) methylene chloride (500 mL); (f) de-ionized water (300 mL). The reaction was allowed to stir for 10 minutes and the pH was maintained at pH=8 by the addition of 30 wt-% NaOH solution. The mixture was charged with phosgene (18.74 g, 2 g/min, 0.189 mol). During the addition of phosgene, base (30 wt-% NaOH) was simultaneously charged to the reactor to maintain the pH of the reaction between 9-10. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot water. The polymer was dried in an oven at 110° C. before analysis. Gel permeation chromatography (GPC)

allowed for a determination of the molecular weight of the resulting polymer. The Mw of the polycarbonate was measured to be 30,255 Daltons (referenced to polycarbonate standards) and polydispersity index=2.09.

Example 3

4-Hydroxybenzophenone Endcapped Polycarbonate "Benzophenone-BPA Copolymer—1.7 mol %—28 k"

The following were added into a 70 L continuous stirred-tank reactor (CSTR) equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (59 g, 0.297 mol); (c) para-cumylphenol (45 g, 0.212 mol); (d) triethylamine (42 mL, 0.415 mol); (e) methylene chloride (23.4 L); (f) de-ionized water (10.8 L), and (g) sodium gluconate (10 g). The reaction was allowed to stir for 10 minutes and the pH was maintained at pH=9 by the addition of 30% NaOH solution. The mixture was charged with phosgene (2500 g, 80 g/min, 25.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 28,366 Daltons (referenced to polycarbonate standards) and polydispersity index=3.78.

Example 4

4-Hydroxybenzophenone Endcapped Polycarbonate "Benzophenone-BPA Copolymer—2.5 mol %—27 k"

The following were added into a 70 L CSTR equipped with an overhead condenser and a recirculation pump with a flow rate of 40 L/minute: (a) 4,4-bis-(hydroxyphenyl)-2, 2-propane (BPA) (4000 g, 17.52 mol); (b) 4-hydroxybenzophenone (87 g, 0.438 mol); (c) para-cumylphenol (28 g, 0.132 mol); (d) triethylamine (60 mL, 0.593 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2500 g, 80 g/min, 25.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 27,106 Daltons (referenced to polycarbonate standards) and polydispersity index=6.19.

Example 5

4-Hydroxybenzophenone Endcapped Polycarbonate "Benzophenone-BPA Copolymer—0.5 mol %—28 k"

The following were added into a 70 L CSTR equipped with an overhead condenser and a recirculation pump with a flow rate of 40 L/minute: (a) 4,4-bis-(hydroxyphenyl)-2, 2-propane (BPA) (4000 g, 17.52 mol); (b) 4-hydroxybenzophenone (18 g, 0.09 mol); (c) para-cumylphenol (105 g, 0.494 mol); (d) triethylamine (60 mL, 0.593 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2500 g, 80 g/min, 25.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 27,482 Daltons (referenced to polycarbonate standards) and polydispersity index=3.40.

Example 6

4-Hydroxybenzophenone Endcapped Polycarbonate "Benzophenone-BPA Copolymer—0.5 mol %—24 k"

The following were added into a 70 L CSTR equipped with an overhead condenser and a recirculation pump with a flow rate of 40 L/minute: (a) 4,4-bis-(hydroxyphenyl)-2, 2-propane (BPA) (4000 g, 17.52 mol); (b) 4-hydroxybenzophenone (18 g, 0.09 mol); (c) para-cumylphenol (120 g, 0.565 mol); (d) triethylamine (60 mL, 0.593 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2500 g, 80 g/min, 25.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 24,379 Daltons (referenced to polycarbonate standards) and polydispersity index=3.30.

Example 7

4-Hydroxybenzophenone Endcapped Polycarbonate "Benzophenone-BPA Copolymer—0.5 mol %—21 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (18 g, 0.09 mol); (c) para-cumylphenol (148 g, 0.697 mol); (d) triethylamine (60 mL, 0.593 mol); (e) methylene chloride (24.4 L); (f) de-ionized water (10.8 L), and (g) sodium gluconate (10 g). The reaction was allowed to stir for 10 minutes and the pH was maintained at pH=9 by the addition of 30% NaOH solution. The mixture was charged with phosgene (2500 g, 80 g/min, 25.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 21,171 Daltons (referenced to polycarbonate standards) and polydispersity index=3.22.

Example 8

4-Hydroxybenzophenone Endcapped Polycarbonate "Benzophenone-BPA Copolymer—2.5 mol %—26 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (87 g, 0.438 mol); (c) para-cumylphenol (35 g, 0.165 mol); (d) triethylamine (80 mL, 0.79 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2700 g, 80 g/min, 27.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 25,916 Daltons (referenced to polycarbonate standards) and polydispersity index=5.21.

Example 9

4-Hydroxybenzophenone Endcapped Polycarbonate "Benzophenone-BPA Copolymer—0.5 mol %—27 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (18 g, 0.09 mol); (c) para-cumylphenol (105 g, 0.49 mol); (d) triethylamine (60 mL, 0.59 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2700 g, 80 g/min, 27.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 27,055 Daltons (referenced to polycarbonate standards) and polydispersity index=3.19.

Example 10

4-Hydroxybenzophenone Endcapped Polycarbonate "Benzophenone-BPA Copolymer—0.5 mol %—27 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (18 g, 0.09 mol); (c) para-cumylphenol (148 g, 0.698 mol); (d) triethylamine (42 mL, 0.41 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2700 g, 80 g/min, 27.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 27,256 Daltons (referenced to polycarbonate standards) and polydispersity index=3.23.

Example 11

4-Hydroxybenzophenone Endcapped Polycarbonate "Benzophenone-BPA Copolymer—2.5 mol %—26 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (87 g, 0.439 mol); (c) para-cumylphenol (35 g, 0.165 mol); (d) triethylamine (42 mL, 0.41 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2700 g, 80 g/min, 27.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 25,999 Daltons (referenced to polycarbonate standards) and polydispersity index=6.98.

Example 12

4-Hydroxybenzophenone Endcapped Polycarbonate "Benzophenone-BPA Copolymer—2.5 mol %—27 k"

The following were added into a 70 L CSTR equipped with an overhead condenser and a recirculation pump with a flow rate of 40 L/minute: (a) 4,4-bis-(hydroxyphenyl)-2,2-propane (BPA) (4000 g, 17.52 mol); (b) 4-hydroxybenzophenone (87 g, 0.439 mol); (c) para-cumylphenol (28 g, 0.132 mol); (d) triethylamine (42 mL, 0.41 mol); (e) methylene chloride (23 L); (f) de-ionized water (10 L), and (g) sodium gluconate (10 g). The reaction was allowed to stir for 10 minutes and the pH was maintained at pH=9 by the addition of 30% NaOH solution. The mixture was charged with phosgene (2700 g, 80 g/min, 27.3 mol). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 27,084 Daltons (referenced to polycarbonate standards) and polydispersity index=7.26.

Table 1 summarizes the constituents and the weight average molecular weights of the polycarbonates of Examples 1-12.

TABLE 1

| Component | Ex. 1 | Ex. 2 | Ex. 3 | Ex. 4 | Ex. 5 | Ex. 6 |
|---|---|---|---|---|---|---|
| BPA (kg) | 0.03 | 0.03 | 4 | 4 | 4 | 4 |
| HBP (g) | 0.13 | 0.65 | 59 | 87 | 18 | 18 |
| PCP (g) | 0.7 | 0.14 | 45 | 28 | 105 | 120 |
| Na glu (g) | — | — | 10 | 10 | 10 | 10 |
| NEt$_3$ (mL) | 0.18 g | 0.18 g | 42 | 60 | 60 | 60 |
| Phosgene (kg) | 18.6 g | 18.74 g | 2.5 | 2.5 | 2.5 | 2.5 |
| Water (L) | 0.3 | 0.3 | 10.8 | 10 | 10 | 10 |
| CH$_2$Cl$_2$ (L) | 0.5 | 0.5 | 23.4 | 23 | 23 | 23 |
| Mw, Daltons | 22,877 | 30,255 | 28,366 | 27,106 | 27,482 | 24,379 |
| PDI | — | — | 3.78 | 6.19 | 3.40 | 3.30 |
| mol % HBP endcap | 0.5% | 2.5% | 1.7% | 2.5% | 0.5% | 0.5% |

| Component | Ex. 7 | Ex. 8 | Ex. 9 | Ex. 10 | Ex. 11 | Ex. 12 |
|---|---|---|---|---|---|---|
| BPA (kg) | 4 | 4 | 4 | 4 | 4 | 4 |
| HBP (g) | 18 | 87 | 18 | 18 | 87 | 87 |
| PCP (g) | 148 | 35 | 105 | 148 | 35 | 28 |
| Na glu (g) | 10 | 10 | 10 | 10 | 10 | 10 |
| NEt$_3$ (mL) | 60 | 80 | 60 | 60 | 42 | 42 |
| Phosgene (kg) | 2.5 | 2.7 | 2.7 | 2.7 | 2.7 | 2.7 |
| Water (L) | 10.8 | 10 | 10 | 10 | 10 | 10 |
| CH$_2$Cl$_2$ (L) | 24.4 | 23 | 23 | 23 | 23 | 23 |
| Mw, Daltons | 21,171 | 25,916 | 27,055 | 27,256 | 25,999 | 27,084 |
| PDI | 3.22 | 5.21 | 3.19 | 3.23 | 6.98 | 7.26 |
| mol % HBP endcap | 0.5% | 2.5% | 0.5% | 0.5% | 2.5% | 2.5% |

BPA = bisphenol-A;
HBP = 4-hydroxybenzophenone;
PCP = p-cumylphenol;
Na glu = sodium gluconate;
NEt$_3$ = triethylamine;
CH$_2$Cl$_2$ = methylene chloride;
PDI = polydispersity index The 4-hydroxybenzophenone endcapped polycarbonates of Examples 1-12 were prepared as compositions optionally using one or more of the components shown in Table 2. Comparative Examples were also prepared using the components of Table 2. The referenced compositions were prepared by mixing together the selected constituents and preblending. Extrusion and molding was carried out under normal polycarbonate processing conditions.

TABLE 2

| Component | Description | Trade name, Source |
|---|---|---|
| 20:80 ITR-PC | Poly(19 mol % isophthalate-terephthalate-resorcinol ester)-co-(75 mol % bisphenol- | SABIC-IP |

TABLE 2-continued

| Component | Description | Trade name, Source |
|---|---|---|
| | A carbonate)-co-(6 mol % resorcinol carbonate) copolymer (Mw = 31,000, PC standards) | |
| HF-PC or High-Flow PC | Bisphenol-A based polycarbonate resin (Mw = 22,000 Daltons, PC standards) | SABIC-IP |
| LF-PC or Low-Flow PC | Bisphenol-A based polycarbonate resin (Mw = 30,000 Daltons, PC standards) | SABIC-IP |
| KSS | Potassium diphenylsulphon-3-sulphonate | Arichem LLC |
| Rimar Salt | Potassium perfluorobutanesulfonate | Lanxess |
| PETS | pentaerythritol tetrastearate | Faci |
| UV stabilizer | 2-(2'-hydroxy-5'-t-octylphenyl)benzotriazole | CYASORB UV 5411, Cytec |
| Heat stabilizer | Tetrakis(2,4-di-tert-butylphenyl)-4,4'-biphenylenediphosphonite | PEPQ, Ciba Specialty Chemicals |
| Hydrolytic stabilizer | Cycloaliphatic Epoxy Resin, 3,4-epoxy cyclohexyl methyl-3,4-epoxy cyclohexyl carboxylate | ERL4221, Various |
| | Colorant 1 | |
| | Colorant 2 | |
| Phosphite Stabilizer | Tris (2,4-di-tert-butylphenyl) phosphite | Irgaphos 168 |
| | Hindered Phenol | |

(B) Cross-linking Results

Compositions of the 4-hydroxybenzophenone endcapped polycarbonates of Examples 1-12 were cross-linked with ultra-violet (UV) radiation. The polycarbonate compositions were treated with ultra-violet radiation generated from a UV-lamp, or irradiative energy (including UV) received upon sun exposure.

(i) Cross-linking of 4-Hydroxybenzophenone Endcapped Polycarbonates Using a UV-lamp Ultra-violet radiation was used to cross-link the neat resin compositions of Examples 1 and 2. First, films of Examples 1 and 2 were formed by melt-pressing the corresponding powder at 550° F. The thickness of each film was about 0.5 mm. Each film was then irradiated with UV-radiation emitted from a D bulb having output specifications of about 796.5 Watts from 201 nm to 600 nm, as shown in Table 3. The film was placed on a conveyor belt having a total cycle time of 90 seconds per pass through the UV system, with the irradiation time being 20 seconds, providing an energy of irradiation of 3,000 mJ/cm$^2$ measured using an EIT UV Power Puck™ aletro-optic radiometer.

TABLE 3

| Interval (nm) | Power (Watts) | Interval (nm) | Power (Watts) | Interval (nm) | Power (Watts) | Interval (nm) | Power (Watts) |
|---|---|---|---|---|---|---|---|
| 201-210 | 2.3 | 251-260 | 17.7 | 301-310 | 28.6 | 351-360 | 50.8 |
| 211-220 | 4.2 | 261-270 | 13.6 | 311-320 | 21.5 | 361-370 | 57.5 |
| 221-230 | 4.9 | 271-280 | 20.3 | 321-330 | 21.0 | 371-380 | 74.9 |
| 231-240 | 5.8 | 281-290 | 11.6 | 331-340 | 11.0 | 381-390 | 72.2 |
| 241-250 | 10.8 | 291-300 | 24.3 | 341-350 | 24.4 | 391-400 | 27.9 |
| 401-410 | 30.6 | 451-460 | 4.9 | 501-510 | 7.2 | 551-560 | 5.3 |
| 411-420 | 26.2 | 461-470 | 3.5 | 511-520 | 12.7 | 561-570 | 3.8 |
| 421-430 | 34.8 | 471-480 | 2.7 | 521-530 | 16.7 | 571-580 | 8.7 |
| 431-440 | 40.4 | 481-490 | 9.0 | 531-540 | 17.2 | 581-590 | 3.4 |
| 441-450 | 19.5 | 491-500 | 15.3 | 541-550 | 27.3 | 591-600 | 2.2 |

Table 4 demonstrates the progression of molecular weight as a function of irradiation time of Example 1 and Example 2. These data show that the molecular weight of each film increased dramatically as a function of UV dosage. The data shows also that the more 4-hydroxybenzophenone endcap present in the resin, the greater is the molecular weight increase, as Example 2 (2.5 mol % HBP endcap) showed a 144% increase in molecular weight after 5 passes under the UV-lamp, compared with a 30% increase in molecular weight for Example 1 (0.5 mol % HBP endcap) after 5 passes.

TABLE 4

| | Unit | Example 1 | Example 2 |
|---|---|---|---|
| 4-Hydroxybenzophenone amount | mol-% | 0.5 | 2.5 |
| Unexposed film MW | Daltons | 22,877 | 30,255 |
| 1 pass @ 3 J/cm$^2$, MW | Daltons | 25,784 | 53,346 |
| 5 passes @ 3 J/cm$^2$, MW | Daltons | 29,664 | 73,945 |
| MW increase after 5 passes | % | 30 | 144 |

Figure 8:
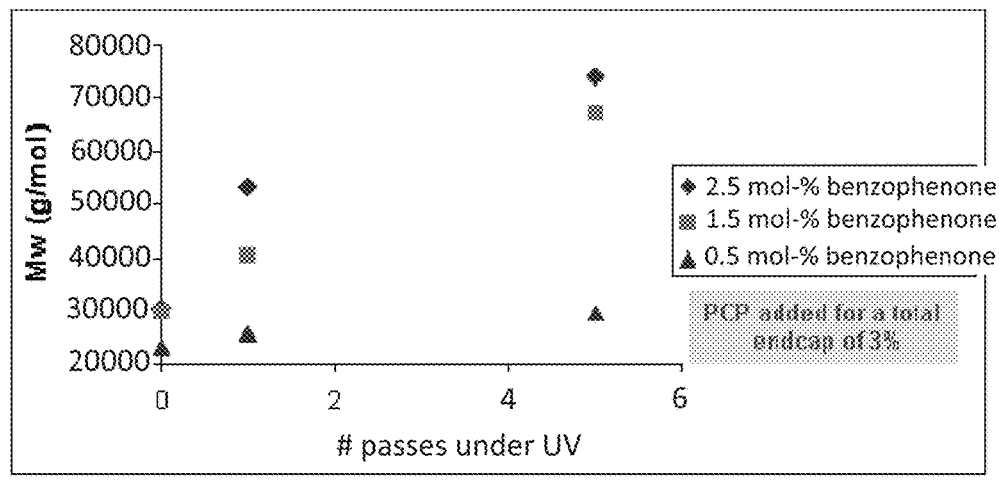
FIG. 8 depicts polycarbonate composition molecular weight as a function of UV-exposure.
Figure 9:
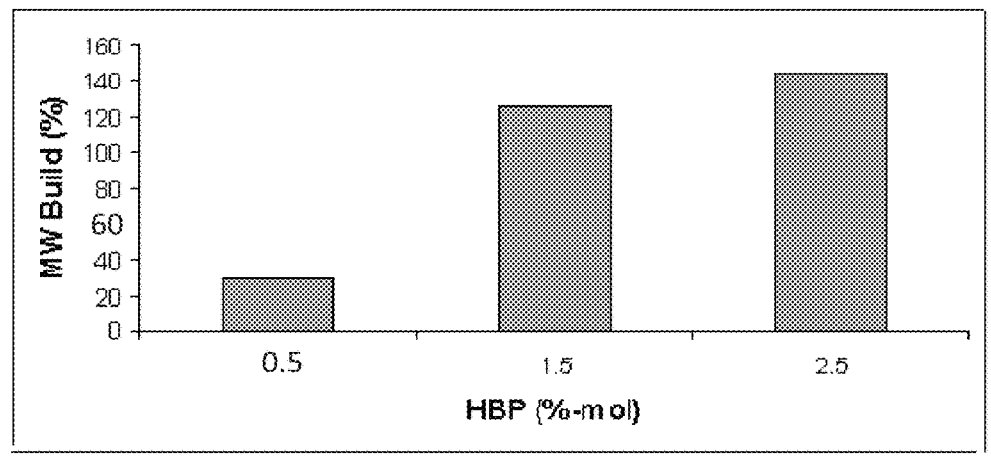
FIG. 9 depicts the molecular weight build (%) as a function of 4-hydroxybenzophenone endcap content in polycarbonate compositions treated with UV-radiation.

FIG. 8 and FIG. 9 also demonstrate the progression of molecular weight as a function of irradiation time for 4-hydroxybenzophenone endcapped polycarbonates of the invention. The figures show molecular weight progression upon cross-linking of 4-hydroxybenzophenone-BPA polycarbonates at 0.5 mol % hydroxybenzophenone endcap, 1.5 mol % hydroxybenzophenone endcap, and 2.5 mol % hydroxybenzophenone endcap. Each of the three polycarbonates included sufficient p-cumylphenol endcap to bring the total endcap mol % to 3 mol %.

Figure 10:
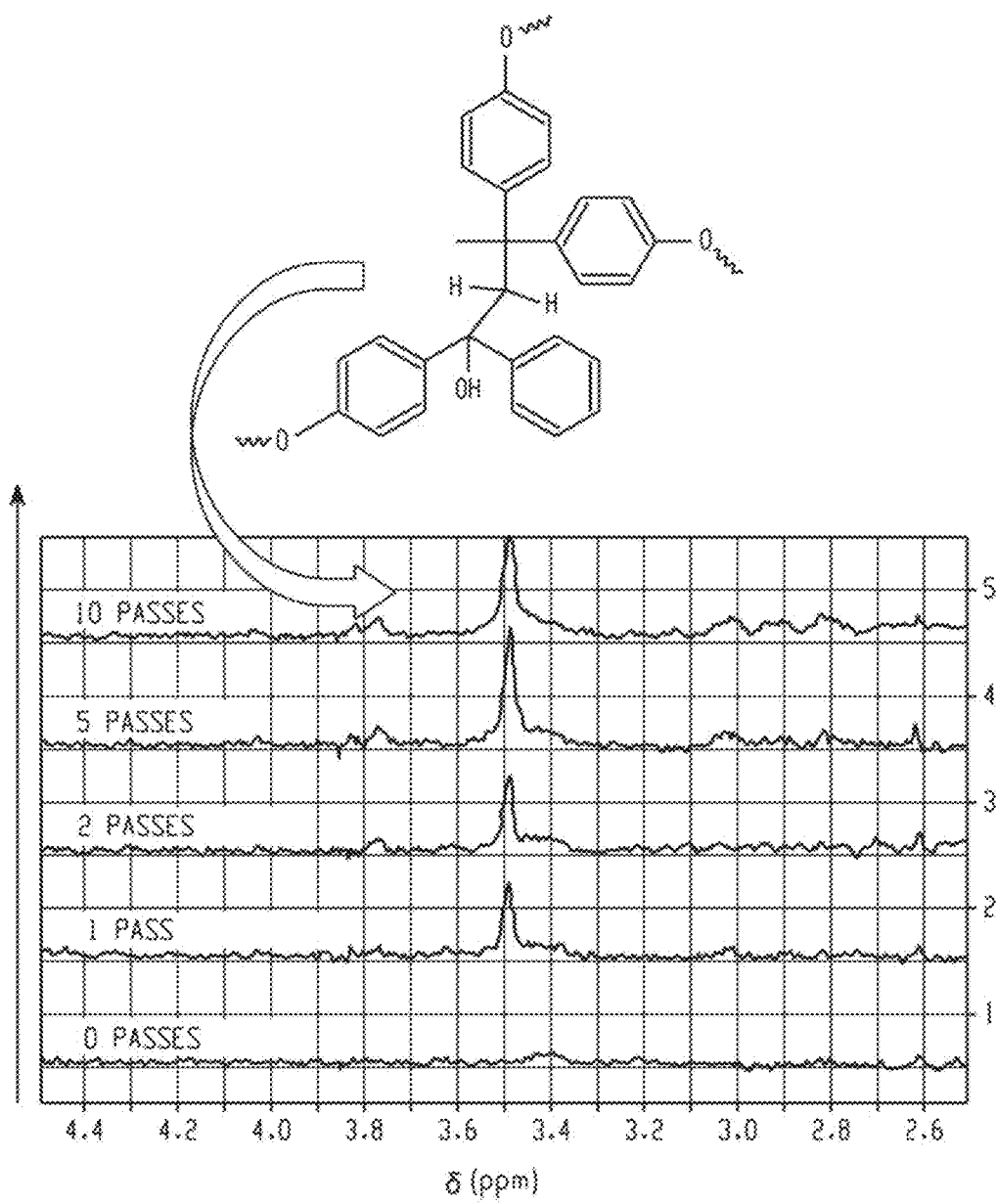
FIG. 10 depicts overlayed NMR spectra demonstrating peak intensity increase at 3.48 ppm showing progression of polycarbonate cross-linking.
Figure 11:
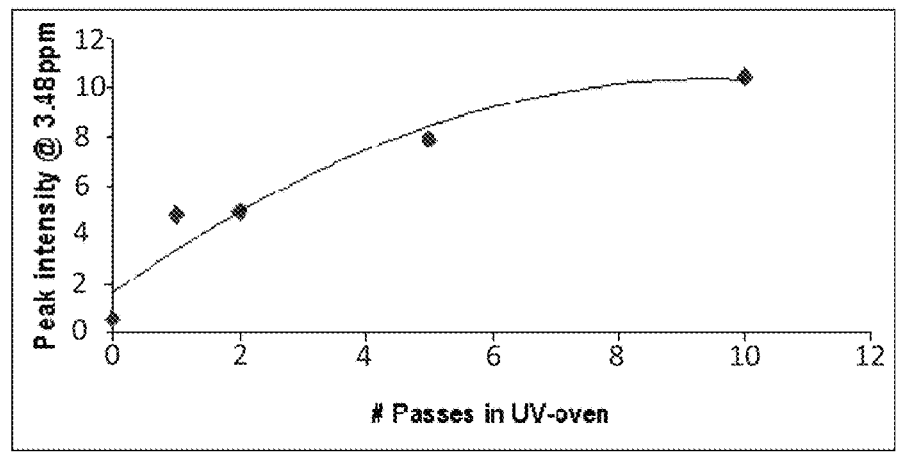
FIG. 11 depicts NMR peak intensity at 3.48 ppm as a function of UV-treatment of 4-hydroxybenzophenone endcapped polycarbonates.

The cross-linking reaction of Example 2 (benzophenone-BPA copolymer—2.5 mol %—30 k) was monitored by $^1$H-nuclear magnetic resonance spectroscopy (NMR), as shown in FIG. 10 and FIG. 11. Without being bound by theory, it is believed that cross-linking occurs between benzophenone carbonyl carbon atoms and methyl carbon atoms as found in repeating bisphenol-A units. The cross-linking reaction can be monitored by following the peak intensity increase at 3.48 ppm in the NMR spectrum of the composition, which peak corresponds to the methylene hydrogens at the newly formed carbon-carbon bond. FIG. 10 and FIG. 11 illustrate that with each pass under the UV-lamp, the peak intensity increased at 3.48 ppm, indicating progression of the cross-linking process.

(ii) Cross-linking of 4-hydroxybenzophenone Endcapped Polycarbonates Via Sun Exposure Sun exposure was used to cross-link the polycarbonates. Films were formed of the cross-linkable polycarbonates by melt-pressing the corresponding powder at 550° F. The thickness of each film was about 0.5 mm. Each film was then exposed to UV-radiation emitted from the sun over a period of 360 hours.

Figure 12:
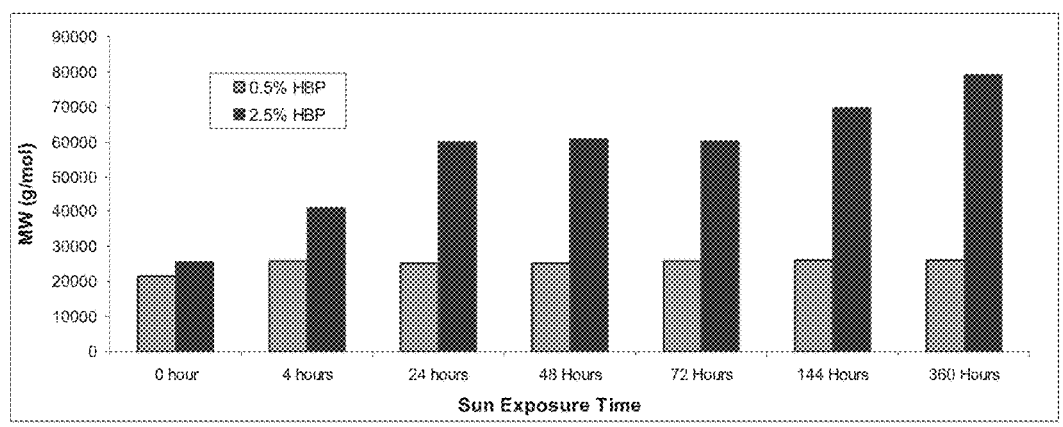
FIG. 12 depicts polycarbonate composition molecular weight as a function of sun exposure time.

Table 5, shown below, and FIG. 12 demonstrate that upon exposure to irradiative energy from the sun, the 4-hydroxy-benzophenone endcapped polycarbonates underwent cross-linking and an increase in molecular weight. Accordingly, sun exposure can be used as a method of cross-linking the herein disclosed polycarbonates comprising monohydroxybenzophenone derived endcaps.

The % Gel data indicates the extent of crosslinking as function of the sun exposure time. The % Gel is measured by dividing the dry weight of the crosslinked portion of the exposed material by the total weight of the sample. The crosslinked portion corresponds to the insoluble part of the sample soaked in methylene chloride for 12 hours. This data shows that higher the amount of HBP, greater will be the amount of crosslinked material after sun exposure.

to the specimen holding clamp. Specimens must not drip flaming particles that ignite the cotton. No specimen can have glowing combustion remain for longer than 30 seconds after removal of the test flame 5VA: Testing is done on both bar and plaque specimens. Procedure for Bars: A bar specimen is supported in a vertical position and a flame is applied to one of the lower corners of the specimen at a 20° angle. The flame is applied for 5 seconds and is removed for 5 seconds. The flame application and removal is repeated five times. Procedure for Plaques: The procedure for plaques is the same as for bars except that the plaque specimen is mounted horizontally and a flame is applied to the center of the lower surface of the plaque.

To achieve a 5VA rating, specimens must not have any flaming or glowing combustion for more than 60 seconds after the five flame applications. Specimens must not drip flaming particles that ignite the cotton. Plaque specimens must not exhibit burnthrough (a hole).

TABLE 5

| | Sun Exposure Time (Hours) | | | | | | | | |
|---|---|---|---|---|---|---|---|---|---|
| HBP (%) | 0 MW | 4 MW | 24 MW | 48 MW | 72 MW | 144 MW | 360 MW | Delta MW (%) | % Gel |
| 0.5 | 21620 | 25900 | 25098 | 25324 | 25703 | 26202 | 26013 | 16 | 0 |
| 0.5 | 26118 | 31130 | 33305 | 36826 | 32371 | 35363 | 34994 | 28 | 1 |
| 0.5 | 27549 | 31145 | 34172 | 36231 | 34756 | 36235 | 36517 | 24 | 1 |
| 2.5 | 25458 | 41086 | 59852 | 60745 | 60224 | 69605 | 78980 | 135 | 15 |
| 2.5 | 24245 | 46183 | 79350 | 65228 | 67150 | 45841 | 58211 | 227 | 27 |
| 2.5 | 26145 | 45112 | 64941 | 51008 | 63437 | 63819 | 34831 | 148 | 52 |

HBP = hydroxybenzophenone;
MW = Molecular Weight (C) Flame Resistance

Flammability tests were performed following the procedure of Underwriter's Laboratory Bulletin 94 entitled "Tests for Flammability of Plastic Materials, UL94". Several ratings can be applied based on the rate of burning, time to extinguish, ability to resist dripping, and whether or not drips are burning. According to this procedure, materials may be classified as HB, V0, V1, V2, 5V, 5VA and/or 5VB on the basis of the test results obtained for five samples. The criteria for the flammability classifications or "flame retardance" are described below.

V0: A specimen is supported in a vertical position and a flame is applied to the bottom of the specimen. The flame is applied for ten seconds and then removed until flaming stops at which time the flame is reapplied for another ten seconds and then removed. Two sets of five specimens are tested. The two sets are conditioned under different conditions.

To achieve a V0 rating, specimens must not burn with flaming combustion for more than 10 seconds after either test flame application. Total flaming combustion time must not exceed 50 seconds for each set of 5 specimens. Specimens must not burn with flaming or glowing combustion up Compositions comprising cross-linked polycarbonates disclosed herein (neat and blended) were evaluated for UL 94 V0 and 5VA performance as compared to high-flow BPA-polycarbonate neat and blended compositions. The tested compositions and flame test results are provided in Tables 6-9, shown below.

(i) V0 Performance

Flammability testing was conducted on flame bars prepared from compositions labelled as Sample 1 (S1), Comparative Sample 2 (CS2), Sample 3 (S3), and Comparative Sample 4 (CS4), described in Table 6. S1 is a blend composition comprising the benzophenone-BPA copolymer of Example 8 and a p-cumylphenol capped poly(20 wt % isophthalate-terephthalate-resorcinol ester)-co-(80 wt % bisphenol-A carbonate) copolymer. CS2 is a blend composition comprising a high-flow BPA-polycarbonate and a p-cumylphenol capped poly(20 wt % isophthalate-terephthalate-resorcinol ester)-co-(80 wt % bisphenol-A carbonate) copolymer. S3 is a neat resin composition comprising the benzophenone-BPA copolymer of Example 8. CS4 is a neat resin composition comprising the high-flow BPA-polycarbonate.

TABLE 6

| | | | Sample | | | |
|---|---|---|---|---|---|---|
| | Ingredient | Unit | S1 | CS2 | S3 | CS4 |
| Example 8 | Benzophenone-BPA copolymer - 2.5 mol-% - 26 k | % | 55 | | 100 | |
| 20:80 ITR-PC | p-cumylphenol capped poly(20 wt % isophthalate-terephthalate-resorcinol ester)-co-(80 wt % bisphenol-A carbonate) copolymer (Mw = 60,000, PS standards) | % | 45 | 45 | | |

TABLE 6-continued

|  | Ingredient | Unit | Sample | | | |
|---|---|---|---|---|---|---|
|  |  |  | S1 | CS2 | S3 | CS4 |
| HF-PC | Bisphenol-A based polycarbonate resin (Mw = 22,000 Daltons, PS standards) | % |  | 55 |  | 100 |
| UV stabilizer | 2-(2'-hydroxy-5'-t-octylphenyl)benzotriazole | % | 0.20 | 0.20 | 0.20 | 0.20 |
| PEPQ Powder | Phosphonous Acid Ester (CAS # 119345-01-6) | % | 0.06 | 0.06 | 0.06 | 0.06 |
|  | Cycloaliphatic Epoxy Resin (3,4-epoxy cyclohexyl methyl-3,4-epoxy cyclohexyl carboxylate), ERL4221 | % | 0.03 | 0.03 | 0.03 | 0.03 |
| KSS | Potassium diphenylsulphon-3-sulphonate | % | 0.03 | 0.03 | 0.03 | 0.03 |
| PETS | pentaerythritol tetrastearate | % | 0.30 | 0.30 | 0.30 | 0.30 |
|  | Colorant 1 | % | 0.13 | 0.13 | 0.13 | 0.13 |
|  | Colorant 2 | % | 0.13 | 0.13 | 0.13 | 0.13 |
| MVR | Melt Volume Flow Rate | cc/10 min | 9.5 | 15.9 | 8.1 | 25.9 |
| Abusive MVR | Abusive Melt Volume Flow Rate | cc/10 min | 11.4 | 21.7 | 8.5 | 27.7 |

Flammability testing was conducted using the standard Underwriters Laboratory UL 94 test method (7 day conditioning), except that 20 bars rather than the usual 5 bars were tested. Specimens are to be preconditioned in an air-circulating oven for 168 hours at 70±1° C. and then cooled in a desiccator for at least 4 hours at room temperature, prior to testing. Once removed from the desiccator, specimens are tested within 30 minutes. The data was analyzed by calculation of the average flame out time, standard deviation of the flame out time and the total number of drips. Statistical methods were used to convert the data to a probability that a specific formulation would achieve a first time V0 pass or "p(FTP)" in the standard UL 94 testing of 5 bars. Preferably p(FTP) values will be 1 or very close to 1 for high confidence that a sample formulation would achieve a V0 rating in UL 94 testing.

Table 7 presents p(FTP) values for the blend (51) comprising the benzophenone-BPA copolymer and the p-cumylphenol capped ITR-PC; and the neat benzophenone-BPA copolymer (S3). p(FTP) values are provided for both before and after the flame bars are exposed to UV radiation. The results from S1 and S3 are compared with results from flame bars prepared from the blend (CS2) comprising the high-flow BPA polycarbonate and the p-cumylphenol capped ITR-PC; and the neat high-flow BPA-polycarbonate (CS4). S3 and CS4 were prepared in order to compare the flame behavior of the blends of 51 and CS2 with neat resin compositions. Potassium sulfone sulfonate was incorporated into the tested compositions as a flame poison.

TABLE 7

|  |  | Sample | | | |
|---|---|---|---|---|---|
|  |  | S1 (blend) (HBP-BPA/ ITR-PC) | CS2 (blend) (HF-BPA/ ITR-PC) | S3 (neat) (HBP-BPA) | CS4 (neat) (HF-BPA) |
|  | Flame Resistance |  |  |  |  |
| Before UV | p(FTP) @ 2.00 mm | 0 | 0 | 0 | 0 |
| After UV | p(FTP) @ 2.00 mm | 0.99 | 0 | 0.8 | 0 |
|  | p(FTP) @ 1.50 mm | 0.2 | 0 | 0.3 | — |

TABLE 7-continued

|  | Sample | | | |
|---|---|---|---|---|
|  | S1 (blend) (HBP-BPA/ ITR-PC) | CS2 (blend) (HF-BPA/ ITR-PC) | S3 (neat) (HBP-BPA) | CS4 (neat) (HF-BPA) |
| Flame Resistance |  |  |  |  |
| p(FTP) @ 1.00 mm | 0.1 | 0 | — | — |

HBP-BPA = Benzophenone-BPA copolymer-2.5 mol-%-26 k;
HF-BPA = High-Flow Bisphenol-A based polycarbonate resin;
HBP-BPA/ITR-PC = Benzophenone-BPA copolymer-2.5 mol-%-26 k/p-cumylphenol capped poly(20 wt % isophthalate-terephthalate-resorcinol ester)-co-(80 wt % bisphenol-A carbonate) copolymer;
HF-BPA/ITR-PC = High-Flow Bisphenol-A based polycarbonate resin/p-cumylphenol capped poly(20 wt % isophthalate-terephthalate-resorcinol ester)-co-(80 wt % bisphenol-A carbonate) copolymer.

The data of Table 7 shows a dramatic increase of the p(FTP) values for the UV-treated compositions incorporating 4-hydroxybenzophenone endcap, whereas the corresponding controls with the high-flow polycarbonate do not show any variation in their respective probability values. Surprisingly, even in blends, the cross-linked benzophenone-BPA copolymers impart V0 performance to the test bars at 2 mm thickness.

(ii) 5VA Performance

Flammability testing was conducted on flame bars and plaques prepared from compositions labelled as Sample 5 (S5), Comparative Sample 6 (CS6), Sample 7 (S7), and Comparative Sample 8 (CS8), described in Table 8. S5 is a low-flow benzophenone-BPA copolymer composition having a melt volume flow rate (MVR) of 2.81 cm$^3$/10 minutes at 300° C., 1.2 kg, 360 seconds, and an abusive MVR of 2.89 cm$^3$/10 minutes at 300° C., 1.2 kg, 1080 seconds. CS6 is a low-flow BPA-polycarbonate composition having an MVR of 6.35 cm$^3$/10 minutes at 300° C., 1.2 kg, 360 seconds, and an abusive MVR of 6.52 cm$^3$/10 minutes at 300° C., 1.2 kg, 1080 seconds. S7 is a high-flow benzophenone-BPA copolymer composition having a melt volume flow rate (MVR) of 11.5 cm$^3$/10 minutes at 300° C., 1.2 kg, 360 seconds, and an abusive MVR of 11.7 cm$^3$/10 minutes at 300° C., 1.2 kg, 1080 seconds. CS8 is a high-flow BPA-polycarbonate composition having an MVR of 27.6 cm$^3$/10 minutes at 300° C., 1.2 kg, 360 seconds, and an abusive MVR of 27.7 cm$^3$/10 minutes at 300° C., 1.2 kg, 1080 seconds.

TABLE 8

| Ingredient | Unit | Sample | | | |
|---|---|---|---|---|---|
| | | S5 | CS6 | S7 | CS8 |
| High-Flow Benzophenone-BPA copolymer | % | | | 100 | |
| Low-Flow Benzophenone-BPA copolymer | % | 100 | | | |
| High-Flow Bisphenol-A based polycarbonate resin | % | | | | 100 |
| Low-Flow Bisphenol-A based polycarbonate resin | % | | 100 | | |
| Potassium Perfluorobutane Sulfonate | % | 0.08 | 0.08 | 0.08 | 0.08 |
| Irgaphos Stabilizer | % | 0.06 | 0.06 | 0.06 | 0.06 |
| Melt Volume Flow Rate | cc/10 min | 2.81 | 6.35 | 11.5 | 27.6 |
| Abusive Melt Volume Flow Rate | cc/10 min | 2.89 | 6.52 | 11.7 | 27.7 |

Flammability testing was conducted using the standard Underwriters Laboratory UL 94 test method (7 day conditioning). 5 bars and 3 plaques were tested. Specimens are to be preconditioned in an air-circulating oven for 168 hours at 70±1° C. and then cooled in a desiccator for at least 4 hours at room temperature, prior to testing. Once removed from the desiccator, specimens are tested within 30 minutes. The data for the bars was analyzed by calculation of the average flame out time, standard deviation of the flame out time and the total number of drips. Statistical methods were used to convert the data to a probability that a specific formulation would achieve a first time pass or "p(FTP)" in the standard UL 94 testing of 5 bars. Preferably p(FTP) values will be 1 or very close to 1 for high confidence that a sample formulation would achieve a 5VA rating in UL 94 testing.

Table 9 presents the 5VA test results for the low-flow and high-flow benzophenone-BPA copolymer compositions S5 and S7 as compared with low-flow and high-flow BPA-polycarbonate compositions lacking benzophenone endcap. The data of Table 9 demonstrates that the UV-exposed high-flow and low-flow compositions incorporating 4-hydroxybenzophenone endcap (e.g., S5 and S7) can meet 5VA material requirements at thicknesses of 2.5 mm or less, 2.0 mm or less, and 1.5 mm or less, whereas corresponding controls with the high-flow and low-flow BPA-polycarbonate (e.g., CS6 and CS8) do not show any variation in their respective flame resistance after UV-treatment. The failure of UV-treated Sample 7 (S7) at 1.5 mm indicates that endcap mol % and polymer molecular weight may be balanced to achieve 5VA performance.

TABLE 9

| | Flame Resistance | Sample | | | |
|---|---|---|---|---|---|
| | | S5 | CS6 | S7 | CS8 |
| Before UV | 5 VA @ 3 mm | F | F | F | F |
| | 5 VA @ 2.5 mm | F | F | F | F |
| | 5 VA @ 2 mm | F | F | F | F |
| | 5 VA @ 1.5 mm | F | F | F | F |
| After UV | 5 VA @ 2.5 mm | P | F | P | F |
| | 5 VA @ 2 mm | P | F | P | F |
| | 5 VA @ 1.5 mm | P | F | F | F |

P = specimens that passed 5 VA testing;
F = specimens that failed 5 VA testing

The results of Tables 7 and 9 demonstrate that the cross-linked polycarbonates disclosed herein, whether neat or within a blend composition, impart flame resistance (V0 and 5VA) to articles comprising the cross-linked polycarbonates. In particular, the compositions can be used to provide 5VA compliant materials and articles.

The results also demonstrate that even benzophenone-BPA compositions incorporating UV-absorbing polymers (e.g., p-cumylphenol capped ITR-PC) can undergo sufficient cross-linking to provide compositions that exhibit V0 and 5VA performance according to UL 94.

The results further demonstrate that 5VA performance can, surprisingly, be achieved using 0.08 wt % or less of a non-brominated, non-chlorinated flame retardant. This allows preparation of compositions comprising the cross-linked polycarbonates that have high transparency and low haze values. In particular, the cross-linked compositions can be used to provide 5VA compliant materials at 2.5 mm or less, 2 mm or less, and 1.5 mm or less, the materials having high transparencies and low haze values. In comparison, conventional polycarbonate cannot achieve 5VA performance without incorporation of significant quantities of flame retardant, which may lower the transparency of the resulting polycarbonate and effect overall physical properties.

(D) Mechanical and Physical Properties

Improved flame retardance as demonstrated above for the cross-linked compositions is generally not useful if the composition also has excessive loss of mechanical properties that are needed for end use applications. As demonstrated below, the cross-linked compositions retain impact and tensile properties subsequent to UV-treatment.

Table 10 provides mechanical and physical properties of the compositions of Sample 5 (S5), Comparative Sample 6 (CS6), Sample 7 (S7), and Comparative Sample 8 (CS8), the formulations for which are described above in Table 8. The properties provided in Table 10 relate to the samples before UV-treatment. Table 10 shows that the compositions that incorporate benzophenone endcapped-resin exhibit similar mechanical properties to the ones that incorporate conventional BPA-polycarbonate resin.

TABLE 10

| Property (before UV-treatment) | Unit | Sample | | | |
|---|---|---|---|---|---|
| | | S5 | CS6 | S7 | CS8 |
| Modulus of Elasticity | MPa | 2354 | 2332 | 2388 | 2372 |
| Tensile Strength at Break | MPa | 64 | 66 | 70.6 | 68 |
| Flexural Modulus | MPa | 2310 | 2290 | 2360 | 2360 |
| Flexural Modulus | — | 77.4 | 53.1 | 7.36 | 16.3 |
| Flexural Modulus | % | 3.35 | 2.32 | 0.312 | 0.692 |
| NII Ductility | % | 100 | 100 | 100 | 100 |
| NII Impact Strength | J/m | 920 | 911 | 845 | 685 |
| HDT | ° C. | 135.8 | 133.8 | 131.5 | 129.6 |
| MVR | cm$^3$/10 min | 2.81 | 6.35 | 11.5 | 27.6 |
| Abusive MVR | cm$^3$/10 min | 2.89 | 6.52 | 11.7 | 27.7 |

NII = Notched Izod Impact;
HDT = Heat Distortion Temperature;
MVR = Melt Volume Flow Rate The dynamic oscillatory rheology curves of low-flow benzophenone-BPA copolymer resin (S5) and low-flow bisphenol-A based polycarbonate resin (CS6) were run on an ARES strain controlled rheometer using a frequency sweep method to determine the viscosity or modulus of the material as a function of frequency at a constant temperature (300° C.). Frequency sweep measurements were performed using 25 mm parallel-plate geometry at a 20% strain (linear regime) with a fixed gap of 1 mm. The frequency was varied from 0.1 to 500 rad/s.

Figure 13:
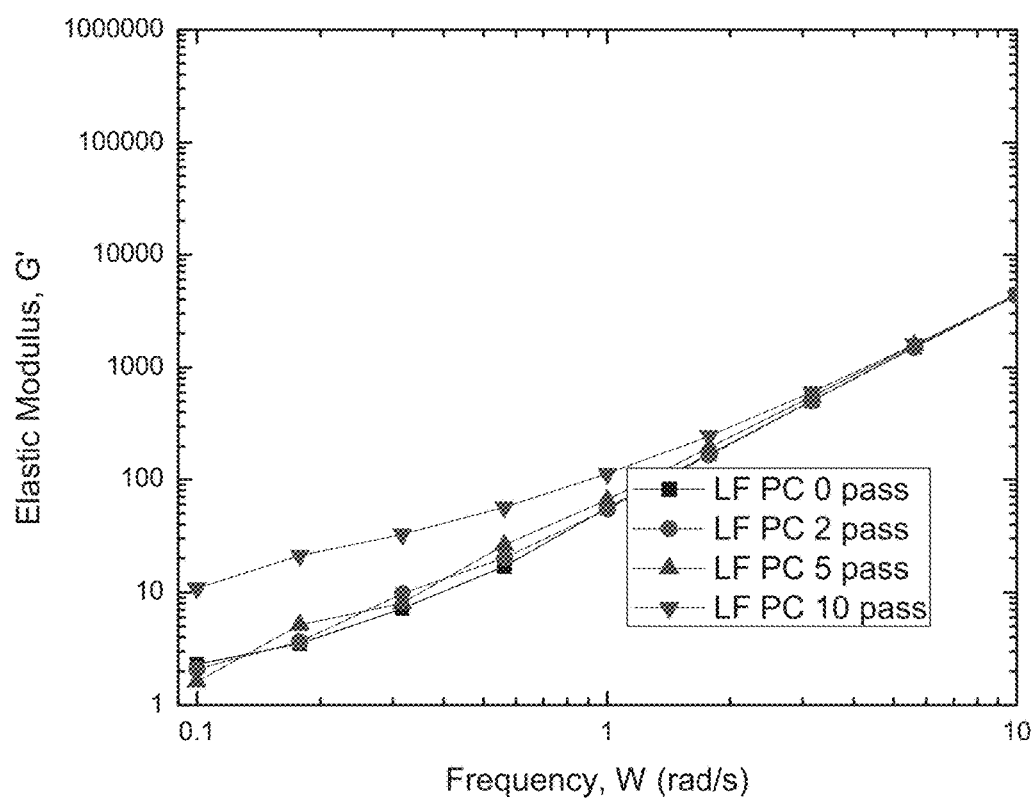
FIG. 13 depicts small amplitude oscillatory rheology [parallel-plate] of a low-flow BPA-polycarbonate resin.
Figure 14:
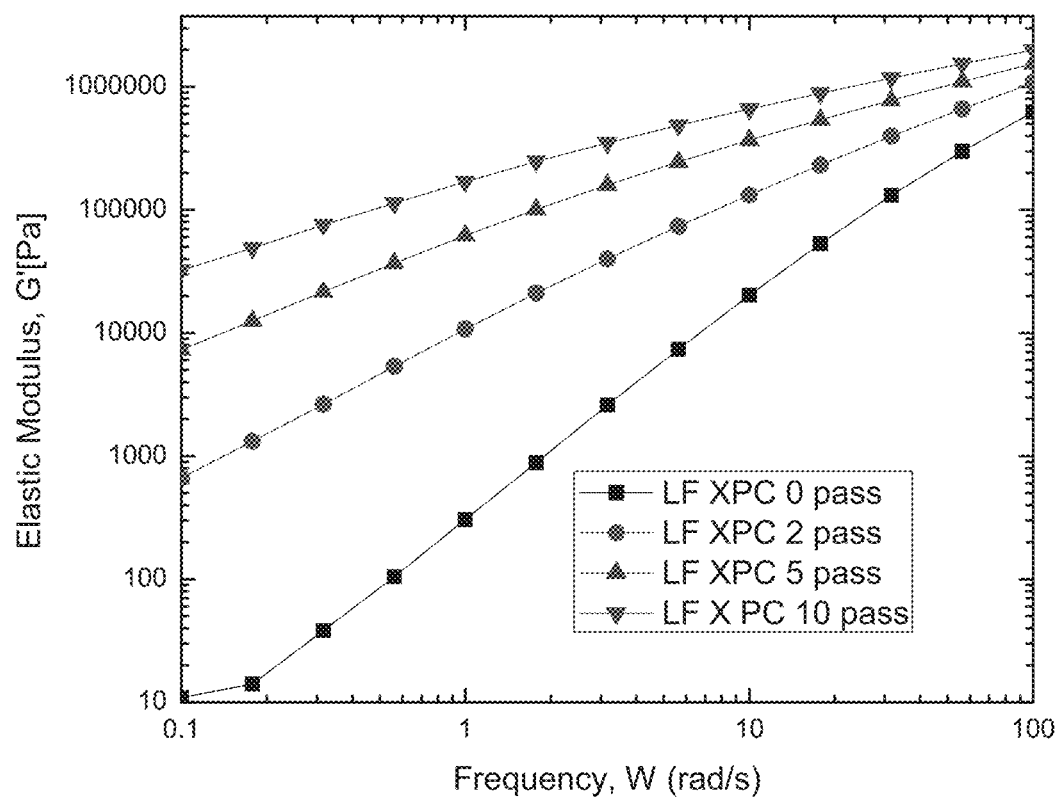
FIG. 14 depicts small amplitude oscillatory rheology [parallel-plate] of a low-flow benzophenone endcapped BPA-polycarbonate copolymer resin.

The dynamic oscillatory rheology curve of low-flow bisphenol-A based polycarbonate resin is shown in FIG. 13; the dynamic oscillatory rheology curve of cross-linkable low-flow benzophenone-BPA copolymer resin is shown in FIG. 14. The dynamic oscillatory rheology was determined on pellets of the resins as a function of passes through a UV Fusion FS300S with a LC-6B Benchtop Conveyor using a D bulb. The time of irradiation was ~90 seconds, providing energy of irradiation of ~3,000 mJ/cm$^2$ for each pass through the conveyor. FIG. 14 shows there is a dramatic increase in the elastic modulus for the benzophenone capped material. For example, at 0.1 rad/s the elastic modulus grows from 10 Pa to 10000 Pa (three orders of magnitude) from 0 to 5 passes, whereas in the low flow BPA poly-carbonate materials (FIG. 13) the elastic modulus is just 2 Pa irrespective of the UV passes. This dramatic increase in elastic modulus as a function UV exposure for the benzophenone capped material indicates the formation of crosslinking in the benzophenone end capped polycarbonate.

Table 11 shows multiaxial impact (MAI) data for the compositions both prior to and after UV-exposure. As shown in Table 11, the improved flame resistance of the present compositions comprising cross-linked polycarbonate is achieved without significant loss of important mechanical properties.

TABLE 11

| Test (3.2 mm disk) | Unit | Sample S7 | S7 | S7 |
|---|---|---|---|---|
| UV-dose | mJ/cm$^2$ | 0 | 7000 | 14000 |
| MAI-Energy to max load | J | 75.4 | 62.4 | 62.9 |
| MAI-Energy to failure | J | 80.5 | 69.1 | 67.5 |
| MAI-Energy, Total | J | 80.5 | 69.1 | 67.6 |
| MAI-Max load | kN | 7.14 | 6.653 | 6.209 |
| MAI-Deflection at max load | mm | 21.3 | 19.6 | 19.9 |
| MAI-Ductility | % | 100 | 100 | 100 |

Table 12 shows that tensile properties of the cross-linked polycarbonate compositions prepared by sun exposure are not affected by UV exposure. At T$_0$ (zero hours exposure) the compositions of Sample S5 had an elongation at break of 141.22% (50 mm/min elongation speed). At 168 hours, the elongation break was 126.23%. By way of comparison, 100 gr PC had an elongation at break of 119.21% at T$_0$. Thus, the tensile strength of the cross-linked compositions is retained after UV-exposure.

TABLE 12

| | Elongation at Break (%) | |
|---|---|---|
| Sun Exposure (h) | Example S5 | 100 gr PC |
| 0 | 141.22% | 119.21% |
| 24 | 121.08% | — |
| 48 | 123.04% | — |
| 168 | 126.23% | — |

(E) Chemical Resistance

Compositions comprising cross-linked polycarbonates disclosed herein were evaluated for chemical resistance. Powders of 4-hydroxybenzophenone-terminated polycarbonates (Examples 3-5), formulated with a phosphite stabilizer and a hindered phenol, were each stabilized and subsequently pelletized to provide composition samples S9-S11. The resulting pellets were molded in the form of 3.2 mm colorchips. Table 13 presents the constituents, the glass transition temperature (Tg), and the melt volume flow rate (MVR) for each sample.

TABLE 13

| | Ingredient | Unit | Sample S9 | S10 | S11 |
|---|---|---|---|---|---|
| Example 3 | Benzophenone-BPA copolymer-1.7 mol-%-28 k | % | 100 | | |
| Example 4 | Benzophenone-BPA copolymer-2.5 mol-%-27 k | % | | 100 | |
| Example 5 | Benzophenone-BPA copolymer-0.5 mol-%-28 k | % | | | 100 |
| | Phosphite Stabilizer | % | 0.06 | 0.06 | 0.06 |
| | Hindered Phenol Stabilizer | % | 0.05 | 0.05 | 0.05 |
| MVR | Melt Volume Flow Rate | cc/10 min | 5.3 | 4.8 | 8.1 |
| Abusive MVR | Abusive Melt Volume Flow Rate | cc/10 min | 5.4 | 5.6 | 8.6 |
| Tg | Glass Transition Temperature | °C. | 151.7 | 151.7 | 152.1 |

Colorchips of S9-S11 were plunged into a test fluid for a duration of 5 minutes to assess chemical resistance to the fluid. Table 14 shows the chemical resistance of each composition S9-S11 to toluene, acetone, and Windex®. Table 14 shows that higher amounts of 4-hydroxybenzophenone endcap (e.g., 2.5 mol % as in S10) led to improved chemical resistance, independently of the resin molecular weight. The non-UV treated colorchips, when treated with acetone or toluene, exhibited crystallization and shrinking on the colorchip surface.

TABLE 14

| Chemical Resistance | | Sample S9 | S10 | S11 |
|---|---|---|---|---|
| Before UV | toluene | − | − | − |
| | acetone | − | − | − |
| | Windex® | +++ | +++ | +++ |
| After UV | toluene | + | ++ | + |
| | acetone | + | ++ | + |
| | Windex® | +++ | +++ | +++ |

"−" = cracking/blistering observed;
"+" = lowered gloss observed;
"++" = solvent mark observed;
"+++" = no visual change observed Table 15 shows that UV-irradiated samples S1 and S3, the formulations for which are described above in Table 6, are resistant to chemical treatment after exposure to UV radiation, as compared to the respective control samples CS2 and CS4. Surprisingly, even benzophenone-BPA blends including UV-absorbing polymers (e.g., p-cumylphenol capped ITR-PC) such as that of S1 underwent sufficient cross-linking to provide compositions that exhibit extreme chemical resistance (e.g., resistance to acetone).

TABLE 15

| | | Sample | | | |
|---|---|---|---|---|---|
| | | S1 (blend) (HBP-BPA/ ITR-PC) | CS2 (blend) (HF-BPA/ITR-PC) | S3 (neat) (HBP-BPA) | CS4 (neat) (HF-BPA) |
| | Chemical Resistance | | | | |
| Before UV | toluene | − | − | − | − |
| | acetone | − | − | − | − |
| | Windex® | +++ | +++ | +++ | +++ |

TABLE 15-continued

|  |  | Sample | | | |
|---|---|---|---|---|---|
|  |  | S1 (blend) | CS2 (blend) | S3 (neat) | CS4 (neat) |
|  | Chemical Resistance | (HBP-BPA/ ITR-PC) | (HF-BPA/ITR-PC) | (HBP-BPA) | (HF-BPA) |
| After UV | toluene | +++ | − | +++ | − |
|  | acetone | ++ | − | ++ | − |
|  | Windex ® | +++ | +++ | +++ | +++ |

"−" = cracking/blistering observed;
"+" = lowered gloss observed;
"++" = solvent mark observed;
"+++" = no visual change observed;
HBP-BPA = Benzophenone-BPA copolymer-2.5 mol % 26 k;
HF-BPA = High-Flow Bisphenol-A based polycarbonate resin;
HBP-BPA/ITR-PC = Benzophenone-BPA copolymer-2.5 mol-%-26 k/p-cumylphenol capped poly(20 wt % isophtalate-terephthalate-resorcinol ester)-co-(80 wt % bisphenol-A carbonate) copolymer;
HF-BPA/ITR-PC = High-Flow Bisphenol-A based polycarbonate resin/p-cumylphenol capped poly(20 wt % isophtalate-terephthalate-resorcinol ester)-co-(80 wt % bisphenol-A carbonate) copolymer.

The cross-linked polycarbonate composition S5 was further evaluated for chemical resistance under strain conditions. In a strain jig, four tensile bars were positioned. The tensile bars were molded at 550° F. barrel temperature, 180° F. mold temperature and 0.5 in/s injection speed. Two bars comprised the cross-linked polycarbonate composition S5, and two comprised the S5 composition prior to UV-treatment. The curvature of the jig induced a 1% stress level on the tensile bars. A portion of the bars was exposed to acetone by dripping the solvent on top of the tensile bars. As shown in Table 16, the tensile bars of the samples without UV-treatment snapped upon exposure to acetone, whereas the tensile bars comprised of the cross-linked polycarbonate did not snap.

TABLE 16

| | Test Conditions | | | Sample |
|---|---|---|---|---|
| | Strain | Temperature | Exposure Time | Solvent | S5 |
| Before UV | 1% | 23° C. | Until solvent evaporates | Acetone | Bars snapped |
| After UV | 1% | 23° C. | Until solvent evaporates | Acetone | Bars did not snap |

The chemical resistance results of Tables 14-16 demonstrate that the cross-linked polycarbonates disclosed herein, whether neat or within a blend composition, impart chemical resistance to articles comprising the cross-linked polycarbonate. The results also demonstrate that even blends with UV-absorbing polymers can achieve sufficient cross-linking to provide compositions that exhibit extreme chemical resistance.

(F) Haze

Compositions comprising cross-linked polycarbonates disclosed herein were evaluated for haze value. Percent haze (% Haze) was determined for the compositions of samples S5 and S7, the formulations for which are described above in Table 8. The percent haze for each sample was less than 2%, the haze value measured on 2.54 mm thick color chips using a Color-Eye 7000A Spectrometer.

BLEND EXAMPLES

The following materials were used in the Examples:

| Compound | Description |
|---|---|
| HF-PC | High flow bisphenol-A polycarbonate homopolymer, Mw ≈ 22,000 |
| LF-PC | Low flow bisphenol-A polycarbonate homopolymer, Mw ≈ 31,000 |
| EXL | Polycarbonate-polysiloxane copolymer |
| BP-PC | Benzophenone-polycarbonate, Mw ≈ 21,000 |
| KSS | Potassium sulfone sulfonate |
| TSAN | Polytetrafluoroethylene encapsulated in styrene acrylonitrile copolymer, anti-drip agent |
| PETS | Pentaerythritol tetrastearate, >90% esterified, mold release agent |
| UVA 234 | UV stabilizer |
| Phosphite | Phosphite stabilizer |
| CB | Carbon black |

Melt volume rates (MVR) were measured in accordance with the ISO 1133 standard at 300° C. under a load of 1.2 kilogram (kg). MVR is reported in cubic centimeters (cc) of polymer melt/10 minutes.

Notched Izod impact ("NII") measurements were performed on notched 3.2 mm Izod bars, in accordance with the ASTM D256 standard with a 4 Joule hammer, and are reported in units of J/m.

The EXL copolymer used in the Examples had the structure of FIG. 7. This polycarbonate-polysiloxane copolymer had an average siloxane content of 20 wt % derived from polydimethylsiloxane and 80 wt % of bisphenol-A, end-capped with p-cumylphenol. The polydiorganosiloxane chain length was about 40-60, and the copolymer has a Mw of about 30,000 Daltons.

The EXL copolymer (20 wt % siloxane) was made according to the following procedure. To the formulation tank was added dichloromethane (15 L), DI water (10 L), bisphenol-A (3,700 g, 16.2 moles), D45 eugenol siloxane (1150 g, 0.30 mole), triethylamine (30 g, 0.30 mole, 1.7 mole %) and sodium gluconate (10 g, iron scavenger). The mixture was stirred then transferred to the batch reactor. The formulation tank was rinsed with dichloromethane (5 L) which was transferred to the batch reactor. The reactor agitator was started and the circulation flow was set at 80 L/min. Phosgene vapor flow to the reactor was initiated by the DCS (segment 1:215 g, 80 g/min). The pH of the reaction was maintained at a target of 10.0 by DCS controlled addition of 33% aqueous NaOH. After addition of 215 g of phosgene a solution of para cumyl phenol (116 g, 0.55 mole) in dichloromethane was added to the reactor by DCS control while phosgene flow to the reactor continued. Phosgene addition continued until the total set point was reached (2150 g, 21.7 moles). After completion of the phosgene addition, a sample of the reactor was obtained and verified to be free of un-reacted BPA and free of chloroformate. Mw of a reaction sample was determined by GPC (Mw=30278, PDI=2.7). An additional charge of phosgene was added (200 g, 2.0 mole) to the reactor. The reactor was purged with nitrogen then the batch was transferred to the centrifuge feed tank.

To the batch in the feed tank was added dilution dichloromethane (8 L) then the mixture was purified using a train of liquid-liquid centrifuges. Centrifuge one removed the brine phase. Centrifuge two removed the catalyst by extracting the resin solution with aqueous hydrochloric acid (pH 1). Centrifuges three through eight removed residual ions by extracting the resin solution with DI water. A sample of the resin solution was tested and verified less than 5 ppm each of ionic chloride and residual triethylamine.

Table 17 below. Properties were measured before UV exposure, and after UV exposure (5 passes, 30 J/cm$^2$ of UVA energy on each side using a Fusion UV system).

TABLE 17

| Ingredient | Unit | Ex. 1 | Ex. 2 | Ex. 3 | Ex. 4 | Ex. 5 | Ex. 6 | Ex. 7 |
|---|---|---|---|---|---|---|---|---|
| HF-PC | % | 38.3 | 0 | 38.3 | 0 | 38.3 | 0 | 0 |
| LF-PC | % | 38.25 | 38.25 | 0 | 0 | 38.25 | 0 | 0 |
| EXL | % | 22.18 | 22.18 | 22.18 | 22.18 | 22.18 | 22.18 | 22.18 |
| BP-PC | % | 0 | 38.3 | 38.25 | 76.55 | 0 | 76.845 | 76.55 |
| KSS | % | 0.295 | 0.295 | 0.295 | 0.295 | 0.295 | 0.295 | 0.295 |
| TSAN | % | 0.295 | 0.295 | 0.295 | 0.295 | 0.295 | 0 | 0.295 |
| PETS | % | 0.295 | 0.295 | 0.295 | 0.295 | 0.295 | 0.295 | 0.295 |
| UVA 234 | % | 0.295 | 0.295 | 0.295 | 0.295 | 0.295 | 0.295 | 0.295 |
| Phosphite | % | 0.09 | 0.09 | 0.09 | 0.09 | 0.09 | 0.09 | 0.09 |
| CB | % | 1.02 | 1.02 | 1.02 | 1.02 | 1.02 | 1.02 | 1.02 |
| MVR (360 sec) | cc/10 min | 10 | 7.07 | 10.8 | 8.26 | 9.23 | 8.88 | 8.36 |
| MVR (1800 sec) | cc/10 min | 9.31 | 7.75 | 11.8 | 9.47 | 8.95 | 9.12 | 8.81 |
| | | | | Not Exposed to UV | | | | |
| NII Ductility (23 C., 5 lbf/ft) | % | 100 | 100 | 100 | 100 | 100 | 100 | 100 |
| NII Impact (23 C., 5 lbf/ft) | J/m | 807 | 820 | 834 | 783 | 819 | 795 | 814 |
| NII Ductility (−30 C., 5 lbf/ft) | % | 100 | 100 | 100 | 100 | 100 | 100 | 100 |
| NII Impact (−30 C., 5 lbf/ft) | J/m | 702 | 692 | 731 | 651 | 706 | 702 | 708 |
| UL 5VA burn through hole? | — | Yes | Yes | Yes | Yes | Yes | Yes | Yes |
| | | | | UV-Exposed | | | | |
| NII Ductility (23 C., 5 lbf/ft) | % | 100 | 100 | 100 | 100 | 100 | 100 | 100 |
| NII Impact (23 C., 5 lbf/ft) | J/m | 821 | 829 | 795 | 1040 | 804 | 819 | 820 |
| NII Ductility (−30 C., 5 lbf/ft) | % | 100 | 100 | 100 | 100 | 100 | 100 | 100 |
| NII Impact (−30 C., 5 lbf/ft) | J/m | 716 | 722 | 705 | 657 | 694 | 682 | 711 |
| UL 5VA burn through hole? | — | Yes | Yes | Yes | NO | Yes | NO | Yes |

The resin solution was transferred to the precipitation feed tank. The resin was isolated as a white powder by steam precipitation followed by drying in a cone shaped dryer using heated nitrogen (130° C.).

Synthesis of Benzophenone-containing Polycarbonate (BP-PC)

A benzophenone-containing polycarbonate resin (BP-PC) was synthesized as follows. The following were added into a 70 L CSTR equipped with an overhead condenser and a recirculation pump with a flow rate of 40 L/minute: (a) 4,4-bis-(hydroxyphenyl)-2,2-propane (BPA) (4000 grams, 17.52 moles); (b) 4-hydroxybenzophenone (18 grams, 0.09 moles); (c) para-cumylphenol (148 grams, 0.697 moles); (d) triethylamine (60 mL, 0.593 moles); (e) methylene chloride (24.4 L); (f) de-ionized water (10.8 L), and (g) sodium gluconate (10 grams). The reaction was allowed to stir for 10 minutes and the pH was maintained at pH=9 by the addition of 30% NaOH solution. The mixture was charged with phosgene (2500 grams, 80 g/min, 23.3 moles). During the addition of phosgene, base (30 wt % NaOH) was simultaneously charged to the reactor to maintain the pH of the reaction between 8.5-9. After the complete addition of phosgene, the reaction was purged with nitrogen gas, and the organic layer was separated. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 21,171 g/mol (referenced to polycarbonate standards) and polydispersity index=3.22.

Examples 1-7

Different blends of polycarbonate, polycarbonate-polysiloxane (EXL), and BP-PC were compounded as shown in Table 17 showed that blends containing the BP-PC resin retained their low temperature ductility after UV exposure. Example 4 and Example 6 reached UL 5VA performance at 2.5 mm while retaining ductility at −30° C. Example 6 did not contain TSAN, generally used as an anti-drip agent, and still passed the 5VA test. Table 17 also showed that a minimum amount of BP-PC resin was needed to obtain 5VA performance.

Examples PCB-1 through PCB-13

Next, an XPC-1 polycarbonate formed from bisphenol-A and having 3.45 mole % 4-hydroxybenzophenone endcaps and a molecular weight of 22,000 g/mol by polycarbonate standards was blended with other polymers and cast into films of 20 micrometers (μm) to 40 μm thickness.

Those polymers were a sebacic acid-co-bisphenol A copolymer (SA-BPA); an ethylene-acrylic ester-glycidyl acrylate terpolymer (Lotader AX8900); a polyethylene terephthalate polymer (TRITAN TX1000 from Eastman); a bisphenol-A homopolymer (LF-PC); a polystyrene polymer (Crystal Polystyrene 585 from Total Petrochemicals); a poly(methyl methacrylate) polymer (PERSPEX CP-61); a thermoplastic polyester (PCTG) containing 80% CHDM; a polybutylene terephthalate polymer (VALOX 195); a methyl methacrylate-butadiene-styrene copolymer with 70% rubber content (MBS); an acrylonitrile-butadiene-styrene copolymer with 16% rubber content (ABS); and a dimethyl bisphenol cyclohexane-co-bisphenol-A copolymer (DMBPC-BPA, DMX1435).

A total of 14 compositions, labeled PCB-0 through PCB-13, were made. PCB-0 was a control, and was 100% LF-PC (i.e. no blend). PCB-1 was also a control, and was 100% XPC-1 (i.e. no blend). The films formed from the 14 compositions were exposed to UV radiation by passing the films placed on a conveyor under a D-bulb to expose the film. A Fusion UV system was used. Each pass provided approximately 6.0 J/cm² of UVA energy (320-390 nm), 1.8 J/cm² of UVB energy (280-320 nm), 0.22 J/cm² of UVC energy (250-260 nm), and 2.9 J/cm² of UVV energy (395-445 nm) as measured by an EIT PowerPuck.

The appearance of the film prior to UV exposure was evaluated. The films were then passed either 1, 2, or 6 times without delay under the UV lamp. The films were left in the dark for 48 hours, then evaluated visually for crosslinking (Y/N). The glass transition temperature (Tg) was measured using DSC. Only one surface of the film was exposed. The results are provided in Tables 18A and 18B. The amounts of the polymers are reported in weight percent.

TABLE 18A

| Components | PCB-0 | PCB-1 | PCB-2 | PCB-3 | PCB-4 | PCB-5 | PCB-6 |
|---|---|---|---|---|---|---|---|
| XPC-1 (3.45 mol %) |  | 100 | 80 | 50 | 80 | 80 | 80 |
| SA-BPA |  |  | 20 | 50 |  |  |  |
| Lotader AX8900 |  |  |  |  | 20 |  |  |
| Tritan PET |  |  |  |  |  | 20 |  |
| LF-PC | 100 |  |  |  |  |  | 20 |
| Initial Film Appearance | Clear | Clear | Clear | Clear | Haze | Some Haze | Clear |
| Crosslinked, 0 passes | N | N | N | N | N | N | N |
| Crosslinked, 1 pass | N | Y | Y | Y | Y | Y | Y |
| Crosslinked, 2 passes | N | Y | Y | Y | Y | Y | Y |
| Crosslinked, 6 passes | N | Y | Y | Y | Y | Y | Y |
| DSC Tg (° C.), 0 passes | 150 | 149 | 146 | 137 | 146 | 138 | 148 |
| DSC Tg (° C.), 6 passes | 149 | 152 | 145 | 142 | 147 | 146 | 152 |

TABLE 18B

| Components | PCB-7 | PCB-8 | PCB-9 | PCB-10 | PCB-11 | PCB-12 | PCB-13 |
|---|---|---|---|---|---|---|---|
| XPC-1 (3.45 mol %) | 80 | 80 | 75 | 75 | 85 | 85 | 80 |
| Polystyrene | 20 |  |  |  |  |  |  |
| PMMA |  | 20 |  |  |  |  |  |
| PCTG |  |  | 25 |  |  |  |  |
| PBT Valox 195 |  |  |  | 25 |  |  |  |
| MBS |  |  |  |  | 15 |  |  |
| ABS |  |  |  |  |  | 15 |  |
| DMBPC-BPA |  |  |  |  |  |  | 20 |
| Initial Film Appearance | Clear | Haze | Clear | Clear | Opaque | Opaque |  |
| Crosslinked, 0 passes | N | N | N | N | N | N | N |
| Crosslinked, 1 pass | Y | Y | N | N | Y | N | Y |
| Crosslinked, 2 passes | Y | Y | Y | Y | Y | Y | Y |
| Crosslinked, 6 passes | Y | Y | Y | Y | Y | Y | Y |
| DSC Tg (° C.), 0 passes | 102, 145 | 144 | 140 | 101 | 148 | 111, 149 | 147 |
| DSC Tg (° C.), 6 passes | 104, 152 | 148 | 136 | 102 | 148 | 109, 147 | 153 |

As seen here, generally all films containing XPC-1 were crosslinked after 2 passes. The Tg increased after crosslinking for the blends containing XPC-1, as indicated by the increase in Tg. No crosslinking or increase in Tg occurred in the control PCB-0.

Chemical Resistance Tests

A set of chemical resistance tests was performed. The tests were performed using an XPC-2 polymer, which was formed from bisphenol-A and had 5.5 mole % 4-hydroxybenzophenone endcaps and a molecular weight of 17,000 g/mol by polycarbonate standards. 50 parts by weight of the XPC-2 polymer was blended with 50 parts by weight of HF-PC, 0.08 phr KSS, 0.06 phr phosphite stabilizer to form a composition (CR1). Parts having a thickness of 2.5 millimeters (mm) were made from the composition, and exposed to various dosages (0, 12, 36, 60 J/cm² of UVA, measured before filtering) while covered with long pass filters of different cut-on wavelengths (220, 280, 320, 395 nm). The YI was then measured after 10 minutes, 24 hours, 48 hours, and 168 hours at 23° C. The color difference dE* was then calculated. The haze was also measured before and after acetone immersion. The part was immersed for 60 seconds in acetone, then dried in air for 1 minute, soaked in deionized water for 5 minutes, dried, and placed in the dark before measurement. EX-10 is the control (no exposure). The results are shown in Tables 19A and 19B.

TABLE 19A

|  | Ex-10 | Ex-11 | Ex-12 | Ex-13 | Ex-14 | Ex-15 | Ex-16 |
|---|---|---|---|---|---|---|---|
| Component | CR1 | CR1 | CR1 | CR1 | CR1 | CR1 | CR1 |
| Dose (UVA, J/cm²) | 0 | 12 | 36 | 60 | 12 | 36 | 60 |
| Wavelength cutoff | N/A | 220 | 220 | 220 | 280 | 280 | 280 |
| YI (23° C., 10 min) | 2.0 | 9.0 | 20.7 | 25.1 | 8.0 | 19.6 | 22.5 |

TABLE 19A-continued

|  | Ex-10 | Ex-11 | Ex-12 | Ex-13 | Ex-14 | Ex-15 | Ex-16 |
|---|---|---|---|---|---|---|---|
| YI (23° C., 24 hr) | 2.0 | 6.4 | 14.5 | 17.8 | 5.2 | 12.3 | 14.6 |
| YI (23° C., 48 hr) | 1.9 | 6.1 | 13.3 | 16.2 | 5.0 | 11.3 | 13.7 |
| YI (23° C., 168 hr) | 2.1 | 5.6 | 11.8 | 13.9 | 4.9 | 9.4 | 12.0 |
| dE* | — | 2.1 | 5.6 | 6.0 | 1.5 | 4.1 | 5.6 |
| Gel Thickness (microns) | 0 | 0 | 0 | 28 | 0 | 0 | 4.3 |
| Haze, Before immersion | 6.6 | 4.6 | 6.9 | 6.7 | 6.8 | 6.9 | 6.8 |
| Haze, Acetone Immersion | 80.1 | 49.9 | 45.9 | 23.8 | 37.2 | 7.3 | 7.8 |

TABLE 19B

|  | Ex-17 | Ex-18 | Ex-19 | Ex-20 | Ex-21 | Ex-22 |
|---|---|---|---|---|---|---|
| Component | CR1 | CR1 | CR1 | CR1 | CR1 | CR1 |
| Dose (UVA, J/cm$^2$) | 12 | 36 | 60 | 12 | 36 | 60 |
| Wavelength cutoff | 320 | 320 | 320 | 395 | 395 | 395 |
| YI (23° C., 10 min) | 10.6 | 21.1 | 22.9 | 2.0 | 2.1 | 2.1 |
| YI (23° C., 24 hr) | 7.6 | 12.3 | 14.7 | 1.9 | 2.0 | 2.1 |
| YI (23° C., 48 hr) | 6.1 | 12.0 | 13.6 | 1.9 | 2.0 | 2.0 |
| YI (23° C., 168 hr) | 5.7 | 9.1 | 11.5 | 2.1 | 2.2 | 2.2 |
| dE* | 2.1 | 3.9 | 5.3 | 0.0 | 0.1 | 0.1 |
| Gel Thickness (microns) | 0 | 0 | 0 | 0 | 0 | 0 |
| Haze, Before immersion | 6.6 | 7.7 | 7.2 | 7.4 | 7.2 | 7.0 |
| Haze, Acetone Immersion | 13.0 | 23.2 | 6.5 | 92.1 | 86.9 | 91.7 |

Comparing the examples with the same dosage, the cutoff at 395 nm was most effective in reducing the overall YI and the color difference. A cutoff at 280 nm or 320 nm appeared to best maintain a low haze. The hydroxybenzophenone unit absorbs light at about 335 nm, while the carbonate units absorb light at about 245 nm. Using the 220 nm filter, both units are absorbing light, and while there is a significant gel (Ex-13), there is also significant haze, which is believed to be due to Fries rearrangement.

Blends Including Polycarbonate-Polysiloxane Copolymer

Some additional blends were made that included a polycarbonate-polysiloxane copolymer (PC-PS1). The PC-PS1 was a polycarbonate-polysiloxane block copolymer comprising about 6 wt % of siloxane residues derived from polydimethylsiloxane and 80 wt % of bisphenol-A, end-capped with p-cumylphenol. The polydiorganosiloxane chain length was about 40-60, and the copolymer has a Mw of about 23,000 Daltons.

Polycarbonate-Polysiloxane Copolymer

The PC-PS1 copolymer (6 wt % siloxane) was made according to the following procedure. To the formulation tank was added dichloromethane (8 L), DI water (9 L), bisphenol-A (4000 g, 17.5 moles), p-cumylphenol (160 g, 0.75 mole), triethylamine (30 g, 0.30 mole) and sodium gluconate (10 g). The mixture was transferred to the batch reactor. The formulation tank was rinsed with dichloromethane (3 L) which was transferred to the batch reactor. The reactor agitator was started and circulation flow was set at 80 L/min. Phosgene flow to the reactor was initiated (segment 1: 230 g, 80 g/min rate). A pH target of 10.0 was maintained throughout the batch by the DCS controlled addition of 33% aqueous sodium hydroxide. After 230 g phosgene addition to the batch reactor the tubular reactor initiated to add eugenol-end capped D-45 chloroformate to the batch reactor (312 g, 0.08 mole, 20 wt % solution in dichloromethane chilled to 10° C.). The D45 solution flow rate to the tubular reactor was 500 g/min (3.1 min addition cycle) with phosgene addition to the tubular reactor at 28 g/min (5 mol phosgene/mol D45 OH group) and 18% aqueous sodium hydroxide flow to the tubular reactor at 316 g/min (5 mol NaOH/mol phosgene, chilled to 4° C.). After completion of siloxane addition via the tubular reactor, the tubular reactor was flushed with dichloromethane (2 L) and DI water (2 L) to the batch reactor. Phosgene flow continued to the batch reactor during the tubular reactor cycle (segment 2: 2070 g, 80 g/min rate). The total phosgene addition time to the batch reactor was 29 minutes. After completion of the phosgene addition, a sample of the reactor was obtained and verified to be free of un-reacted BPA and free of chloroformate. Mw of the reaction sample was determined by GPC. The reactor was purged with nitrogen then the batch was transferred to the centrifuge feed tank.

To the batch in the feed tank was added dilution dichloromethane (8 L) then the mixture was purified using a train of liquid-liquid centrifuges. Centrifuge one removed the brine phase. Centrifuge two removed the catalyst by extracting the resin solution with aqueous hydrochloric acid (pH 1). Centrifuges three through eight removed residual ions by extracting the resin solution with DI water. A sample of the resin solution was tested and verified less than 5 ppm each of ionic chloride and residual triethylamine.

The resin solution was transferred to the precipitation feed tank. The resin was isolated as a white powder by steam precipitation followed by drying in a cone shaped dryer using heated nitrogen (130° C.).

Blend with XPC

Two different cross-linkable polycarbonate resins (XPC) were made. These XPC resins were bisphenol-A polymers with 4-hydroxybenzophenone endcaps present in an amount of 3.4 mole %, remainder p-cumylphenol endcaps. XPC-A had an Mw of 31,000 and XPC-B had an Mw of 21,500. These were blended with the PC-PS1 and compared against a blend using two bisphenol-A homopolymers (LF-PC and HF-PC). Other additives were included, and various properties were measured before and after UV exposure. The UV exposure was 5 passes (30 J/cm$^2$ of UVA energy) on each side of a plaque using a Fusion UV system. The results are shown in Table 20.

TABLE 20

| Components | 140-1 | 140-2 |
|---|---|---|
| PC-PS1 (pbw) | 83 | 83 |
| XPC-A (pbw) | 11 |  |
| XPC-B (pbw) | 6 |  |
| LF-PC (pbw) |  | 11 |

TABLE 20-continued

| Components | 140-1 | 140-2 |
|---|---|---|
| HF-PC (pbw) | | 6 |
| Phosphite stabilizer (phr) | 0.02722 | 0.02722 |
| Phosphorus acid solution (0.15%) (phr) | 0.10 | 0.10 |
| MVR (1.2 kg/300 C, 360 s) | 8.41 | 9.83 |
| MVR (1.2 kg/300 C, 1080 s) | 7.82 | 9.3 |
| Chemical Resistance (Elongation @ Break) | | |
| As molded | 58.3 | 60.9 |
| Acetone @ 0.5% strain | | |
| No UV | 29.77 | 8.8 |
| Exposed to UV | 116.18 | 7.29 |
| Acetone @ 1% strain | | |
| No UV | 8.95 | 8.64 |
| Exposed to UV | 73.45 | 8.66 |

The blend containing XPC resin generally had much higher chemical resistance compared to the example that did not.

Next, a flame performance test was performed. 913-1 was the control. Measurements were taken before and after UV exposure. The results are shown in Table 21.

TABLE 21

| Components | 913-1 | 913-2 |
|---|---|---|
| XPC (3.45 mol %) (pbw) | | 50 |
| LF-PC (pbw) | 100 | 50 |
| Rimar Salt (phr) | 0.1 | 0.1 |
| Phosphite stabilizer (phr) | 0.06 | 0.06 |
| MFR (1.2 kg/300 C, 360 s) | 6.67 | 9.28 |
| MFR (1.2 kg/300 C, 1080 s) | 7.17 | 9.26 |
| Gel Thickness (micron) | 0 | 9.85 |
| Delta YI | 3.4 | 15.4 |
| Flame Performance (non-UV exposure) | | |
| p(FTP) for V0 @ 1.5 mm (48 hr) | 0 | 0 |
| flaming drips | 2/3 | 3/3 |
| p(FTP) for V0 @ 1.2 mm (48 hr) | 0 | 0 |
| flaming drips | 2/3 | 2/3 |
| p(FTP) for V0 @ 1.0 mm (48 hr) | 0 | 0 |
| flaming drips | 3/3 | 3/3 |
| 5 VA @ 1.5 mm (48 hr) | Fail | Fail |
| Flame Performance (after UV exposure) | | |
| p(FTP) for V0 @ 1.5 mm (48 hr) | 0 | 0.983 |
| flaming drips | 6/10 | 0/18 |
| p(FTP) for V0 @ 1.2 mm (48 hr) | 0 | 0.2 |
| flaming drips | 8/10 | 1/18 |
| p(FTP) for V0 @ 1.0 mm (48 hr) | 0.74 | 0.57 |
| flaming drips | 1/18 | 1/18 |
| 5 VA @ 1.5 mm | Fail | Pass |
| Chemical Resistance (Elongation @ Break) | | |
| As molded bar | 134.2 | 138.0 |
| Acetone @ 0.5% strain | | |
| No UV | 10.5 | 8.9 |
| Exposed to UV | 5.9 | 78.9 |
| Acetone @ 1% strain | | |
| No UV | 0.0 | 0.0 |
| Exposed to UV | 0.0 | 68.0 |

As seen here, prior to UV exposure, the blend containing XPC (913-2) did not attain a V0 or 5VA rating. However, after UV exposure, the XPC blend passes the 5VA and V0 rating at 1.5 mm thickness. The chemical resistance is also higher after UV exposure, and higher compared to the non-XPC control.

Finally, a mouse cover was made from an XPC-D resin which was a bisphenol-A polymer with 4-hydroxybenzophenone endcaps present in an amount of 2.5 mole %, remainder p-cumylphenol endcaps, and having an Mw of 22,000. The XPC-D resin was blended with 0.06 phr phosphite stabilizer. The composition had an MVR (300° C./1.2 kg, 360 sec dwell) of 8.5 cc/10 min.

The molded mouse cover was passed 6 times through the Loctite system, with the top facing the UV lamp. A t-bar was also exposed as a control for comparison.

The gel thickness of the mouse cover was 18.64 microns at the front, 24.10 microns at the middle, and 16.55 microns at the back, with an average thickness of 19.76 microns for the entire part. For comparison, the gel thickness for the t-bar was 29.91 microns. The YI of the mouse cover before UV exposure was 0.18, and 48 hours after UV exposure was 3.84.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A polymeric blend, comprising:
   a photoactive additive which is a cross-linkable polycarbonate resin containing a photoactive endcap group derived from a monofunctional benzophenone; and
   a polymer resin which is different from the photoactive additive.

2. The blend of claim 1, wherein the polymer resin is a polyester, a polysiloxane-co-bisphenol-A polycarbonate, a polyesteramide, a polyimide, a polyetherimide, a polyamideimide, a polyether, a polyethersulfone, a polyepoxide, a polylactide, a polylactic acid (PLA), or any combination thereof.

3. The blend of claim 1, wherein the polymer resin is a vinyl polymer, a rubber-modified graft copolymer, an acrylic polymer, polyacrylonitrile, a polystyrene, a polyolefin, a polyester, a polyesteramide, a polysiloxane, a polyurethane, a polyamide, a polyamideimide, a polysulfone, a polyepoxide, a polyether, a polyimide, a polyetherimide, a polyphenylene ether, a polyphenylene sulfide, a polyether ketone, a polyether ether ketone, an acrylonitrile-butadiene-styrene (ABS) resin, an acrylic-styrene-acrylonitrile (ASA) resin, a polyethersulfone, a polyphenylsulfone, a poly(alkenylaromatic) polymer, a polybutadiene, a polyacetal, a polycarbonate, a polyphenylene ether, an ethylene-vinyl acetate copolymer, a polyvinyl acetate, a liquid crystal polymer, an ethylene-tetrafluoroethylene copolymer, an aromatic polyester, a polyvinyl fluoride, a polyvinylidene fluoride, a polyvinylidene chloride, tetrafluoroethylene, a polylactide, a polylactic acid (PLA), a polycarbonate-polyorganosiloxane block copolymer, or a copolymer comprising: (i) an aromatic ester, (ii) an estercarbonate, and (iii) carbonate repeat units.

4. The blend of claim 1, wherein the polymer resin is a homopolycarbonate, a copolycarbonate, a polycarbonate-polysiloxane copolymer, a polyester-polycarbonate, or a p-cumyl phenol capped poly(isophthalate-terephthalate-resorcinol ester)-co-(bisphenol-A carbonate) copolymer.

5. The blend of claim 1, wherein the polymer resin is a p-cumyl phenol capped poly(isophthalate-terephthalate-resorcinol ester)-co-(bisphenol-A carbonate) polymer or a polycarbonate-polysiloxane copolymer having a polysiloxane content from 0.4 wt % to 25 wt %.

6. The blend of claim 5, wherein the polycarbonate-polysiloxane copolymer is a siloxane block co-polycarbonate comprising from about 6 wt % siloxane (±10%) to about 20 wt % siloxane (±10%), and having a siloxane chain length of 10 to 200.

7. The blend of claim 1, wherein the polymer resin is a polyphosphonate polymer, a polyphosphonate copolymer, or a poly(polyphosphonate)-co-(BPA carbonate) copolymer.

8. The blend of claim 1, wherein the polymer resin is selected from the group consisting of a polycarbonate-polysiloxane copolymer; a polycarbonate resin having an aliphatic chain containing at least two carbon atoms as a repeating unit in the polymer backbone; an ethylene-acrylic ester-glycidyl acrylate terpolymer; a polyethylene terephthalate polymer; a bisphenol-A homopolymer; a polystyrene polymer; a poly(methyl methacrylate) polymer; a thermoplastic polyester; a polybutylene terephthalate polymer; a methyl methacrylate-butadiene-styrene copolymer; an acrylonitrile-butadiene-styrene copolymer; or a dimethyl bisphenol cyclohexane-co-bisphenol-A copolymer.

9. The blend of claim 1, wherein the weight ratio of the photoactive additive to the polymer resin is from 1:99 to 99:1.

10. The blend of claim 1, wherein the weight ratio of the photoactive additive to the polymer resin is from about 50:50 to about 85:15.

11. The blend of claim 1, wherein the photoactive additive is formed from the reaction of:
 the monofunctional benzophenone;
 a first linker moiety comprising a plurality of linking groups, wherein each linking group reacts with the functional group of the first photoactive moiety; and
 a chain extender.

12. The blend of claim 11, wherein the functional group of the monofunctional benzophenone is a hydroxyl group, an amino group, or a carboxylate group or equivalent thereof.

13. The blend of claim 11, wherein the monofunctional benzophenone is a monohydroxybenzophenone.

14. The blend of claim 11, wherein the reaction that forms the photoactive additive further comprises a second endcapping agent that does not contain a ketone group.

15. The blend of claim 11, wherein the monofunctional benzophenone is 2-hydroxybenzophenone, 3-hydroxybenzophenone, or 4-hydroxybenzophenone.

16. The blend of claim 1, wherein the photoactive additive has a weight average molecular weight of 15,000 or greater.

17. The blend of claim 1, further comprising a flame retardant.

18. The blend of claim 17, wherein the flame retardant is potassium perfluorobutane sulfonate (Rimar salt), potassium diphenyl sulfone-3-sulfonate (KSS), or a combination thereof.

19. The blend of claim 17, wherein the flame retardant is Rimar salt which is present in an amount of about 0.05 wt % to about 0.085 wt %, based on the total weight of the composition, and wherein the plaque comprising the composition has a transparency of 70 to 90% at a thickness of 3.2 mm, measured according to ASTM-D1003-00.

20. The blend of claim 17, wherein the flame retardant is present in an amount of about 0.06 wt % to about 0.08 wt %.

21. The blend of claim 17, further comprising a heat stabilizer and a mold release agent.

22. The blend of claim 1, further comprising an impact modifier, UV stabilizer, colorant, flame retardant, heat stabilizer, plasticizer, lubricant, mold release agent, filler, reinforcing agent, antioxidant agent, antistatic agent, blowing agent, anti-drip agent, or radiation stabilizer.

23. The blend of claim 1, wherein the polymer resin is a polycarbonate-polysiloxane copolymer having the following structure:

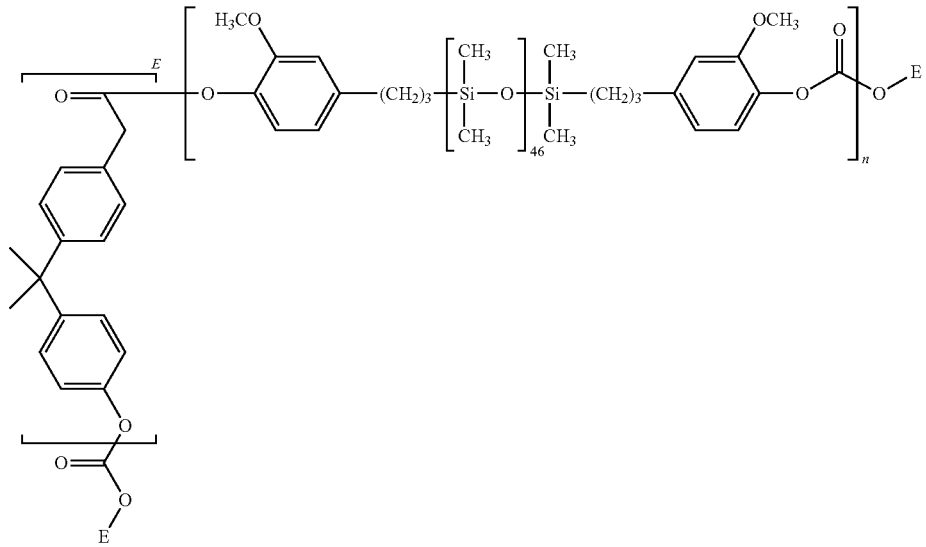

wherein E is an endcap; m is a molar amount of polycarbonate; n is a molar amount of polysiloxane; and m:n is the molar ratio of polycarbonate to polysiloxane in the copolymer.

24. The blend of claim 23, wherein the polycarbonate-polysiloxane copolymer has a siloxane content of from about 4 wt % to about 8 wt %, based on the total weight of the blend.

25. The blend of claim 1, wherein a plaque formed from the blend achieves a UL94 5VA rating at a thickness of 1.5 mm (±10%).

26. An article formed from the blend of claim 1.

27. The article of claim 26, wherein the article is at least one of an automotive bumper, an automotive exterior component, an automobile mirror housing, an automobile grille, an automobile pillar, an automobile wheel cover, an automobile instrument panel or trim, an automobile glove box, an automobile door hardware or other interior trim, an automobile exterior light, an automobile part within the engine compartment, an agricultural tractor or device part, a construction equipment vehicle or device part, a construction or agricultural equipment grille, a marine or personal water craft part, an all terrain vehicle or all terrain vehicle part, plumbing equipment, a valve or pump, an air conditioning heating or cooling part, a furnace or heat pump part, a computer part, a computer router, a desk top printer, a large office/industrial printer, an electronics part, a projector part, an electronic display part, a copier part, a scanner part, an electronic printer toner cartridge, a hair drier, an iron, a coffee maker, a toaster, a washing machine or washing machine part, a microwave, an oven, a power tool, an electric component, an electric enclosure, a lighting part, a dental instrument, a medical instrument, a medical or dental lighting part, an aircraft part, a train or rail part, a seating component, a sidewall, a ceiling part, cookware, a medical instrument tray, an animal cage, fibers, a laser welded medical device, fiber optics, a lense (auto and non-auto), a cell phone part, a greenhouse component, a sun room component, a fire helmet, a safety shield, safety glasses, a gas pump part, a humidifier housing, a thermostat control housing, an air conditioner drain pan, an outdoor cabinet, a telecom enclosure or infrastructure, a Simple Network Detection System (SNIDS) device, a network interface device, a smoke detector, a component or device in a plenum space, a medical scanner, X-ray equipment, a construction or agricultural equipment, a hand held electronic device enclosure or part, a wearable electronic device, a hand held tool enclosure or part, a smart phone enclosure or part, and a turbine blade.

28. The article of claim 27, wherein the article is at least one of a computer housing, a computer housing or business machine housing or part, a housing or part for monitors, a computer router, a copier, a desk top printer, a large office/industrial printer, a handheld electronic device housing, a housing for a hand-held device, a component for a light fixture, a humidifier housing, a thermostat control housing, an air conditioner drain pan, an outdoor cabinet, a telecom enclosure or infrastructure, a Simple Network Intrusion Detection System (SNIDS) device, a network interface device, a smoke detector, a component or device in a plenum space, a component for a medical application or a device, an electrical box or enclosure, and an electrical connector.

29. The article of claim 26, wherein the article is a film, a sheet, a layer of a multilayer film, or a layer of a multilayer sheet.

30. The article of claim 26, wherein the article is formed by injection molding, overmolding, co-injection molding, extrusion, multilayer extrusion, rotational molding, blow molding, or thermoforming.

31. The article of claim 26, wherein the article is exposed to UV radiation to cause crosslinking of the photoactive additive.

* * * * *